US012532237B2

(12) United States Patent
Farag et al.

(10) Patent No.: US 12,532,237 B2
(45) Date of Patent: Jan. 20, 2026

(54) INTER-CELL BEAM MANAGEMENT CELL SWITCH

(71) Applicant: Samsung Electronics Co., Ltd., Suwon-si (KR)

(72) Inventors: Emad N. Farag, Flanders, NJ (US); Eko Onggosanusi, Coppell, TX (US); Dalin Zhu, Allen, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 485 days.

(21) Appl. No.: 18/191,666

(22) Filed: Mar. 28, 2023

(65) Prior Publication Data

US 2023/0328605 A1 Oct. 12, 2023

Related U.S. Application Data

(60) Provisional application No. 63/422,249, filed on Nov. 3, 2022, provisional application No. 63/422,256, filed
(Continued)

(51) Int. Cl.
*H04W 36/06* (2009.01)
*H04L 1/1812* (2023.01)
*H04W 36/00* (2009.01)

(52) U.S. Cl.
CPC ........... *H04W 36/06* (2013.01); *H04L 1/1812* (2013.01); *H04W 36/0072* (2013.01)

(58) Field of Classification Search
CPC ........... H04W 36/0058; H04W 36/085; H04W 36/00837; H04W 36/0085; H04W 36/08; H04W 36/06; H04W 36/0061
(Continued)

(56) References Cited

U.S. PATENT DOCUMENTS

2011/0317642 A1 12/2011 Eravelli et al.
2012/0120920 A1 5/2012 Zhang et al.
(Continued)

FOREIGN PATENT DOCUMENTS

CN 113709823 A 11/2021
CN 110324872 B 3/2022
(Continued)

OTHER PUBLICATIONS

"5G; NR; Physical channels and modulation (3GPP TS 38.211 version 17.4.0 Release 17)", ETSI TS 138 211 V17.4.0, Jan. 2023, 141 pages.
(Continued)

*Primary Examiner* — David Q Nguyen

(57) ABSTRACT

Methods and apparatuses for methods and apparatuses for facilitating serving cell changes based on signaling related to beam management procedures in a wireless communications network. A user equipment (UE) comprises a transceiver and a processor operably coupled to the transceiver. The transceiver is configured to receive a transmission configuration indicator (TCI) state identifier (ID) associated with a target serving cell, receive a cell switch command, and transmit, in response to reception of the cell switch command, a channel conveying a positive hybrid automatic repeat request acknowledgement (HARQ-ACK). The processor is configured to perform, based on the cell switch command, a cell switch at a time, wherein the time corresponds to a slot that starts after a cell switch application time from a last symbol of the channel conveying the positive HARQ-ACK.

20 Claims, 21 Drawing Sheets

Related U.S. Application Data on Nov. 3, 2022, provisional application No. 63/331,122, filed on Apr. 14, 2022, provisional application No. 63/328,564, filed on Apr. 7, 2022, provisional application No. 63/328,576, filed on Apr. 7, 2022.

(58) Field of Classification Search
USPC .............................. 370/328, 329, 330, 331
See application file for complete search history.

(56) References Cited

U.S. PATENT DOCUMENTS

| | | | |
|---|---|---|---|
| 2019/0313394 A1* | 10/2019 | Kubota | H04L 5/0092 |
| 2023/0224777 A1* | 7/2023 | Raghavan | H04W 36/0058 |
| 2024/0129912 A1* | 4/2024 | Abotabl | H04L 5/0098 |

FOREIGN PATENT DOCUMENTS

| | | | | |
|---|---|---|---|---|
| KR | 20190086043 A | * | 7/2019 | H04W 72/20 |
| WO | 2007045279 A1 | | 4/2007 | |

OTHER PUBLICATIONS

"5G; NR; Multiplexing and channel coding (3GPP TS 38.212 version 17.4.0 Release 17)", ETSI TS 138 212 V17.4.0, Jan. 2023, 206 pages.
"5G; NR; Physical layer procedures for control (3GPP TS 38.213 version 17.4.0 Release 17)", ETSI TS 138 213 V17.4.0, Jan. 2023, 263 pages.
"5G; NR; Physical layer procedures for data (3GPP TS 38.214 version 17.4.0 Release 17)", ETSI TS 138 214 V17.4.0, Jan. 2023, 236 pages.
"5G; NR; Medium Access Control (MAC) protocol specification (3GPP TS 38.321 version 17.3.0 Release 17)", ETSI TS 138 321 V17.3.0, Jan. 2023, 254 pages.
"5G; NR; Radio Resource Control (RRC); Protocol specification (3GPP TS 38.331 version 17.3.0 Release 17)", ETSI TS 138 331 V17.3.0, Jan. 2023, 1295 pages.
MediaTek, "New WID on Further NR mobility enhancements", 3GPP TSG RAN Meeting #94e, RP-213565, Dec. 2021, 5 pages.
"5G; NR; Physical channels and modulation (3GPP TS 38.211 version 16.7.0 Release 16)", ETSI TS 138 211 V16.7.0, Oct. 2021, 138 pages.
"5G; NR; Multiplexing and channel coding (3GPP TS 38.212 version 16.7.0 Release 16)", ETSI TS 138 212 V16.7.0, Oct. 2021, 157 pages.
"5G; NR; Physical layer procedures for control (3GPP TS 38.213 version 16.7.0 Release 16)", ETSI TS 138 213 V16.7.0, Oct. 2021, 191 pages.
"5G; NR; Physical layer procedures for data (3GPP TS 38.214 version 16.7.0 Release 16)", ETSI TS 138 214 V16.7.0, Oct. 2021, 176 pages.
"5G; NR; Medium Access Control (MAC) protocol specification (3GPP TS 38.321 version 16.6.0 Release 16)", ETSI TS 138 321 V16.6.0, Oct. 2021, 160 pages.
"5G; NR; Radio Resource Control (RRC); Protocol specification (3GPP TS 38.331 version 16.6.0 Release 16)", ETSI TS 138 331 V16.6.0, Oct. 2021, 948 pages.
Samsung, "Revised WID: Further enhancements on MIMO for NR", 3GPP TSG RAN Meeting #89e, RP-202024, Sep. 2020, 5 pages.
International Search Report and Written Opinion issued Jun. 12, 2023 regarding International Application No. PCT/KR2023/004612, 7 pages.

\* cited by examiner

700

| Higher Layer Configuration of TCI States | MAC CE signaling of TCI State code points | DCI signaling of TCI State |

If second DCI Format 2 conveying TCI state starts before the end of first DCI Format 1 conveying TCI state, UE expects same TCI state code point in both DCI Formats

1800

If second DCI Format 2 conveying TCI state starts before the end of HARQ-ACK corresponding to first DCI Format 1 conveying TCI state, UE expects same TCI state code point in both DCI Formats

INTER-CELL BEAM MANAGEMENT CELL SWITCH

CROSS-REFERENCE TO RELATED APPLICATION AND CLAIM OF PRIORITY

This application claims priority under 35 U.S.C. § 119(e) to U.S. Provisional Patent Application No. 63/328,564 filed on Apr. 7, 2022; U.S. Provisional Patent Application No. 63/328,576 filed on Apr. 7, 2022; U.S. Provisional Patent Application No. 63/331,122 filed on Apr. 14, 2022; U.S. Provisional Patent Application No. 63/422,249 filed on Nov. 3, 2022; and U.S. Provisional Patent Application No. 63/422,256 filed on Nov. 3, 2022, which are hereby incorporated by reference in their entirety.

TECHNICAL FIELD

This disclosure relates generally to mobility management in cellular wireless communications systems. Embodiments of this disclosure relate to methods and apparatuses for facilitating serving cell changes based on signaling related to beam management procedures in a wireless communications network.

BACKGROUND

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

SUMMARY

Embodiments of the present disclosure provide methods and apparatuses for facilitating serving cell changes based on signaling related to beam management procedures in a wireless communications network.

In one embodiment, a user equipment (UE) is provided. The UE comprises a transceiver and a processor operably coupled to the transceiver. The transceiver is configured to receive a transmission configuration indicator (TCI) state identifier (ID) associated with a target serving cell, receive a cell switch command, and transmit, in response to reception of the cell switch command, a channel conveying a positive hybrid automatic repeat request acknowledgement (HARQ-ACK). The processor is configured to perform, based on the cell switch command, a cell switch at a time, wherein the time corresponds to a slot that starts after a cell switch application time from a last symbol of the channel conveying the positive HARQ-ACK.

In another embodiment, a base station (BS) is provided. The BS comprises a transceiver and a processor operably coupled to the transceiver. The transceiver is configured to transmit a transmission configuration indicator (TCI) state identifier (ID) associated with a target serving cell, transmit a cell switch command, and receive, in response to reception of the cell switch command, a channel conveying a positive hybrid automatic repeat request acknowledgement (HARQ-ACK). The processor is configured to perform, based on the cell switch command and receipt of the positive HARQ-ACK, a cell switch at a time, wherein the time corresponds to a slot that starts after a cell switch application time from a last symbol of the channel conveying the positive HARQ-ACK.

In another embodiment, a method of operating a UE is provided, comprising the step of receiving a TCI state ID associated with a target serving cell, receiving a cell switch command, transmitting, in response to reception of the cell switch command, a channel conveying a positive HARQ-ACK, and performing, based on the cell switch command, a cell switch at a time, wherein the time corresponds to a slot that starts after a cell switch application time from a last symbol of the channel conveying the positive HARQ-ACK.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "and/or" is inclusive, meaning or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] 3GPP TS 38.211 v17.4.0, "NR; Physical channels and modulation."
[2] 3GPP TS 38.212 v17.4.0, "NR; Multiplexing and Channel coding."
[3] 3GPP TS 38.213 v17.4.0, "NR; Physical Layer Procedures for Control."
[4] 3GPP TS 38.214 v17.4.0, "NR; Physical Layer Procedures for Data."
[5] 3GPP TS 38.321 v17.3.0, "NR; Medium Access Control (MAC) protocol specification."
[6] 3GPP TS 38.331 v17.3.0, "NR; Radio Resource Control (RRC) Protocol Specification."
[7] 3GPP RP-213565, "Further NR Mobility Enhancements".
[8] 3GPP TS 38.211 v16.7.0, "NR; Physical channels and modulation."
[9] 3GPP TS 38.212 v16.7.0, "NR; Multiplexing and Channel coding."
[10] 3GPP TS 38.213 v16.7.0, "NR; Physical Layer Procedures for Control."
[11] 3GPP TS 38.214 v16.7.0, "NR; Physical Layer Procedures for Data."
[12] 3GPP TS 38.321 v16.6.0, "NR; Medium Access Control (MAC) protocol specification."
[13] 3GPP TS 38.331 v16.6.0, "NR; Radio Resource Control (RRC) Protocol Specification."
[14] 3GPP RP-202024, "Revised WID: Further enhancements on MIMO for NR".

ABBREVIATIONS

ACK Acknowledgement
BW Bandwidth
BWP Bandwidth Part
CC Component Carrier
CORESET Control Resource Set
C-RNTI Cell RNTI
CSI Channel State Information
CSI-RS Channel State Information Reference Signal
DCI Downlink Control Information
DL Downlink
DMRS Demodulation Reference Signal
FDD Frequency Division Duplexing
gNB 5G Base Station
HARQ Hybrid automatic repeat request
MCS Modulation and Coding Scheme
NR New Radio
PBCH Primary Broadcast Channel
PCell Primary Cell
PDCCH Physical Downlink Control Channel
PDSCH Physical Downlink Shared Channel
PUCCH Physical Uplink Control Channel
PUSCH Physical Uplink Shared Channel
RB Resource Block
RNTI Radio Network Temporary Identifier
RS Reference Signal
SC Sub-carrier
SCell Secondary Cell
SCS Sub-carrier spacing.
SINR Signal to Interference and Noise Ratio
SRS Sounding Reference Signal
SS Synchronization Signals
SSB SS/PBCH Block or Synchronization Signal Block
TB Transport Block
TCI Transmission Configuration Indication
TDD Time Division Duplexing
TPC Transmit Power Control
TRP Transmit-Receive Point
UCI Uplink Control Information
UE User Equipment
UL Uplink In the below disclosure, both FDD and TDD are considered as a duplex method for DL and UL signaling.

Although exemplary descriptions and embodiments to follow assume orthogonal frequency division multiplexing (OFDM) or orthogonal frequency division multiple access (OFDMA), this invention can be extended to other OFDM-based transmission waveforms or multiple access schemes such as filtered OFDM (F-OFDM).

In the present disclosure, the term "activation" describes an operation in which a UE (i.e., a wireless communication device) receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal. The term "deactivation" describes an operation in which a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms are used for illustrative purposes and therefore are not normative. Other terms that refer to the same functions can also be used.

A "reference RS" corresponds to a set of characteristics of a DL beam or a UL TX beam, such as a direction, a precoding/beamforming, a number of ports, and so on.

In the following components, a TCI state is used for beam indication. It can refer to a DL TCI state for downlink channels (e.g., PDCCH and PDSCH) or downlink signals (e.g., CSI-RS), an uplink TCI state for uplink channels (e.g., PUSCH or PUCCH) or uplink signals (e.g., SRS), a joint TCI state for downlink and uplink channels or signals, or separate TCI states for uplink and downlink channels or signals. A TCI state can be common across multiple component carriers (CCs) or can be a separate TCI state for a component carrier or a set of component carriers. A TCI state can be gNB or UE panel specific or common across panels. In some examples, the uplink TCI state can be replaced by SRS resource indicator (SRI).

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example of mechanisms for configuring a TCI state according to embodiments of the present disclosure;

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that inter-cell beam management procedures using Layer 1 (L1) and Layer 2 (L2) signaling allow a UE to receive channels on a beam associated with a second cell that is different than its current serving cell. Embodiments of the present disclosure also recognize that cell switching is currently handled by higher layer signaling (i.e., Layer 3 (L3) signaling). To further enhance mobility, embodiments of the disclosure provide mechanisms for facilitating a cell switch to the second cell based on the L1/L2 inter-cell beam management signaling. Some of these embodiments are based on a TCI state indication, while others are based on a dynamic cell switch indication.

Embodiments of the present disclosure also recognize that the use of multiple beam indications and beam indication updates increases beam management complexity and overhead. Accordingly, embodiments of the present disclosure also provide mechanisms that extend a unified TCI framework to cross-carrier beam indication. In particular, this includes embodiments related to timing the application of different TCI states indicated via L1 and L2 signaling under the unified TCI framework.

Figure 1:
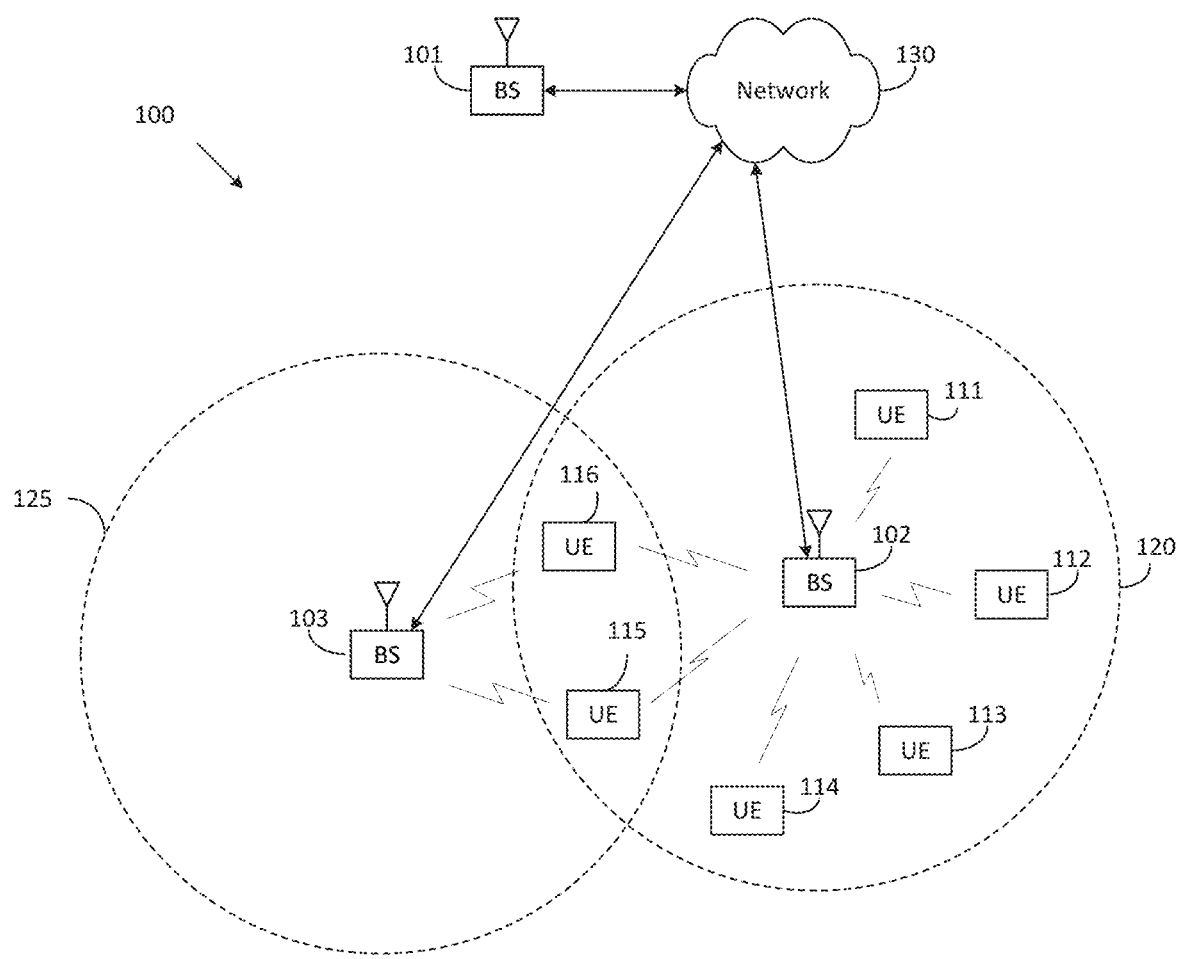
FIG. 1 illustrates an example wireless network according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for facilitating serving cell changes based on signaling related to beam management procedures in a wireless communications network. In certain embodiments, and one or more of the gNBs 101-103 includes circuitry, programing, or a combination thereof, for facilitating serving cell changes based on signaling related to beam management procedures in a wireless communications network.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, or 103 could provide access to other or additional external networks, such as external telephone networks or other types of data networks.

Figure 2A:
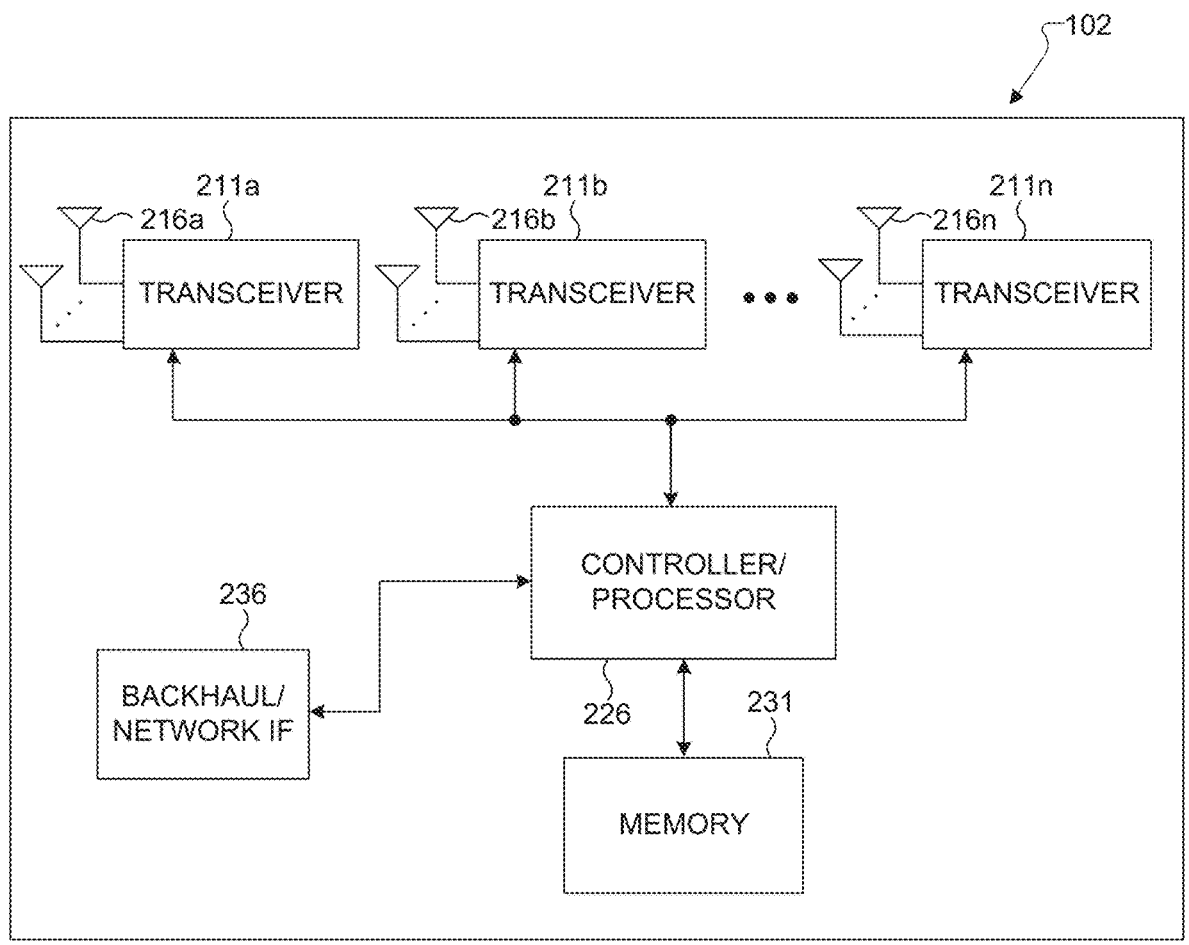
FIG. 2A illustrates an example gNB according to embodiments of the present disclosure.

FIG. 2A illustrates an example gNB 102 according to embodiments of the present disclosure. The embodiment of the gNB 102 illustrated in FIG. 2A is for illustration only, and the gNBs 101 and 103 of FIG. 1 could have the same or similar configuration. However, gNBs come in a wide variety of configurations, and FIG. 2A does not limit the scope of this disclosure to any particular implementation of a gNB.

As shown in FIG. 2A, the gNB 102 includes multiple antennas 205a-205n, multiple transceivers 211a-211n, a controller/processor 226, a memory 231, and a backhaul or network interface 236.

The transceivers 211a-211n receive, from the antennas 206a-206n, incoming RF signals, such as signals transmitted by UEs in the network 100. The transceivers 211a-211n down-convert the incoming RF signals to generate IF or baseband signals. The IF or baseband signals are processed by receive (RX or Rx) processing circuitry in the transceivers 211a-211n or controller/processor 226, which generates processed baseband signals by filtering, decoding, or digitizing the baseband or IF signals. The controller/processor 226 may further process the baseband signals.

Transmit (TX or Tx) processing circuitry in the transceivers 211a-211n or controller/processor 226 receives analog or digital data (such as voice data, web data, e-mail, or interactive video game data) from the controller/processor 226. The TX processing circuitry encodes, multiplexes, or digitizes the outgoing baseband data to generate processed baseband or IF signals. The transceivers 211a-211n up-converts the baseband or IF signals to RF signals that are transmitted via the antennas 206a-206n.

The controller/processor 226 can include one or more processors or other processing devices that control the overall operation of the gNB 102. For example, the controller/processor 226 could control the reception of UL channels or signals and the transmission of DL channels or signals by the transceivers 211a-211n in accordance with well-known principles. The controller/processor 226 could support additional functions as well, such as more advanced wireless communication functions. For instance, the controller/processor 226 could support beam forming or directional routing operations in which outgoing/incoming signals from/to multiple antennas 206a-206n are weighted differently to effectively steer the outgoing signals in a desired direction. Any of a wide variety of other functions could be supported in the gNB 102 by the controller/processor 226.

The controller/processor 226 is also capable of executing programs and other processes resident in the memory 230, such as processes for facilitating serving cell changes based on signaling related to beam management procedures. The controller/processor 226 can move data into or out of the memory 231 as required by an executing process.

The controller/processor 226 is also coupled to the backhaul or network interface 235. The backhaul or network interface 236 allows the gNB 102 to communicate with other devices or systems over a backhaul connection or over a network. The interface 236 could support communications over any suitable wired or wireless connection(s). For example, when the gNB 102 is implemented as part of a cellular communication system (such as one supporting 5G/NR, LTE, or LTE-A), the interface 236 could allow the gNB 102 to communicate with other gNBs over a wired or wireless backhaul connection. When the gNB 102 is implemented as an access point, the interface 236 could allow the gNB 102 to communicate over a wired or wireless local area network or over a wired or wireless connection to a larger network (such as the Internet). The interface 236 includes any suitable structure supporting communications over a wired or wireless connection, such as an Ethernet or transceiver.

The memory 231 is coupled to the controller/processor 226. Part of the memory 231 could include a RAM, and another part of the memory 231 could include a Flash memory or other ROM.

Although FIG. 2A illustrates one example of gNB 102, various changes may be made to FIG. 2A. For example, the gNB 102 could include any number of each component shown in FIG. 2A. Also, various components in FIG. 2A could be combined, further subdivided, or omitted and additional components could be added according to particular needs.

Figure 2B:
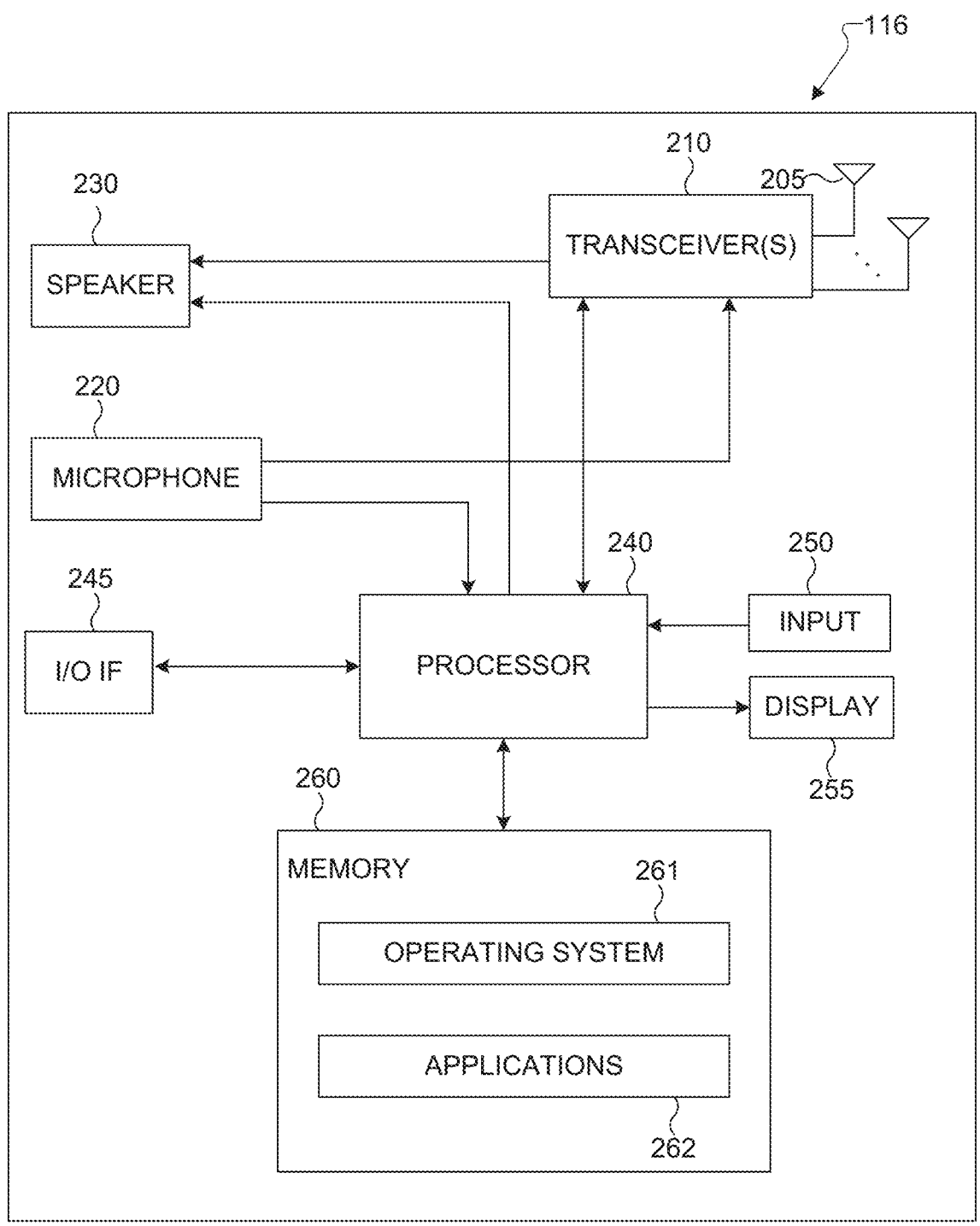
FIG. 2B illustrates an example UE according to embodiments of the present disclosure.

FIG. 2B illustrates an example UE 116 according to embodiments of the present disclosure. The embodiment of the UE 116 illustrated in FIG. 2B is for illustration only, and the UEs 111-115 of FIG. 1 could have the same or similar configuration. However, UEs come in a wide variety of configurations, and FIG. 2B does not limit the scope of this disclosure to any particular implementation of a UE.

As shown in FIG. 2B, the UE 116 includes antenna(s) 205, a transceiver(s) 210, and a microphone 220. The UE 116 also includes a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives, from the antenna 205, an incoming RF signal transmitted by a gNB of the network 100. The transceiver(s) 210 down-converts the incoming RF signal to generate an intermediate frequency (IF) or baseband signal. The IF or baseband signal is processed by RX processing circuitry in the transceiver(s) 210 or processor 240, which generates a processed baseband signal by filtering, decoding, or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 or processor 240 receives analog or digital voice data from the microphone 220 or other outgoing baseband data (such as web data, e-mail, or interactive video game data) from the processor 240. The TX processing circuitry encodes, multiplexes, or digitizes the outgoing baseband data to generate a processed baseband or IF signal. The transceiver(s) 210 up-converts the baseband or IF signal to an RF signal that is transmitted via the antenna(s) 205.

The processor 240 can include one or more processors or other processing devices and execute the OS 261 stored in the memory 260 in order to control the overall operation of the UE 116. For example, the processor 240 could control the reception of DL channels or signals and the transmission of UL channels or signals by the transceiver(s) 210 in accordance with well-known principles. In some embodiments, the processor 240 includes at least one microprocessor or microcontroller.

The processor 240 is also capable of executing other processes and programs resident in the memory 260, such as processes for facilitating serving cell changes based on signaling related to beam management procedures. The processor 240 can move data into or out of the memory 260 as required by an executing process. In some embodiments, the processor 240 is configured to execute the applications 262 based on the OS 261 or in response to signals received from gNBs or an operator. The processor 240 is also coupled to the I/O interface 245, which provides the UE 116 with the ability to connect to other devices, such as laptop computers and handheld computers. The I/O interface 245 is the communication path between these accessories and the processor 240.

The processor 240 is also coupled to the input 250, which includes for example, a touchscreen, keypad, etc., and the display 255. The operator of the UE 116 can use the input 250 to enter data into the UE 116. The display 255 may be a liquid crystal display, light emitting diode display, or other display capable of rendering text or at least limited graphics, such as from web sites.

The memory 260 is coupled to the processor 240. Part of the memory 260 could include a random-access memory (RAM), and another part of the memory 260 could include a Flash memory or other read-only memory (ROM).

Although FIG. 2B illustrates one example of UE 116, various changes may be made to FIG. 2B. For example, various components in FIG. 2B could be combined, further subdivided, or omitted and additional components could be added according to particular needs. As a particular example, the processor 240 could be divided into multiple processors, such as one or more central processing units (CPUs) and one or more graphics processing units (GPUs). In another example, the transceiver(s) 210 may include any number of transceivers and signal processing chains and may be connected to any number of antennas. Also, while FIG. 2B illustrates the UE 116 configured as a mobile telephone or smartphone, UEs could be configured to operate as other types of mobile or stationary devices.

Figure 3A:
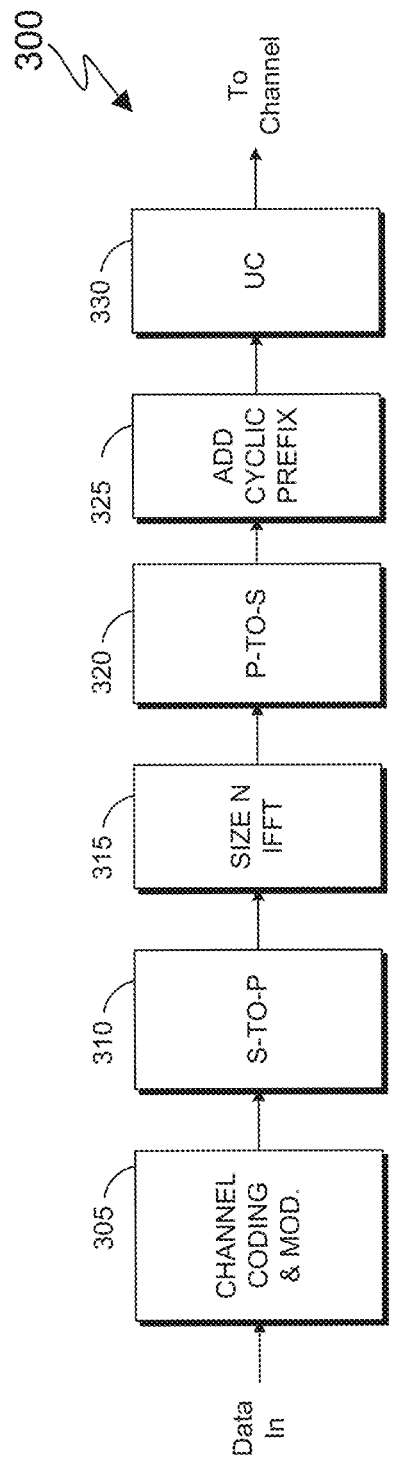
FIGS. 3A and 3B illustrate example wireless transmit and receive paths according to this disclosure.
Figure 3B:
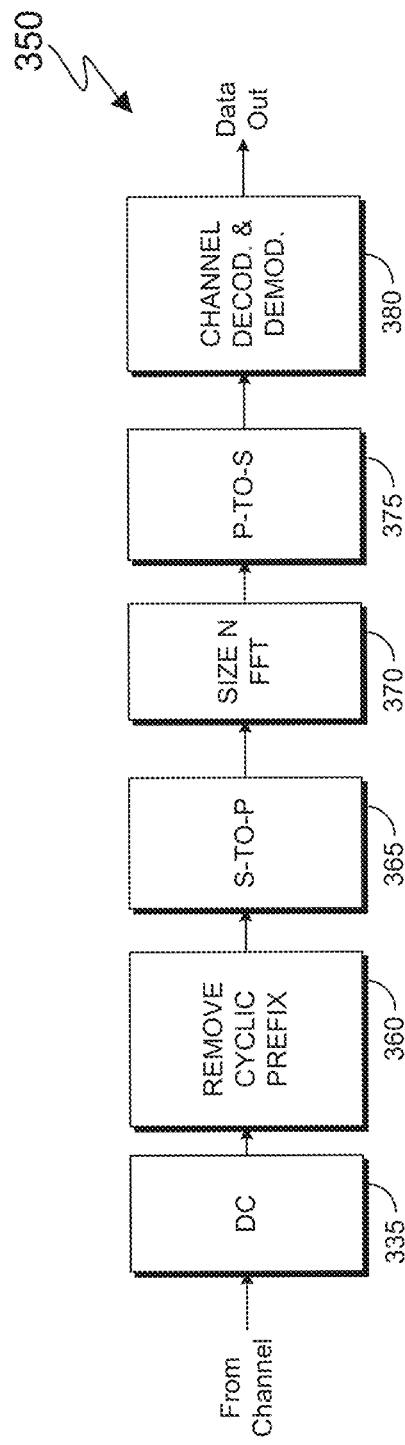

FIGS. 3A and 3B illustrate example wireless transmit and receive paths according to this disclosure. In the following description, a transmit path 300, of FIG. 3A, may be described as being implemented in a BS (such as the BS 102), while a receive path 350, of FIG. 3B, may be described as being implemented in a UE (such as a UE 116). However, it may be understood that the receive path 350 can be implemented in a BS and that the transmit path 300 can be implemented in a UE. In some embodiments, the transmit path 300 and/or receive path 350 is configured to support serving cell changes based on signaling related to beam management procedures in a wireless communications network as described in embodiments of the present disclosure.

The transmit path 300 as illustrated in FIG. 3A includes a channel coding and modulation block 305, a serial-to-parallel (S-to-P) block 310, a size N inverse fast Fourier transform (IFFT) block 315, a parallel-to-serial (P-to-S) block 320, an add cyclic prefix block 325, and an up-converter (UC) 330. The receive path 350 as illustrated in FIG. 3 includes a down-converter (DC) 355, a remove cyclic prefix block 360, a serial-to-parallel (S-to-P) block 365, a size N fast Fourier transform (FFT) block 370, a parallel-to-serial (P-to-S) block 375, and a channel decoding and demodulation block 380.

As illustrated in FIG. 3A, the channel coding and modulation block 305 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 310 converts (such as de-multiplexes) the serial modulated symbols to parallel data in order to generate N parallel symbol streams, where N is the IFFT/FFT size used in the BS 102 and the UE 116. The size N IFFT block 315 performs an IFFT operation on the N parallel symbol streams to generate time-domain output signals. The parallel-to-serial block 320 converts (such as multiplexes) the parallel time-domain output symbols from the size N IFFT block 315 in order to generate a serial time-domain signal. The add cyclic prefix block 325 inserts a cyclic prefix to the time-domain signal. The up-converter 330 modulates (such as up-converts) the output of the add cyclic prefix block 325 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 3B, the down-converter 355 down-converts the received signal to a baseband frequency, and the remove cyclic prefix block 360 removes the cyclic prefix to generate a serial time-domain baseband signal. The serial-to-parallel block 365 converts the time-domain baseband signal to parallel time domain signals. The size N FFT block 370 performs an FFT algorithm to generate N parallel frequency-domain signals. The parallel-to-serial block 375 converts the parallel frequency-domain signals to a sequence of modulated data symbols. The channel decoding and demodulation block 380 demodulates and decodes the modulated symbols to recover the original input data stream.

Each of the BSs 101-103 may implement a transmit path 300 as illustrated in FIG. 3A that is analogous to transmitting in the downlink to UEs 111-116 and may implement a receive path 350 as illustrated in FIG. 3B that is analogous to receiving in the uplink from UEs 111-116. Similarly, each of UEs 111-116 may implement the transmit path 300 for transmitting in the uplink to the B Ss 101-103 and may implement the receive path 350 for receiving in the downlink from the BSs 101-103.

Each of the components in FIGS. 3A and 3B can be implemented using hardware or using a combination of hardware and software/firmware. As a particular example, at least some of the components in FIGS. 3A and 3B may be implemented in software, while other components may be implemented by configurable hardware or a mixture of software and configurable hardware. For instance, the FFT block 370 and the IFFT block 315 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 3, or the like) for DFT and IDFT functions, while the value of the variable N may be any integer number that is a power of two (such as 1, 2, 3, 8, 16, or the like) for FFT and IFFT functions.

Although FIGS. 3A and 3B illustrate examples of wireless transmit and receive paths, various changes may be made to FIGS. 3A and 3B. For example, various components in FIGS. 3A and 3B can be combined, further subdivided, or omitted and additional components can be added according to particular needs. Also, FIGS. 3A and 3B are meant to illustrate examples of the types of transmit and receive paths that can be used in a wireless network. Any other suitable architectures can be used to support wireless communications in a wireless network.

In the present disclosure a beam is determined by either of: a transmission configuration indication (TCI) state that establishes a quasi co-location (QCL) relationship or spatial relation between a source reference signal (e.g., a synchronization signal block (SS/PBCH Block or SSB) or channel state information reference signal (CSI-RS)) and a target reference signal, or spatial relationship information that establishes an association to a source reference signal, such as an SSB, CSI-RS, or sounding reference signal (SRS). In either case, the ID of the source reference signal identifies the beam.

The TCI state and/or the spatial relationship reference RS can determine a spatial Rx filter for reception of downlink channels at the UE, or a spatial Tx filter for transmission of uplink channels from the UE. The TCI state and/or the spatial relation reference RS can determine a spatial Tx filter for transmission of downlink channels or signals from the gNB, or a spatial Rx filter for reception of uplink channels or signals at the gNB.

Figure 4A:
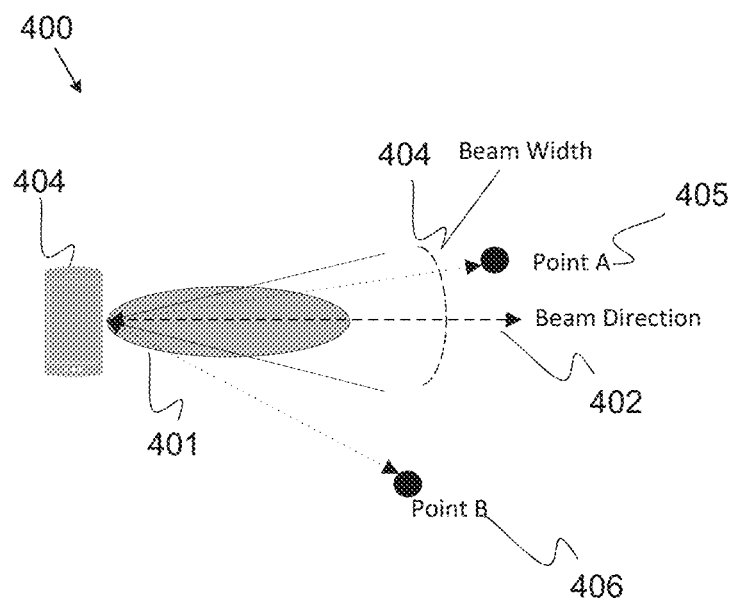
FIG. 4A illustrates an example of beam used in a wireless communication system according to embodiments of the present disclosure.

FIG. 4A illustrates an example of beam 401 used in a wireless communication system according to embodiments of the present disclosure. The embodiment of the beam 401 shown in FIG. 4A is for illustration only. Other embodiments could be used without departing from the scope of this disclosure.

As illustrated in FIG. 4A, in a wireless system a beam 401, for a device 404, can be characterized by a beam direction 402 and a beam width 403. For example, a device 404 transmits radio frequency (RF) energy in a beam direction and within a beam width. A device 404 receives RF energy in a beam direction and within a beam width. As illustrated in FIG. 4A, a device at point A 405 can receive from and transmit to device 404 as Point A is within a beam width and direction of a beam from device 404. As illustrated in FIG. 4A, a device at point B 406 cannot receive from and transmit to device 404 as Point B is outside a beam width and direction of a beam from device 404. While FIG.

4A, for illustrative purposes, shows a beam in 2-dimensions (2D), it should be apparent to those skilled in the art, that a beam can be in 3-dimensions (3D), where the beam direction and beam width are defined in space.

Figure 4B:
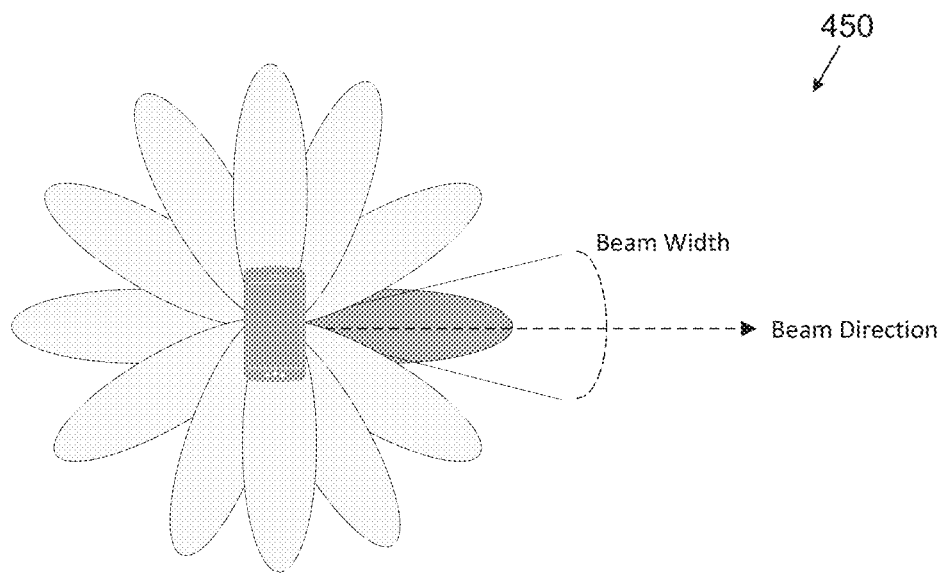
FIG. 4B illustrates an example of multi-beam operation in a wireless communication system according to embodiments of the present disclosure.

FIG. 4B illustrates an example of multi-beam operation 450 in a wireless communication system according to embodiments of the present disclosure. The embodiment of the operation 450 shown in FIG. 4B is for illustration only. Other embodiments could be used without departing from the scope of this disclosure.

In a wireless system, a device can transmit or receive on multiple beams. This is known as "multi-beam operation" and is illustrated in FIG. 4B. While in FIG. 4B, for illustrative purposes, beams are only illustrated in 2D, it should be apparent to those skilled in the art that a beam can be 3D, where a beam can be transmitted to or received from any direction in space.

Figure 5:
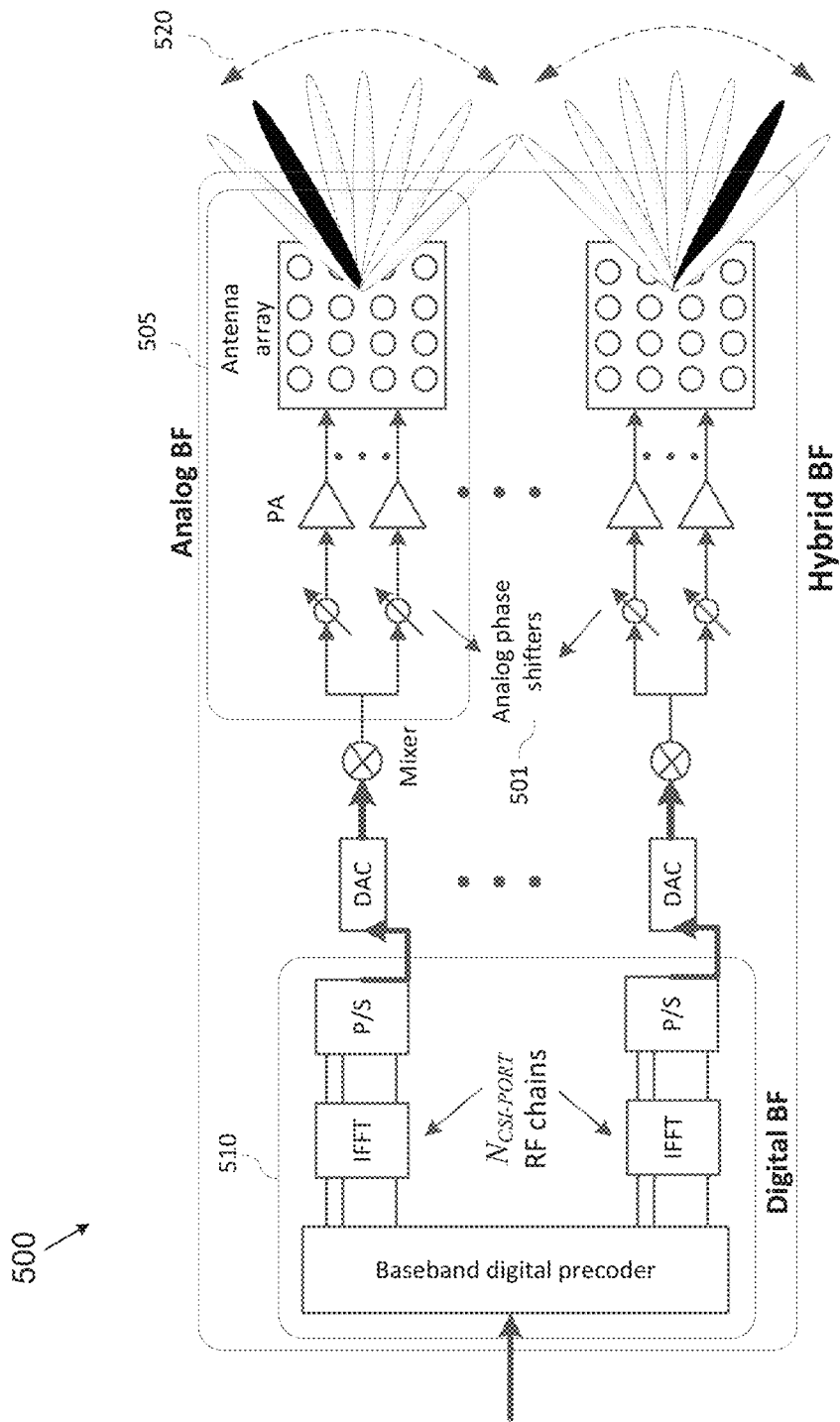
FIG. 5 illustrates example hybrid beamforming hardware according to embodiments of the present disclosure.

FIG. 5 illustrates an example hybrid beamforming hardware 500 according to embodiments of the present disclosure. The embodiment of the hybrid beamforming hardware 500 shown in FIG. 5 is for illustration only. Other embodiments could be used without departing from the scope of this disclosure.

Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of ADCs/DACs at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is same as the number of CSI-RS ports $N_{CSI-PORT}$. A digital beamforming unit 510 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam.

The above system is also applicable to higher frequency bands such as those above 52.6 GHz. In this case, the system can employ only analog beams. Due to the $O_2$ absorption loss around 60 GHz frequency (−10 dB additional loss per 100 m distance), a larger number and narrower analog beams (hence larger number of radiators in the array) are needed to compensate for the additional path loss.

Rel-17 introduced the unified TCI framework, wherein a unified or master or main or indicated TCI state is signaled to the UE also referred to as an indicated TCI state. The unified or master or main or indicated TCI state can be one of the following: In the case of joint TCI state indication, wherein a same beam is used for DL and UL channels, a joint TCI state that can be used at least for UE-dedicated DL channels and UE-dedicated UL channels. In the case of separate TCI state indication, wherein different beams are used for DL and UL channels, a DL TCI state that can be used at least for UE-dedicated DL channels. In the case of separate TCI state indication, wherein different beams are used for DL and UL channels, a UL TCI state that can be used at least for UE-dedicated UL channels. The unified (or master or main or indicated) TCI state is TCI state of UE-dedicated reception on PDSCH/PDCCH or transmission on dynamic-grant/configured-grant based PUSCH and all of dedicated PUCCH resources.

The unified TCI framework applies to intra-cell beam management, wherein the TCI states have a source RS that is directly or indirectly associated, through a quasi co-location relationship, e.g., a spatial relationship, with an SSB of a serving cell (e.g., the TCI state is associated with a TRP of a serving cell). The unified TCI state framework also applies to inter-cell beam management, wherein a TCI state can have a source RS that is directly or indirectly associated, through a quasi co-location relationship, e.g., a spatial relationship, with an SSB of cell that has a physical cell identity (PCI) different from the PCI of the serving cell (e.g., the TCI state is associated with a TRP of a cell having a PCI different from the PCI of the serving cell).

In Rel-17, UE-dedicated channels can be received and/or transmitted using a TCI state associated with a cell having a PCI different from the PCI of the serving cell. Meanwhile, the common channels can be received and/or transmitted using a TCI state associated with the serving cell (e.g., not associated with a cell having a PCI different from the PCI of the serving cell). Common channels can include: Channels carrying system information (e.g. system information block 1 (SIB1)) with a DL assignment carried by a DCI in PDCCH having a CRC scrambled by SI-RNTI and transmitted in Type0-PDCCH CSS set; Channels carrying other system information with a DL assignment carried by a DCI in PDCCH having a CRC scrambled by SI-RNTI and transmitted in Type0A-PDCCH CSS set; Channels carrying paging or short messages with a DL assignment carried by a DCI in PDCCH having a CRC scrambled by P-RNTI and transmitted in Type2-PDCCH CSS set; Channels carrying RACH related channels with a DL assignment or UL grant carried by a DCI in PDCCH having a CRC scrambled by RA-RNTI or TC-RNTI and transmitted in Type1-PDCCH CSS set.

The quasi-co-location (QCL) relationship between reference signals can be defined with respect to one or more of the following QCL types (see [4], section 5.1.5): Type A, {Doppler shift, Doppler spread, average delay, delay spread}. Type B, {Doppler shift, Doppler spread}. Type C, {Doppler shift, average delay}. Type D, {Spatial Rx parameter}.

In addition, the QCL relationship can also provide a spatial relationship for UL channels, e.g., a DL source reference signal provides information on the spatial domain filter to be used for UL transmissions, or the UL source reference signal provides the spatial domain filter to be used for UL transmissions, e.g., the same spatial domain filter for UL source reference signal and UL transmissions.

The unified (master or main or indicated) TCI state applies at least to UE dedicated DL and UL channels. The unified (master or main or indicated) TCI can also apply to other DL or UL channels or signals, e.g., non-UE dedicated channel and sounding reference signal (SRS).

In Rel-18, a new work item [7] has been agreed to further enhance mobility in NR. When the UE moves from the coverage area of one cell to another cell, at some point a serving cell change needs to be performed. Currently serving cell change is triggered by L3 measurements and is done by RRC signaling triggered Reconfiguration with Synchronization for change of PCell and PSCell, as well as release/add for SCells when applicable. All cases involve complete L2 (and L1) resets, leading to longer latency, larger overhead and longer interruption time than beam switch mobility. The goal of L1/L2 mobility enhancements is to enable a serving cell change via L1/L2 signaling, in order to reduce the latency, overhead and interruption time (see [7]). Allowing, the serving cell to be changed seamlessly using L1/L2 mechanisms reduces handover latency, and leads to more robust operation (less dropped calls). Accordingly, the disclosure herein below provides mechanisms for handover triggered by beam switching from the beam of one cell to the beam of another cell.

The unified TCI state framework of Rel-17 has been introduced to streamline the beam management procedures by reducing latency and overhead associated with beam change. As noted above, Rel-17 also introduced inter-cell beam management, wherein at least UE dedicated channels can be received on a beam associated with a TRP associated with a PCI different from the PCI of the serving cell.

Figure 6:
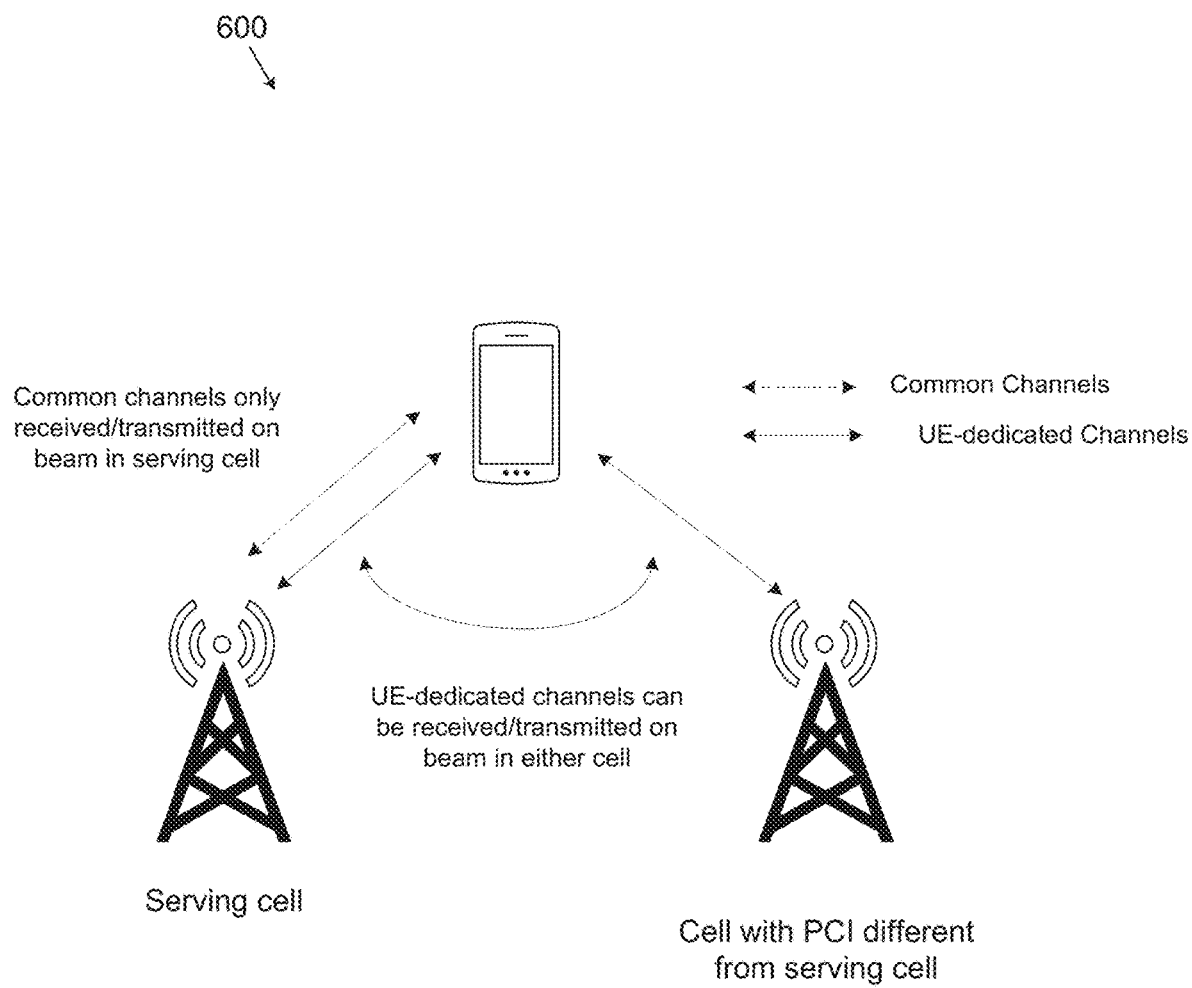
FIG. 6 illustrates an example of inter-cell beam management according to embodiments of the present disclosure.

FIG. 6 illustrates an example of inter-cell beam management 600 according to embodiments of the present disclosure. The embodiment of the inter-cell beam management 600 shown in FIG. 6 is for illustration only. Other embodiments could be used without departing from the scope of this disclosure. As illustrated, in Rel-17, when a beam changes from the TRP of the serving cell to a TRP of a cell with PCI different from that of the serving cell, the serving cell is not changed. Common channels continue to be received and transmitted on beam associated with a serving cell.

In Rel-17 a unified or master or main or indicated TCI state is signaled to the UE to indicate a beam for the UE to use. RRC signaling configures Rel-17 TCI states wherein a TCI state can be configured as DL or Joint TCI state using information element DLorJoint-TCIState, or UL TCI state using information element UL-TCIState. MAC signaling can activate one or more TCI codepoints. When one TCI state codepoint is activated by MAC Control Element (CE), the UE applies the TCI state(s) associated with the activated codepoint after a beam application time. When more than one TCI codepoint is activated by a MAC CE, further DCI signaling is used to indicate a TCI state codepoint to the UE. The unified TCI state can be signaled by a DCI Format (e.g., DL related DCI Format (e.g., DCI Format 1_1 or DCI Format 1_2) with a DL assignment or a DL related DCI Format (e.g., DCI Format 1_1 or DCI Format 1_2) without a DL assignment.

To further enhance mobility, when a beam is changed from a first TRP associated with a source serving cell to a second TRP associated with a PCI different from the PCI of the source serving cell, the second TRP can become the target serving cell for a serving cell change. Some embodiments of the present disclosure discussed herein below provide mechanisms for triggering a serving cell change from a source serving cell to a target serving cell based on or triggered by a TCI state indication. Other embodiments of the present disclosure discussed herein below provide mechanisms for triggering a serving cell change from a source serving cell to a target serving cell based on or triggered by a TCI state indication and a dynamic cell switch indication (or signal).

In the following embodiments, a TCI state is used for beam indication. A TCI state can refer to a DL TCI state for downlink channels (e.g., PDCCH and PDSCH) or downlink signals (e.g., CSI-RS), an uplink TCI state for uplink channels (e.g., PUSCH or PUCCH) or uplink signals (e.g., SRS), a joint TCI state for downlink and uplink channels or signals, or separate TCI states for uplink and downlink channels or signals. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

FIG. 7 illustrates an example of mechanisms 700 for configuring a TCI state according to embodiments of the present disclosure. The embodiment of the mechanisms 700 shown in FIG. 7 is for illustration only. Other embodiments could be used without departing from the scope of this disclosure. In the following examples, as illustrated in FIG. 7, a UE is configured/updated through higher layer RRC signaling with a set of TCI States with N elements. In one example, DL and joint TCI states are configured by higher layer parameter DLorJoint-TCIState, wherein the number of DL and Joint TCI states is $N_{DJ}$. UL TCI states are configured by higher layer parameter UL-TCIState, wherein the number of UL TCI states is $N_U$. N, the total number of configured TCI states, can be given by: $N=N_{DJ}+N_U$. In one example, the TCI states can be configured for source serving cell and one or more target serving cells.

MAC CE signaling includes a subset of M TCI states or TCI state codepoints from the set of N TCI states (where M≤N), wherein a codepoint is signaled in the "transmission configuration indication" field of a DCI used for indication of the TCI state. A codepoint can include one TCI state (e.g., DL TCI state or UL TCI state or Joint (DL and UL) TCI state). Alternatively, a codepoint can include two TCI states (e.g., a DL TCI state and a UL TCI state). L1 control signaling (i.e., DCI) updates the UE's TCI state, wherein the DCI includes a "transmission configuration indication" (beam indication) field (e.g., with m bits such that $M≤2^m$) and the TCI state corresponds to a codepoint signaled by a MAC CE. A DCI used for indication of the TCI state can be DL related DCI Format (e.g., DCI Format 1_1 or DCI Format 1_2), with a DL assignment or without a DL assignment.

The TCI states can be associated, through a QCL relation, with an SSB of a serving cell, or an SSB associated with a PCI different from the PCI of the serving cell. The QCL relation with a SSB can be a direct QCL relation, wherein the source RS (e.g., for a QCL Type D relation or a spatial relation) of the QCL state is the SSB. The QCL relation with a SSB can be an indirect QCL relation, wherein, the source RS (e.g., for a QCL Type D relation or a spatial relation) can be a reference signal, and the reference signal has the SSB as its source (e.g., for a QCL Type D relation or a spatial relation). The indirect QCL relation to an SSB can involve a QCL or spatial relation chain of more than one reference signal.

In one embodiment, dynamic switch of serving cell is based on TCI state indication.

In one example, the beam is indicated to the target cell with the cell switch command. There are two scenarios for this example: The first scenario is to have the indicated TCI state of the target cell be included in the cell switch command. The second scenario is to have the indicated TCI state of the target cell act as the cell switch command. This can be achieved by having the beam indication, when the indicated TCI state is associated with a cell having a PCI different from the PCI of the serving cell (e.g., target cell), act as the trigger for cell switch.

In another embodiment, dynamic switch of serving cell is based on TCI state indication and dynamic cell switch signal.

In one example, first the beam is indicated to target cell; this is then followed by the cell switch command. There are two scenarios for this example: The first scenario is to have the UE start communicating using the indicated TCI state with the target cell before the cell switch command. This would be the case of inter-cell beam management (ICBM). A cell switch command is then followed to complete the handover procedure. The advantage of using ICBM beam management for L1/L2 mobility is to reduce latency, signaling overhead and interruption time. This scenario can be applicable for example, in case of intra-frequency handover when the UE can communicate with the target cell before the cell switch command is received and acted upon. The second scenario is to have the UE not use the indicated TCI state (associated with the serving cell) right away, but rather wait for the cell switch command. When the cell switch command is received the UE uses the indicated TCI state (associated with the serving cell) and starts communicating with the target serving cell. This scenario can be applicable for example, in case of inter-frequency handover when the UE cannot communicate with the target cell before the cell switch command is received.

In one example, CORESET A is a CORESET associated with only USS set, CORESET B is a CORESET associated with only CSS sets, and CORSET C is a CORESET associated with USS set and CSS set.

In another example, CORESET A is a CORESET associated with only USS set and/or Type3-PDCCH CSS set, CORESET B is a CORESET associated with only CSS set other than Type3-PDCCH CSS set, and CORSET C is a CORESET associated with (USS set and/or Type3-PDCCH CSS set) and (CSS set other than Type3-PDCCH CSS set). CORESET C may be associated with both UE-dedicated and non-UE-dedicated (e.g., common channels) reception on PDCCH.

In one example CORESET A, CORESET B and CORESET C exclude CORESET 0. In another example CORESET A, CORESET B and CORESET C include CORESET 0.

In one example, a UE is configured a Common Search Space (CSS) set. A UE is further configured a UE-specific Search Space (USS) set. A UE is further configured (i.e., configured with) a CORESET. The USS set is associated with the CORESET. The CSS set is associated with the CORESET (e.g., CORESET C). The TCI state of the CORESET follows the unified (master or main or indicated) TCI State, or is not configured to not follow the unified (master or main or indicated) TCI State. In one example, a UE is configured a Common Search Space (CSS) set. A UE is further configured a UE-specific Search Space (USS) set. A UE is further configured a CORESET. The USS set and/or Type3-PDCCH CSS set is associated with the CORESET. The CSS set other than Type3-PDCCH CSS set is associated with the CORESET (e.g., CORESET C). The TCI state of the CORESET follows the unified (master or main or indicated) TCI State, or is not configured to not follow the unified (master or main or indicated) TCI State.

In one example, the TCI state of the CORESET (e.g., CORESET C) associated with at least USS set (or USS set and/or Type3-PDCCH CSS) is the unified (master or main or indicated) TCI state by system specification. e.g., any CORESET associated with at least USS set (or USS set and/or Type3-PDCCH CSS) follows the unified (master or main or indicated) TCI state.

In another example, the TCI state of the CORESET (e.g., CORESET C) is the unified (master or main or indicated) TCI state by configuration.

In one example, the CORESET is configured by RRC configuration to follow the unified (master or main or indicated) TCI state. If not configured to follow the unified (master or main or indicated) TCI state, the CORESET is configured and/or activated a TCI state or quasi-co-location/spatial relation by RRC and/or MAC CE signaling and/or quasi-co-location and/or spatial filter identified during a random access procedure (e.g., not initiated by a PDCCH order that triggers a contention-free random access).

In one example, the CORESET is not configured by RRC configuration to not follow the unified (master or main or indicated) TCI state. If configured to not follow the unified (master or main or indicated) TCI state, the CORESET is configured and/or a TCI state or quasi-co-location/spatial relation is activated by RRC and/or MAC CE signaling and/or quasi-co-location and/or spatial filter identified during a random access procedure (e.g., not initiated by a PDCCH order that triggers a contention-free random access).

In another example, a CORESET is configured/updated by a MAC CE to follow the unified (master or main or indicated) TCI state. If not configured or activated or updated to follow the unified (master or main or indicated) TCI state, the CORESET is configured and/or activated a TCI state by MAC CE signaling.

In another example, a CORESET is not configured/updated by a MAC CE to not follow the unified (master or main or indicated) TCI state. If configured or activated or updated to not follow the unified (master or main or indicated) TCI state, the CORESET is configured and/or activated a TCI state by MAC CE signaling. Wherein, a unified (master or main or indicated) TCI state is signaled to the UE.

The unified (master or main or indicated) TCI state can be one of: In case of joint TCI state indication, wherein a same beam is used for DL and UL channels, a joint TCI state that can be used at least for UE-dedicated DL channels and UE-dedicated UL channels. The DM-RS antenna port associated with DL channels is quasi co-located with reference signals provided by the joint unified (master or main or indicated) TCI state. The DM-RS antenna port associated with UL channels uses a spatial filter provided by the joint unified (master or main or indicated) TCI state. In case of separate TCI state indication, wherein different beams are used for DL and UL channels, a DL TCI state can be used at least for UE-dedicated DL channels. The DM-RS antenna port associated with DL channels is quasi co-located with reference signals provided by the DL unified (master or main or indicated) TCI state. In case of separate TCI state indication, wherein different beams are used for DL and UL channels, a UL TCI state can be used at least for UE-dedicated UL channels. The DM-RS antenna port associated with UL channels uses a spatial filter provided by the UL unified (master or main or indicated) TCI state.

The unified (master or main or indicated) TCI state is TCI state of UE-dedicated reception on PDSCH/PDCCH or dynamic-grant/configured-grant based PUSCH and all of dedicated PUCCH resources.

A MAC CE can activate one or more unified (master or main or indicated) TCI State codepoints, wherein the unified (master or main or indicated) TCI State codepoint can include: In case of joint TCI state indication, wherein a same beam is used for DL and UL channels, a joint TCI state. In case of separate TCI state indication, wherein different beams are used for DL and UL channels, a DL TCI state. In case of separate TCI state indication, wherein different beams are used for DL and UL channels, an UL TCI state. In case of separate TCI state indication, wherein different beams are used for DL and UL channels, a pair of DL TCI state and UL TCI State.

When the MAC CE (activating unified (master or main or indicated) TCI state codepoints) activates one TCI state codepoint, the codepoint is applied to DL and UL channels. When the MAC CE activates more than one codepoint, a unified (master or main or indicated) TCI state codepoint is indicated to the UE by DL related DCI with or without a DL assignment.

In one example, the DL TCI state or Joint TCI indicated to the UE as a unified (master or main or indicated) TCI state is applied to: The PDCCH channel in a search space associated with the CORESET; DL channels (e.g., PDSCH) associated with a DCI in a PDCCH transmitted in a search space associated with the CORESET. This can include for example: PDSCH with a DL assignment in a DCI in a PDCCH transmitted in a search space associated with the CORESET; PDSCH for SPS activated in a DCI in a PDCCH transmitted in a search space associated with the CORESET.

In one example, the DL TCI state or Joint TCI indicated to the UE as a unified (master or main or indicated) TCI state is applied to:

The PDCCH channel in a USS set and/or Type3-PDCCH CSS set associated with the CORESET, or DL channels (e.g., PDSCH) associated with a DCI in USS set and/or Type3-PDCCH CSS set associated with the CORESET. This can include for example: PDSCH with a DL assignment in a DCI in a PDCCH transmitted in a USS set and/or Type3-PDCCH CSS set associated with the CORESET, or PDSCH for SPS activated in a DCI in a PDCCH transmitted in a USS set and/or Type3-PDCCH CSS set associated with the CORESET.

The PDCCH channel in a CSS set other than Type3-PDCCH CSS set associated with the CORESET, if the signaled unified (or main or master or indicated) TCI state or TCI state codepoint is associated with a PCI of the serving cell.

DL channels (e.g., PDSCH) associated with a DCI in a CSS set other than Type3-PDCCH CSS set associated with the CORESET, if the signaled unified (or main or master or indicated) TCI state or TCI state codepoint is associated with a PCI of the serving cell. This can include for example: PDSCH with a DL assignment in a DCI in a PDCCH transmitted in a CSS set other than Type3-PDCCH CSS set associated with the CORESET; PDSCH for SPS activated in a DCI in a PDCCH transmitted in a CSS set other than Type3-PDCCH CSS set associated with the CORESET.

If the signaled unified (or main or master or indicated) TCI state or TCI state codepoint is associated with a cell having a PCI different from the PCI of the serving cell:

A PDCCH channel in a CSS set other than Type3-PDCCH CSS set associated with the CORESET, doesn't follow the signaled unified (or main or master or indicated) TCI state or TCI state codepoint. The PDCCH channel can: Follow the latest signaled unified (main or master or indicated) TCI state that is associated with the serving cell, or a signaled TCI state or TCI state codepoint associated with the serving cell.

DL channels (e.g., PDSCH) associated with a DCI in a CSS set other than Type3-PDCCH CSS set associated with the CORESET, don't follow the signaled unified (or main or master or indicated) TCI state or TCI state codepoint. The TCI state for these channels can be determined based on the TCI of the corresponding PDCCH as aforementioned. This can include for example: PDSCH with a DL assignment in a DCI in a PDCCH transmitted in a CSS set other than Type3-PDCCH CSS set associated with the CORESET, or PDSCH for SPS activated in a DCI in a PDCCH transmitted in a CSS set other than Type3-PDCCH CSS set associated with the CORESET.

A DL channel assigned by or associated with a DCI in a CSS set other than Type3-PDCCH CSS set can include one or more of: A channel carrying system information with a DL assignment carried by a DCI in PDCCH having a CRC scrambled by SI-RNTI and transmitted in Type0-PDCCH CSS set; A channel carrying other system information with a DL assignment carried by a DCI in PDCCH having a CRC scrambled by SI-RNTI and transmitted in Type0A-PDCCH CSS set; A channel carrying paging or short messages with a DL assignment carried by a DCI in PDCCH having a CRC scrambled by P-RNTI and transmitted in Type2-PDCCH CSS set; A channel associated with the RACH procedure with a DL assignment carried by a DCI in PDCCH having a CRC scrambled by RA-RNTI or TC-RNTI and transmitted in Type1-PDCCH CSS set.

In one example, the DL TCI state or Joint TCI indicated to the UE as a unified (master or main or indicated) TCI state is applied to:

The PDCCH channel in a USS set associated with the CORESET.

DL channels (e.g., PDSCH) associated with a DCI in USS set associated with the CORESET. This can include for example: PDSCH with a DL assignment in a DCI in a PDCCH transmitted in a USS set associated with the CORESET, or PDSCH for SPS activated in a DCI in a PDCCH transmitted in a USS set associated with the CORESET.

The PDCCH channel in a CSS set associated with the CORESET, if the signaled unified (or main or master or indicated) TCI state or TCI state codepoint is associated with a PCI of the serving cell.

DL channels (e.g., PDSCH) associated with a DCI in a CSS set associated with the CORESET, if the signaled unified (or main or master or indicated) TCI state or TCI state codepoint is associated with a PCI of the serving cell. This can include for example: PDSCH with a DL assignment in a DCI in a PDCCH transmitted in a CSS set associated with the CORESET, or PDSCH for SPS activated in a DCI in a PDCCH transmitted in a CSS set associated with the CORESET.

If the signaled unified (or main or master or indicated) TCI state or TCI state codepoint is associated with a cell having a PCI different from the PCI of the serving cell:

A PDCCH channel in a CSS set associated with the CORESET, doesn't follow the signaled unified (or main or master or indicated) TCI state or TCI state codepoint. The PDCCH channel can: Follow the latest signaled unified (main or master or indicated) TCI state that is associated with the serving cell, or a signaled TCI state or TCI state codepoint associated with the serving cell.

DL channels (e.g., PDSCH) associated with a DCI in a CSS set associated with the CORESET, don't follow the signaled unified (or main or master or indicated) TCI state or TCI state codepoint. The TCI state for these channels can be determined based on the TCI of the corresponding PDCCH as aforementioned. This can include for example: PDSCH with a DL assignment in a DCI in a PDCCH transmitted in a CSS set associated with the CORESET, or PDSCH for SPS activated in a DCI in a PDCCH transmitted in a CSS set associated with the CORESET.

A DL channel assigned by or associated with a DCI in a CSS set can include one or more of: A channel carrying system information with a DL assignment carried by a DCI in PDCCH having a CRC scrambled by SI-RNTI and transmitted in Type0-PDCCH CSS set. A channel carrying other system information with a DL assignment carried by a DCI in PDCCH having a CRC scrambled by SI-RNTI and transmitted in Type0A-PDCCH CSS set. A channel carrying paging or short messages with a DL assignment carried by a DCI in PDCCH having a CRC scrambled by P-RNTI and transmitted in Type2-PDCCH CSS set. A channel associated with the RACH procedure with a DL assignment carried by a DCI in PDCCH having a CRC scrambled by RA-RNTI or TC-RNTI and transmitted in Type1-PDCCH CSS set. A Channel transmitted in Type3-PDCCH CSS set with CRC scrambled by one of: INT-RNTI, SFI-RNTI, TPC-PUSCH-RNTI, TPC-PUCCH-RNTI, TPC-SRS-RNTI or CI-RNTI, at least in cells other than the primary cell. A channel with a DL assignment carried by a DCI in PDCCH having a CRC scrambled by C-RNTI. MCS-C-RTNTI, SP-CSI-RNTI, CS-RNTI, SL-RNTI, SL-CS-RNTI, or SL Semi-Persistent Scheduling V-RNTI and transmitted in a common search space.

For example, a non-UE-dedicated DL channel (e.g., common channel) follows the TCI state of a UE-dedicated DL channel.

The UL TCI state or Joint TCI indicated to the UE as a unified (master or main or indicated) TCI state is applied to: UL channels (e.g., PUSCH or PUCCH) associated with a DCI in a PDCCH transmitted in a search space associated with the CORESET. This can include for example: PUSCH with grant in a DCI in a PDCCH transmitted in a search space associated with the CORESET. PUCCH in response to a PDSCH associated with a DL assignment in a DCI in a PDCCH transmitted in a search space associated with the CORESET. PUSCH with configured grant activated by a DCI in a PDCCH transmitted in a search space associated with the CORESET.

A UL channel granted by or associated with a DCI in a CSS set can include: A channel associated with the RACH procedure with a UL grant/DL assignment carried by a DCI in PDCCH having a CRC scrambled by TC-RNTI and transmitted in Type1-PDCCH CSS set; A UL channel associated with a DCI in PDCCH having a CRC scrambled by C-RNTI, MCS-C-RTNTI, SP-CSI-RNTI, CS-RNTI, SL-RNTI, SL-CS-RNTI, or SL Semi-Persistent Scheduling V-RNTI and transmitted in a common search space.

For example, a non-UE-dedicated UL channel (e.g., common channel) follows the TCI state of a UE-dedicated UL channel.

In another example, a non-UE-dedicated DL channel (e.g., common channel) follows the TCI state of a UE-dedicated DL channel when the unified (main or master or indicated) TCI state is associated with a serving cell. A non-UE dedicated DL channel (e.g., common channel) doesn't follow the TCI state of a UE dedicated DL channel when the unified (main or master or indicated) TCI state is associated with a cell having a PCI different from the PCI of the serving cell.

In one example, the UL TCI state or Joint TCI indicated to the UE as a unified (master or main or indicated) TCI state is applied to:

UL channels (e.g., PUSCH or PUCCH) associated with a DCI in a PDCCH transmitted in a USS set and/or Type3-PDCCH CSS set associated with the CORESET. This can include for example: PUSCH with grant in a DCI in a PDCCH transmitted in a USS set and/or Type3-PDCCH CSS set associated with the CORESET, PUCCH in response to a PDSCH associated with a DL assignment in a DCI in a PDCCH transmitted in a USS set and/or Type3-PDCCH CSS set associated with the CORESET, or PUSCH with configured grant activated by a DCI in a PDCCH transmitted in a USS set and/or Type3-PDCCH CSS set associated with the CORESET.

UL channels (e.g., PUSCH or PUCCH) associated with a DCI in a PDCCH transmitted in a CSS set other than Type3-PDCCH CSS set associated with the CORESET, if the signaled unified (or main or master or indicated) TCI state or TCI state codepoint is associated with a PCI of the serving cell. This can include for example: PUSCH with grant in a DCI in a PDCCH transmitted in CSS set other than Type3-PDCCH CSS set associated with the CORESET, PUCCH in response to a PDSCH associated with a DL assignment in a DCI in a PDCCH transmitted in CSS set other than Type3-PDCCH CSS set associated with the CORESET, or PUSCH with configured grant activated by a DCI in a PDCCH transmitted in CSS set other than Type3-PDCCH CSS set associated with the CORESET.

If the signaled unified (or main or master or indicated) TCI state or TCI state codepoint is associated with a cell having a PCI different from the PCI of the serving cell:

A PDCCH channel in a CSS set other than Type3-PDCCH CSS set associated with the CORESET, doesn't follow the signaled unified (or main or master or indicated) TCI state or TCI state codepoint. The PDCCH channel can follow the latest signaled unified (main or master or indicated) TCI state that is associated with the serving cell, or a signaled TCI state or TCI state codepoint associated with the serving cell.

UL channels (e.g., PUSCH or PUCCH) associated with a DCI in a PDCCH transmitted in a CSS set other than Type3-PDCCH CSS set associated with the CORESET, don't follow the signaled unified (or main or master or indicated) TCI state or TCI state codepoint. This can include for example: PUSCH with grant in a DCI in a PDCCH transmitted in CSS set other than Type3-PDCCH CSS set associated with the CORESET, PUCCH in response to a PDSCH associated with a DL assignment in a DCI in a PDCCH transmitted in CSS set other than Type3-PDCCH CSS set associated with the CORESET, or PUSCH with configured grant activated by a DCI in a PDCCH transmitted in CSS set other than Type3-PDCCH CSS set associated with the CORESET.

A UL channel granted by or associated with a DCI in a CSS set other than Type3-PDCCH CSS set can include a channel associated with the RACH procedure with a UL grant/DL assignment carried by a DCI in PDCCH having a CRC scrambled by TC-RNTI and transmitted in Type1-PDCCH CSS set.

In one example, the UL TCI state or Joint TCI indicated to the UE as a unified (master or main or indicated) TCI state is applied to:

UL channels (e.g., PUSCH or PUCCH) associated with a DCI in a PDCCH transmitted in a USS set associated with the CORESET. This can include for example: PUSCH with grant in a DCI in a PDCCH transmitted in a USS set associated with the CORESET, PUCCH in response to a PDSCH associated with a DL assignment in a DCI in a PDCCH transmitted in a USS set associated with the CORESET, or PUSCH with configured grant activated by a DCI in a PDCCH transmitted in a USS set associated with the CORESET.

UL channels (e.g., PUSCH or PUCCH) associated with a DCI in a PDCCH transmitted in a CSS set associated with the CORESET, if the signaled unified (or main or master or indicated) TCI state or TCI state codepoint is associated with a PCI of the serving cell. This can include for example: PUSCH with grant in a DCI in a PDCCH transmitted in CSS set associated with the CORESET, PUCCH in response to a PDSCH associated with a DL assignment in a DCI in a PDCCH transmitted in CSS set associated with the CORESET, or PUSCH with configured grant activated by a DCI in a PDCCH transmitted in CSS set associated with the CORESET.

If the signaled unified (or main or master or indicated) TCI state or TCI state codepoint is associated with a cell having a PCI different from the PCI of the serving cell:

A PDCCH channel in a CSS set associated with the CORESET, doesn't follow the signaled unified (or main or master or indicated) TCI state or TCI state codepoint. The PDCCH channel can follow the latest signaled unified (main or master or indicated) TCI state that is associated with the serving cell, or a signaled TCI state or TCI state codepoint associated with the serving cell.

UL channels (e.g., PUSCH or PUCCH) associated with a DCI in a PDCCH transmitted in a CSS set associated with the CORESET, don't follow the signaled unified (or main or master or indicated) TCI state or TCI state codepoint. This can include for example: PUSCH with grant in a DCI in a PDCCH transmitted in CSS set associated with the CORESET, PUCCH in response to a PDSCH associated with a DL assignment in a DCI in a PDCCH transmitted in CSS set associated with the CORESET, or PUSCH with configured grant activated by a DCI in a PDCCH transmitted in CSS set associated with the CORESET.

A UL channel granted by or associated with a DCI in a CSS set can include: a channel associated with the RACH procedure with a UL grant/DL assignment carried by a DCI in PDCCH having a CRC scrambled by TC-RNTI and transmitted in Type1-PDCCH CSS set, or a UL channel associated with a DCI in PDCCH having a CRC scrambled by C-RNTI. MCS-C-RTNTI, SP-CSI-RNTI, CS-RNTI, SL-RNTI, SL-CS-RNTI, or SL Semi-Persistent Scheduling V-RNTI and transmitted in a common search space.

In another example, a non-UE dedicated UL channel (e.g., common channel) follows the TCI state of a UE dedicated UL channel when the unified (main or master or indicated) TCI state is associated with a serving cell. A non-UE dedicated UL channel (e.g., common channel) doesn't follow the TCI state of a UE dedicated UL channel when the unified (main or master or indicated) TCI state is associated with a cell having a PCI different from the PCI of the serving cell.

In one example, CORESET A is a CORESET associated with only USS set, CORESET B is a CORESET associated with only CSS sets, and CORSET C is a CORESET associated with USS set and CSS set.

In another example, CORESET A is a CORESET associated with only USS set and/or Type3-PDCCH CSS set, CORESET B is a CORESET associated with only CSS set other than Type3-PDCCH CSS set, and CORSET C is a CORESET associated with (USS set and/or Type3-PDCCH CSS set) and (CSS set other than Type3-PDCCH CSS set). CORESET C may be associated with both UE-dedicated and non-UE-dedicated (e.g., common channels) reception on PDCCH.

In one example, CORESET A, CORESET B and CORESET C exclude CORESET 0. In another example CORESET A, CORESET B and CORESET C include CORESET 0.

In one example, a UE is configured a Common Search Space (CSS) set. A UE is further configured a CORESET. The CSS set is associated with the CORESET (e.g., CORESET B). In one example, a UE is configured a Common Search Space (CSS) set other than Type3-PDCCH CSS set. A UE is further configured a CORESET. The CSS set other than Type3-PDCCH CSS set is associated with the CORESET (e.g., CORESET B).

In one example, the TCI state of the CORESET (e.g., CORESET B) is configured to follow the unified (master or main or indicated) TCI state.

In one example, a CORESET (e.g., CORESET B) is configured by RRC configuration to follow the unified (master or main or indicated) TCI state. If not configured to follow the unified (master or main or indicated) TCI state, the CORESET is configured and/or activated a TCI state by RRC and/or MAC CE signaling and/or quasi-co-location and/or spatial filter identified during a random access procedure (e.g., not initiated by a PDCCH order that triggers a contention-free random access).

In one example, a CORESET (e.g., CORESET B) is not configured by RRC configuration to not follow the unified (master or main or indicated) TCI state. If configured to not follow the unified (master or main or indicated) TCI state, the CORESET is configured and/or activated a TCI state by RRC and/or MAC CE signaling and/or quasi-co-location and/or spatial filter identified during a random access procedure (e.g., not initiated by a PDCCH order that triggers a contention-free random access).

In another example, a CORESET (e.g., CORESET B) is configured/updated by a MAC CE to follow the unified (master or main or indicated) TCI state. If not configured or activated or updated to follow the unified (master or main or indicated) TCI state, the CORESET is configured and/or activated a TCI state by MAC CE signaling.

In another example, a CORESET (e.g., CORESET B) is not configured/updated by a MAC CE to not follow the unified (master or main or indicated) TCI state. If configured or activated or updated to not follow the unified (master or main or indicated) TCI state, the CORESET is configured and/or activated a TCI state by MAC CE signaling.

Wherein, a unified (master or main or indicated) TCI state is signaled to the UE. The unified (master or main or indicated) TCI state can be one of:

In case of joint TCI state indication, wherein a same beam is used for DL and UL channels, a joint TCI state that can be used at least for UE-dedicated DL channels and UE-dedicated UL channels. The DM-RS antenna port associated with DL channels is quasi co-located with reference signals provided by the joint unified (master or main or indicated) TCI state. The DM-RS antenna port associated with UL channels uses a spatial filter provided by the joint unified (master or main or indicated) TCI state.

In case of separate TCI state indication, wherein different beams are used for DL and UL channels, a DL TCI state can be used at least for UE-dedicated DL channels. The DM-RS antenna port associated with DL channels is quasi co-located with reference signals provided by the DL unified (master or main or indicated) TCI state.

In case of separate TCI state indication, wherein different beams are used for DL and UL channels, a UL TCI state can be used at least for UE-dedicated UL channels. The DM-RS antenna port associated with UL channels uses a spatial filter provided by the UL unified (master or main or indicated) TCI state.

The unified (master or main or indicated) TCI state is TCI state of UE-dedicated reception on PDSCH/PDCCH or dynamic-grant/configured-grant based PUSCH and all of dedicated PUCCH resources.

A MAC CE can activate one or more unified (master or main or indicated) TCI State codepoints, wherein the unified (master or main or indicated) TCI State codepoint can include: In case of joint TCI state indication, wherein a same beam is used for DL and UL channels, a joint TCI state; In case of separate TCI state indication, wherein different beams are used for DL and UL channels, a DL TCI state; In case of separate TCI state indication, wherein different beams are used for DL and UL channels, an UL TCI state; In case of separate TCI state indication, wherein different beams are used for DL and UL channels, a pair of DL TCI state and UL TCI State.

When the MAC CE (activating unified (master or main or indicated) TCI state codepoints) activates one TCI state codepoint, the codepoint is applied to DL and UL channels. When the MAC CE activates more than one codepoint, a unified (master or main or indicated) TCI state codepoint is indicated to the UE by DL related DCI with or without a DL assignment.

In an example, the DL TCI state or Joint TCI indicated to the UE as a unified (master or main or indicated) TCI state is applied to:

The PDCCH channel in a search space associated with the CORESET;

DL channels (e.g., PDSCH) associated with a DCI in a PDCCH transmitted in a search space associated with the CORESET. This can include for example: PDSCH with a DL assignment in a DCI in a PDCCH transmitted in a search space associated with the CORESET, or PDSCH for SPS activated in a DCI in a PDCCH transmitted in a search space associated with the CORESET.

A DL channel assigned by or associated with a DCI in a CSS set can include one or more of:

A channel carrying system information with a DL assignment carried by a DCI in PDCCH having a CRC scrambled by SI-RNTI and transmitted in Type0-PDCCH CSS set;

A channel carrying other system information with a DL assignment carried by a DCI in PDCCH having a CRC scrambled by SI-RNTI and transmitted in Type0A-PDCCH CSS set;

A channel carrying paging or short messages with a DL assignment carried by a DCI in PDCCH having a CRC scrambled by P-RNTI and transmitted in Type2-PDCCH CSS set;

A channel associated with the RACH procedure with a DL assignment carried by a DCI in PDCCH having a CRC scrambled by RA-RNTI or TC-RNTI and transmitted in Type1-PDCCH CSS set;

A channel transmitted in Type3-PDCCH CSS set with CRC scrambled by one of: INT-RNTI, SFI-RNTI, TPC-PUSCH-RNTI, TPC-PUCCH-RNTI, TPC-SRS-RNTI or CI-RNTI, at least in cells other than the primary cell;

A channel with a DL assignment carried by a DCI in PDCCH having a CRC scrambled by C-RNTI. MCS-C-RTNTI, SP-CSI-RNTI, CS-RNTI, SL-RNTI, SL-CS-RNTI, or SL Semi-Persistent Scheduling V-RNTI and transmitted in a common search space.

In an example, a non-UE dedicated DL channel (e.g., common channel) follows the TCI state of a UE dedicated DL channel.

In an example, the UL TCI state or Joint TCI indicated to the UE as a unified (master or main or indicated) TCI state is applied to UL channels (e.g., PUSCH or PUCCH) associated with a DCI in a PDCCH transmitted in a search space associated with the CORESET. This can include for example: PUSCH with grant in a DCI in a PDCCH transmitted in a search space associated with the CORESET, PUCCH in response to a PDSCH associated with a DL assignment in a DCI in a PDCCH transmitted in a search space associated with the CORESET, or PUSCH with configured grant activated by a DCI in a PDCCH transmitted in a search space associated with the CORESET.

A UL channel granted by or associated with a DCI in a CSS set can include:

A channel associated with the RACH procedure with a UL grant/DL assignment carried by a DCI in PDCCH having a CRC scrambled by TC-RNTI and transmitted in Type1-PDCCH CSS set;

A UL channel associated with a DCI in PDCCH having a CRC scrambled by C-RNTI. MCS-C-RTNTI, SP-CSI-RNTI, CS-RNTI, SL-RNTI, SL-CS-RNTI, or SL Semi-Persistent Scheduling V-RNTI and transmitted in a common search space.

In an example, a non-UE dedicated UL channel (e.g., common channel) follows the TCI state of a UE dedicated UL channel.

In one example:

The CORESET associated with CSS set, (e.g., Type0-PDCCH CSS set and/or Type0A-PDCCH CSS set and/or Type1-PDCCH CSS set and/or Type2-PDCCH CSS set) follows the unified (or master or main or indicated) TCI state, and the unified (or master or main or indicated) TCI state or TCI state codepoint is associated with an SSB of the source serving cell, and the UE is signaled a unified (or master or main or indicated) TCI state or TCI state codepoint associated with an SSB of a cell having a PCI different from the PCI of the source serving cell (e.g., the PCI is associated with a target serving cell) (in one example, the signaled TCI state is in a cell switch command), then at the time of beam application of the TCI state the UE switches from the source serving cell to the target serving cell. The UE receives the common channels (e.g., channels associated with a CSS set (e.g., Type0-PDCCH CSS set and/or Type0A-PDCCH CSS set and/or Type1-PDCCH CSS set and/or Type2-PDCCH CSS set) using the unified (or master or main or indicated) TCI state associated with an SSB associated with the PCI of the target serving cell.

In one example:

The CORESET associated with CSS set, (e.g., Type0-PDCCH CSS set and/or Type0A-PDCCH CSS set and/or Type1-PDCCH CSS set and/or Type2-PDCCH CSS set and/or Type3-PDCCH CSS set) follows the unified (or master or main or indicated) TCI state, and the unified (or master or main or indicated) TCI state or TCI state codepoint is associated with an SSB of the source serving cell, and the UE is signaled a unified (or master or main or indicated) TCI state or TCI state codepoint associated with an SSB of a cell having a PCI different from the PCI of the source serving cell (e.g., the PCI is associated with a target serving cell) (in one example, the signaled TCI state is in a cell switch command), then at the time of beam application of the TCI state the UE switches from the source serving cell to the target serving cell. The UE receives the common channels (e.g., channels associated with a CSS set (e.g., Type0-

PDCCH CSS set and/or Type0A-PDCCH CSS set and/or Type1-PDCCH CSS set and/or Type2-PDCCH CSS set and/or Type3-PDCCH CSS set) using the unified (or master or main or indicated) TCI state associated with an SSB associated with the PCI of the target serving cell.

In one example:

The CORESET associated with (USS set and/or Type3-PDCCH CSS set) and/or other CSS set, (e.g., Type0-PDCCH CSS set and/or Type0A-PDCCH CSS set and/or Type1-PDCCH CSS set and/or Type2-PDCCH CSS set) follows the unified (or master or main or indicated) TCI state, and the unified (or master or main or indicated) TCI state or TCI state codepoint is associated with an SSB of the source serving cell, and the UE is signaled a unified (or master or main or indicated) TCI state or TCI state codepoint associated with an SSB of a cell having a PCI different from the PCI of the source serving cell (e.g., the PCI is associated with a target serving cell) (in one example, the signaled TCI state is in a cell switch command), then at the time of beam application of the TCI state the UE switches from the source serving cell to the target serving cell. The UE receives the common channels (e.g., channels associated with a CSS set (e.g., Type0-PDCCH CSS set and/or Type0A-PDCCH CSS set and/or Type1-PDCCH CSS set and/or Type2-PDCCH CSS set) using the unified (or master or main or indicated) TCI state associated with an SSB associated with the PCI of the target serving cell.

In one example:

The CORESET associated with USS set and/or CSS set, (e.g., Type0-PDCCH CSS set and/or Type0A-PDCCH CSS set and/or Type1-PDCCH CSS set and/or Type2-PDCCH CSS set and/or Type3-PDCCH CSS set) follows the unified (or master or main or indicated) TCI state, and the unified (or master or main or indicated) TCI state or TCI state codepoint is associated with an SSB of the source serving cell, and the UE is signaled a unified (or master or main or indicated) TCI state or TCI state codepoint associated with an SSB of a cell having a PCI different from the PCI of the source serving cell (e.g., the PCI is associated with a target serving cell) (in one example, the signaled TCI state is in a cell switch command), then at the time of beam application of the TCI state the UE switches from the source serving cell to the target serving cell. The UE receives the common channels (e.g., channels associated with a CSS set (e.g., Type0-PDCCH CSS set and/or Type0A-PDCCH CSS set and/or Type1-PDCCH CSS set and/or Type2-PDCCH CSS set and/or Type3-PDCCH CSS set) using the unified (or master or main or indicated) TCI state associated with an SSB associated with the PCI of the target serving cell.

In one example:

The CSS set, (e.g., Type0-PDCCH CSS set and/or Type0A-PDCCH CSS set and/or Type1-PDCCH CSS set and/or Type2-PDCCH CSS set) follows the unified (or master or main or indicated) TCI state, and the unified (or master or main or indicated) TCI state or TCI state codepoint is associated with an SSB of the source serving cell, and the UE is signaled a unified (or master or main or indicated) TCI state or TCI state codepoint associated with an SSB of a cell having a PCI different from the PCI of the source serving cell (e.g., the PCI is associated with a target serving cell) (in one example, the signaled TCI state is in a cell switch command), then at the time of beam application of the TCI state the UE switches from the source serving cell to the target serving cell. The UE receives the common channels (e.g., channels associated with a CSS set (e.g., Type0-PDCCH CSS set and/or Type0A-PDCCH CSS set and/or Type1-PDCCH CSS set and/or Type2-PDCCH CSS set) using the unified (or master or main or indicated) TCI state associated with an SSB associated with the PCI of the target serving cell.

In one example:

The with CSS set, (e.g., Type0-PDCCH CSS set and/or Type0A-PDCCH CSS set and/or Type1-PDCCH CSS set and/or Type2-PDCCH CSS set and/or Type3-PDCCH CSS set) follows the unified (or master or main or indicated) TCI state, and the unified (or master or main or indicated) TCI state or TCI state codepoint is associated with an SSB of the source serving cell, and the UE is signaled a unified (or master or main or indicated) TCI state or TCI state codepoint associated with an SSB of a cell having a PCI different from the PCI of the source serving cell (e.g., the PCI is associated with a target serving cell) (in one example, the signaled TCI state is in a cell switch command), then at the time of beam application of the TCI state the UE switches from the source serving cell to the target serving cell. The UE receives the common channels (e.g., channels associated with a CSS set (e.g., Type0-PDCCH CSS set and/or Type0A-PDCCH CSS set and/or Type1-PDCCH CSS set and/or Type2-PDCCH CSS set and/or Type3-PDCCH CSS set) using the unified (or master or main or indicated) TCI state associated with an SSB associated with the PCI of the target serving cell.

Figure 8:
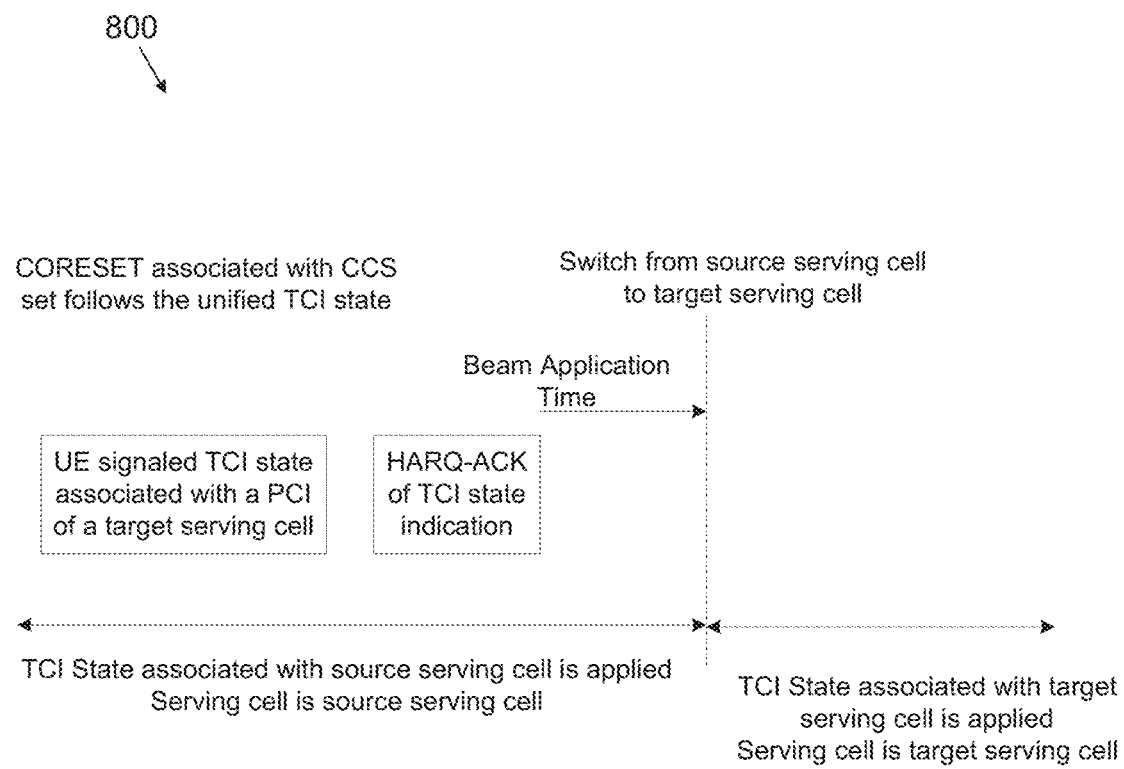
FIG. 8 illustrates an example of a CORESET associated with a CSS set following one of the aforementioned examples, wherein the TCI state used by the UE is, initially, a TCI state associated with source serving cell according to embodiments of the present disclosure.

FIG. 8 illustrates an example diagram 800 of a CORESET associated with a CSS set following one of the aforementioned examples, wherein the TCI state used by the UE is, initially, a TCI state associated with source serving cell. The serving cell of the UE is the source serving cell. The embodiment of the diagram 800 shown in FIG. 8 is for illustration only. Other embodiments could be used without departing from the scope of this disclosure. A UE signaled a TCI state (this is the unified (or main or master or indicated) TCI state or TCI state codepoint) associated with a cell having a PCI different from the PCI of the source serving cell (e.g., the PCI of a target serving cell). The TCI state (or TCI state codepoint) can be signaled by a DCI Format (e.g., DCI Format 1_1 or DCI Format 1_2 with a DL assignment or without a DL assignment) if more than one TCI state codepoint is activated by MAC CE. The TCI state (or TCI state codepoint) can be signaled by a MAC CE if one TCI state codepoint is activated by MAC CE. After a beam application time from the hybrid automatic repeat request acknowledgement (HARQ-ACK) of the channel conveying the TCI state (or TCI state codepoint), the signaled TCI state is applied and the UE switches from the source serving cell to the destination serving cell.

FIG. 8 illustrates the indication of a TCI state associated with a cell (e.g., the target cell) having a PCI different from the PCI of the serving cell. The cell switch can happen at the application time of the TCI state (whether the TCI state is included in the cell switch command as aforementioned, or the TCI state indication itself triggers cell switch as aforementioned), this would lead to a fast cell switch time (or cell switch application time), e.g., faster than having the cell switch command and the TCI state indication for the target serving cell performed at different times. In one example the HARQ-ACK that causes the beam update carries a positive acknowledgment. In another example, the HARQ-ACK that causes the beam update carries a positive acknowledgment or a negative acknowledgment. In a variant example, the beam application time starts from the end of the channel that carriers the beam indication. In one example, the beam application time can equal the cell switch time (as shown in FIG. 8), i.e., beam application and cell switch happen at the same time. In another example, the beam application time can be more than the cell switch time, i.e., the cell switch happens first then the beam application of the indicated TCI state happens. In another example, the beam application time can be less than the cell switch time, i.e., the beam application of the indicated TCI state happens first then the cell switch happens.

In one example, a UE can be further configured by additional configuration whether to switch from a source serving cell to a second cell with a PCI different from the PCI of the source serving cell, when switching from a TCI state associated with the source serving cell to a TCI state associated with the second cell having a PCI different from the PCI of the source serving cell.

In one example, the UE is configured to not switch serving cells when switching TCI states (or if the UE is not configured to switch serving cells when switching TCI states), the UE is indicated with a TCI state associated with the second cell having a PCI different from the PCI of the serving cell, and after a beam application delay, the UE receives and/or transmits UE dedicated channels and signals that follow the indicated TCI state using the indicated TCI state (associated with the second cell having a PCI different from the PCI of the source serving cell). The UE doesn't switch serving cells.

Furthermore, one of the following sub-examples can apply:

In one example, the UE doesn't receive or transmit non-UE dedicated channels (common channels).

In one example, the UE is signaled a second TCI state (or TCI state codepoint) associated with the source serving cell and uses the second TCI state to receive or transmit non-UE dedicated channels (common channels).

In one example, let the latest signaled or indicated TCI state or TCI state codepoint associated with the source serving cell be T_1 (this is the TCI state the UE used when it received a TCI state associated with the second serving cell), the UE uses TCI state T_1 to receive or transmit non-UE dedicated channels (common channels).

In one example, if the UE is configured to switch serving cells when switching TCI states (or if the UE is not configured to not switch serving cells when switching TCI states), the UE is indicated with a TCI state associated with the second cell having a PCI different from the PCI of the serving cell, and after a beam application delay, the UE receives and/or transmits UE dedicated channels and signals that follow the indicated TCI state and non-UE dedicated channels (common channels) using the indicated TCI state (associated with the second cell having a PCI different from the PCI of the source serving cell), then after a beam application, the UE switches from a source serving cell to the second cell, i.e., the second cell is the target serving cell.

In one example, the beam application time, e.g., associated with a serving cell (e.g., cell switch time), can be determined based on the one or more of the following examples:

In one example, the start (reference) of the beam application time can be one of the following:

In one example, the beam application time is after the start of the channel conveying the TCI state or TCI state codepoint.

In one example, the beam application time is after the end of the channel conveying the TCI state or TCI state codepoint.

In one example, the beam application time is after the start of the channel conveying HARQ-ACK to the channel conveying the TCI state or TCI state codepoint.

In one example, the beam application time is after the end of the channel conveying HARQ-ACK to the channel conveying the TCI state or TCI state codepoint.

In one example, the dependence of beam application of serving cell switch can be one of the following:

In one example, one beam application time is configured or determined whether the TCI state switch is associated with a change of serving cell, or the TCI state switch is not associated with a change in serving cell.

In one example, a first beam application time is configured or determined to be used when the cell associated with the source TCI state and the cell associated with the target TCI state is the same. A second beam application time is configured or determined to be used when the cell associated with the source TCI state and the cell associated with the target TCI state are different. In this example, there is no change in serving cell.

In one example, a first beam application time is configured or determined to be used when the cell associated with the source TCI state and the cell associated with the target TCI state is the same (and no serving cell change). A second beam application time is configured or determined to be used when the cell associated with the source TCI state and the cell associated with the target TCI state are different (and serving cell change). In this example, the serving cell changes from a source serving cell which is associated with the source TCI state, to a target serving cell associated with the target TCI state.

In one example, the time of beam application, e.g., associated with a serving cell change (e.g., cell switch time), can be one of the following:

In one example, a beam is applied at the first slot boundary at or after the end of the beam application time period.

In one example, a beam is applied at the first sub-frame boundary at or after the end of the beam application time period.

In one example, a beam is applied at the first frame boundary at or after the end of the beam application time period.

In one example, a beam is applied at the first symbol boundary at or after the end of the beam application time period.

In one example, a beam is applied after the end of the beam application time period.

In one example, the beam application time is configured by higher layers (e.g., RRC configuration and/or MAC CE configuration/update). In case of CA, when multiple carriers (e.g., a list of carriers) follow the same TCI state or TCI state identifier (ID) or TCI state codepoint, the beam application time (e.g., this can be the cell switch time as aforementioned) is determined based on the carrier (out of the multiple or list of carriers) that is one of the following:

In one example, the carrier with smallest sub-carrier spacing.

In one example, the carrier with largest sub-carrier spacing.

In one example, the carrier/BWP among the configured BWPs in all the carriers in the list with the smallest sub-carrier spacing.

In one example, the carrier/BWP among the configured BWPs in all the carriers in the list with the largest sub-carrier spacing.

In one example, the carrier/BWP among the active BWPs in all the carriers in the list with the smallest sub-carrier spacing.

In one example, the carrier/BWP among the active BWPs in all the carriers in the list with the largest sub-carrier spacing.

In one example, if more than one carrier (from the list) or more than one carrier (from the list)/BWP has the smallest (or largest) sub-carrier spacing, the UE expects that the configured beam application time, if any, is the same across all of these.

In one example, only one beam application time is configured for the carriers (from the list) or the carriers (from the list)/BWP with the smallest (or largest) sub-carrier spacing.

In one example, the beam application time depends on a UE-capability.

In one example, a UE is indicated a DL TCI state associated with a first cell, and TCI state associated with a second cell.

In one example, a UE determines the serving cell based on the DL TCI state (e.g., the cell with a PCI associated with the DL TCI state).

In one example, a UE determines the serving cell based on the UL TCI state (e.g., the cell with a PCI associated with the UL TCI state).

In one example, a UE determines the serving cell based on the Joint TCI state (e.g., the cell with a PCI associated with the Joint TCI state).

In one example, a UE determines the serving cell based on the DL TCI state or the Joint TCI state (e.g., the cell with a PCI associated with the DL TCI state or the Joint TCI state).

In one example, a UE determines the serving cell based on the UL TCI state or the Joint TCI state (e.g., the cell with a PCI associated with the UL TCI state or the Joint TCI state).

In one example, a UE uses a first DL TCI state associated with a source serving cell and a first UL TCI associated with the source serving cell. The UE is first signaled a second DL TCI state associated with a second cell with a PCI different from the PCI of the source serving cell. The UE applies the second DL TCI at its corresponding beam application time. There is no serving cell switch at this time. The UE is then signaled a second UL TCI state associated with the second cell. The UE applies the second UL TCI at its corresponding beam application time. There is a corresponding change in serving cell from the source serving cell to the second cell, the second cell is the target serving cell. The change in serving cell happens after both the UL TCI and DL TCI states change to be corresponding to the second cell. In one example, the DL and UL TCI states are indicated in the same codepoint (e.g., at the same time). In one example, DL and UL TCI states are indicated in the different codepoints (e.g., at different times).

In one example, a UE uses a first DL TCI state associated with a source serving cell and a first UL TCI associated with the source serving cell. The UE is first signaled a second UL TCI state associated with a second cell with a PCI different from the PCI of the source serving cell. The UE applies the second UL TCI at its corresponding beam application time. There is no serving cell switch at this time. The UE is then signaled a second DL TCI state associated with the second cell. The UE applies the second DL TCI at its corresponding beam application time. There is a corresponding change in serving cell from the source serving cell to the second cell, the second cell is the target serving cell. The change in serving cell happens after both the UL TCI and DL TCI states change to be corresponding to the second cell. In one example, the DL and UL TCI states are indicated in the same codepoint (e.g., at the same time). In one example, DL and UL TCI states are indicated in the different codepoints (e.g., at different times).

In one example, a UE has a spatial filter with a TCI state associated with a first cell or first group (list) of cells. A first C-RNTI is used to receive and/or transmit channels or signals to/from the UE from/to the first cell or first group (list) of cells. The network indicates a beam (e.g., TCI state or TCI state codepoint) with a TCI state associated with a second cell or second group (list) of cells having a PCI different from the PCI of the first cell. The network can indicate and/or configure a second C-RNTI to receive and/or transmit channels or signals to/from the UE from/to the second cell or second group (list) of cells.

In one embodiment, the first cell or first group (list) of cells can be a source serving cell or a group (list) of source serving cells, the second cell or second group (list) of cells can be a target serving cell or a group (list) of target serving cells, wherein the UE switches from the source serving cells (or group (list) of cells) to the target serving cell (or group (list) of cells) at the time of application of the TCI state associated with the target serving cell (or group (list) of cells) (second cell (or group (list) of cells)).

In one embodiment, a group of cells are cells in a list (e.g., carrier aggregation list) that follow a same unified (or main or master or indicated) TCI state or TCI state ID or TCI state codepoint. In one example, a group (list) of cells share a same PCI.

In one example, the same C-RNTI is used in the first cell (or group (list) of cells), and in the second cell (or group (list) of cells). There is no additional configuration or signaling of a C-RNTI for the second cell (or group (list) of cells).

In another example, the C-RNTI can be different between the first cell (or group (list) of cells), and the second cell (or group (list) of cells).

In one example, a second C-RNTI is configured by RRC signaling ahead of a beam change to the second cell or group of cells. When a beam (e.g., a TCI state or TCI state ID or TCI state codepoint) is indicated to the UE that is associated with the second cell (or group (list) of cells), the second C-RNTI becomes active at the time of application of the beam (e.g., a TCI state or TCI state ID or TCI state codepoint) of the second cell (or group (list) of cells.

In one example, a C-RNTI is configured for a next target serving cell (or group (list) of cells). When a beam (e.g., a TCI state or TCI state ID or TCI state codepoint) is indicated for a target serving cell (or a group (list) of cells) the C-RNTI becomes active at the corresponding beam application time.

In another example, a C-RNTI is configured for each target serving cell (or each group (list) of cells). When a beam (e.g., a TCI state or TCI state ID or TCI state codepoint) is indicated for a target serving cell (or a group (list) of cells) the C-RNTI corresponding to the cell (or group (list) of cells) becomes active at the corresponding beam application time.

In another example, a second C-RNTI is indicated by MAC CE signaling.

In one example, the second C-RNTI is indicated by and included in the MAC CE message that activates the TCI state codepoints of the second cell (or the group (list) of cells). When a beam (e.g., a TCI state or TCI state ID or TCI state codepoint) is indicated for a second cell (or group (list) of cells) the C-RNTI becomes active at the corresponding beam application time.

In a variant of example, a set of C-RNTI values can be configured by RRC signaling, the MAC CE message indicates one of these configured values.

In another example, the second C-RNTI is indicated by a MAC CE message separate from the MAC CE message that activates the TCI state codepoints of the second cell (or the group (list) of cells). When a beam (e.g., a TCI state or TCI state ID or TCI state codepoint) is indicated for a second cell (or group (list) of cells) the C-RNTI becomes active at the corresponding beam application time.

In a variant of example, a set of C-RNTI values can be configured by RRC signaling, the MAC CE message indicates one of these configured values.

In another example, a second C-RNTI is indicated by DCI signaling.

In one example, the second C-RNTI is indicated by and included in the DCI that indicates the TCI state(s) TCI state codepoint(s) of the second cell (or second group (list) of cells). The C-RNTI becomes active at the corresponding beam application time.

In a variant of example, a set of C-RNTI values can be configured by RRC signaling and/or MAC CE signaling, the DCI signal indicates one of these configured values.

In another example, the second C-RNTI is indicated by a DCI separate from the DCI that indicates the TCI state(s) or TCI state codepoint(s) of the second cell (or the group (list) of cells). When a beam (e.g., a TCI state or TCI state ID or TCI state codepoint) is indicated for a second cell (or group (list) of cells) the C-RNTI becomes active at the corresponding beam application time.

In a variant of example, a set of C-RNTI values can be configured by RRC signaling, the MAC CE message indicates one of these configured values.

In another example, there is no C-RNTI in the DCI that indicates the TCI state(s) or TCI codepoint(s) of the second cell (or group of cells). The C-RNTI is determined implicitly based on prior RRC and/or MAC CE configuration, and becomes active at the corresponding beam application time.

In another example, the second C-RNTI scrambles the CRC of the channel conveying the beam indication (e.g., a TCI state or TCI state ID or TCI state codepoint). In this example, the channel conveying the beam indication can be a DCI Format and the C-RNTI scrambles the CRC of the DCI format. This could require the UE to do hypothesis testing for multiple C-RNTI values to determine the C-RNTI of beam indication.

In one example, the second C-RNTI is applied starting from the time of receiving the channel conveying the beam indication (e.g., a TCI state or TCI state ID or TCI state codepoint) with a CRC scrambled by the second C-RNTI.

In another example, the second C-RNTI is applied starting from beam application time of the beam indication (e.g., a TCI state or TCI state ID or TCI state codepoint) conveyed by the channel with a CRC scrambled by the second C-RNTI.

In one example, a UE is configured a Common Search Space (CSS) set. A UE is further configured a first UE-specific Search Space (USS) set. A UE is further configured a first CORESET. The first USS set is associated with the first CORESET. The CSS set is associated with the first CORESET (e.g., CORESET C). The TCI state of the first CORESET doesn't follow the unified (master or main or indicated) TCI State, or is configured to not follow the unified (master or main or indicated) TCI State. The UE can be further configured a second USS set, and the UE is further configured a second CORESET. The second USS set is associated with the second CORESET (e.g., CORESET A). The TCI state of the second CORESET follows the unified (master or main or indicated) TCI State, or is not configured to not follow the unified (master or main or indicated) TCI State.

In one example, a UE is configured a Common Search Space (CSS) set. A UE is further configured a first UE-specific Search Space (USS) set. A UE is further configured a first CORESET. The first USS set and/or Type3-PDCCH CSS set is associated with the CORESET. The CSS set other than Type3-PDCCH CSS set is associated with the first CORESET (e.g., CORESET C). The TCI state of the first CORESET doesn't follow the unified (master or main or indicated) TCI State, or is configured to not follow the unified (master or main or indicated) TCI State. The UE can be further configured a second USS set and/or Type3-PDCCH CSS set, and the UE is further configured a second CORESET. The second USS set and/or Type3-PDCCH CSS set is associated with the second CORESET (e.g., CORESET A). The TCI state of the second CORESET follows the unified (master or main or indicated) TCI State, or is not configured to not follow the unified (master or main or indicated) TCI State.

In an alternative example, the TCI state of the first CORESET (e.g., CORESET C) associated with at least CSS set (or CSS set other than Type3-PDCCH CSS) is not the unified (master or main or indicated) TCI state by system specification. e.g., any CORESET associated with at least CSS set (or CSS set other than Type3-PDCCH CSS) doesn't follow the unified (master or main or indicated) TCI state.

In another alternative example, the TCI state of the first CORESET (e.g., CORESET C) is not the unified (master or main or indicated) TCI state by configuration.

In one alternative example, the first CORESET is not configured by RRC configuration to follow the unified (master or main or indicated) TCI state. For example, the CORESET is configured and/or activated a TCI state or quasi-co-location/spatial relation by RRC and/or MAC CE signaling and/or quasi-co-location and/or spatial filter identified during a random access procedure (e.g., not initiated by a PDCCH order that triggers a contention-free random access).

In one alternative example, the first CORESET is configured by RRC configuration to not follow the unified (master or main or indicated) TCI state. For example, the CORESET is configured and/or activated a TCI state or quasi-co-location/spatial relation by RRC and/or MAC CE signaling and/or quasi-co-location and/or spatial filter identified during a random access procedure (e.g., not initiated by a PDCCH order that triggers a contention-free random access).

In another alternative example, the first CORESET is configured/updated by a MAC CE to not follow the unified (master or main or indicated) TCI state. For example, the CORESET is configured and/or activated a TCI state by MAC CE signaling.

In another alternative example, the first CORESET is not configured/updated by a MAC CE to follow the unified (master or main or indicated) TCI state. For example, the CORESET is configured and/or activated a TCI state by MAC CE signaling.

In one example, the TCI state of the second CORESET (e.g., CORESET A) associated with USS set (or USS set and/or Type3-PDCCH CSS) is the unified (master or main or indicated) TCI state by system specification. e.g., any CORESET associated with at least USS set (or USS set and/or Type3-PDCCH CSS) follows the unified (master or main or indicated) TCI state.

In another alternative example, the TCI state of the second CORESET (e.g., CORESET A) is the unified (master or main or indicated) TCI state by configuration.

In one alternative example, the second CORESET is configured by RRC configuration to follow the unified (master or main or indicated) TCI state. If not configured to follow the unified (master or main or indicated) TCI state, the CORESET is configured and/or activated a TCI state or quasi-co-location/spatial relation by RRC and/or MAC CE signaling and/or quasi-co-location and/or spatial filter identified during a random access procedure (e.g., not initiated by a PDCCH order that triggers a contention-free random access).

In one alternative example, the second CORESET is not configured by RRC configuration to not follow the unified (master or main or indicated) TCI state. If configured to not follow the unified (master or main or indicated) TCI state, the CORESET is configured and/or activated a TCI state or quasi-co-location/spatial relation by RRC and/or MAC CE signaling and/or quasi-co-location and/or spatial filter identified during a random access procedure (e.g., not initiated by a PDCCH order that triggers a contention-free random access).

In another alternative example, a second CORESET is configured/updated by a MAC CE to follow the unified (master or main or indicated) TCI state. If not configured or activated or updated to follow the unified (master or main or indicated) TCI state, the CORESET is configured and/or activated a TCI state by MAC CE signaling.

In another alternative example, a second CORESET is not configured/updated by a MAC CE to not follow the unified (master or main or indicated) TCI state. If configured or activated or updated to not follow the unified (master or main or indicated) TCI state, the CORESET is configured and/or activated a TCI state by MAC CE signaling.

Wherein, a unified (master or main or indicated) TCI state is signaled to the UE. The unified (master or main or indicated) TCI state can be one of:

In case of joint TCI state indication, wherein a same beam is used for DL and UL channels, a joint TCI state that can be used at least for UE-dedicated DL channels and UE-dedicated UL channels. The DM-RS antenna port associated with DL channels is quasi co-located with reference signals provided by the joint unified (master or main or indicated) TCI state. The DM-RS antenna port associated with UL channels uses a spatial filter provided by the joint unified (master or main or indicated) TCI state;

In case of separate TCI state indication, wherein different beams are used for DL and UL channels, a DL TCI state can be used at least for UE-dedicated DL channels. The DM-RS antenna port associated with DL channels is quasi co-located with reference signals provided by the DL unified (master or main or indicated) TCI state;

In case of separate TCI state indication, wherein different beams are used for DL and UL channels, a UL TCI state can be used at least for UE-dedicated UL channels. The DM-RS antenna port associated with UL channels uses a spatial filter provided by the UL unified (master or main or indicated) TCI state.

The unified (master or main or indicated) TCI state is TCI state of UE-dedicated reception on PDSCH/PDCCH or dynamic-grant/configured-grant based PUSCH and all of dedicated PUCCH resources.

A MAC CE can activate one or more unified (master or main or indicated) TCI State codepoints, wherein the unified (master or main or indicated) TCI State codepoint can include:

In case of joint TCI state indication, wherein a same beam is used for DL and UL channels, a joint TCI state;

In case of separate TCI state indication, wherein different beams are used for DL and UL channels, a DL TCI state;

In case of separate TCI state indication, wherein different beams are used for DL and UL channels, an UL TCI state;

In case of separate TCI state indication, wherein different beams are used for DL and UL channels, a pair of DL TCI state and UL TCI State.

When the MAC CE (activating unified (master or main or indicated) TCI state codepoints) activates one TCI state codepoint, the codepoint is applied to DL and UL channels. When the MAC CE activates more than one codepoint, a unified (master or main or indicated) TCI state codepoint is indicated to the UE by DL related DCI with or without a DL assignment.

In one example, following the aforementioned description, a first CORESET is CORESET C, and a second CORESET is CORESET A. CORESET C doesn't follow the signaled unified (main or master or indicated) TCI state or TCI state codepoint. CORESET A follows the signaled unified (main or master or indicated) TCI state or TCI state codepoint.

In an alternative example, CORESET A is a CORESET associated with only USS set, CORESET B is a CORESET associated with only CSS sets, and CORSET C is a CORESET associated with USS set and CSS set.

In another example, CORESET A is a CORESET associated with only USS set and/or Type3-PDCCH CSS set, CORESET B is a CORESET associated with only CSS set other than Type3-PDCCH CSS set, and CORSET C is a CORESET associated with (USS set and/or Type3-PDCCH CSS set) and (CSS set other than Type3-PDCCH CSS set). CORESET C may be associated with both UE-dedicated and non-UE-dedicated (e.g., common channels) reception on PDCCH.

In one example CORESET A, CORESET B and CORESET C exclude CORESET 0. In another example CORESET A, CORESET B and CORESET C include CORESET 0.

In one example, a UE is configured a Common Search Space (CSS) set. A UE is further configured a first CORESET. The CSS set is associated with the CORESET (e.g., CORESET B). The UE can be further configured a USS set, and the UE is further configured a second CORESET. The USS set is associated with the second CORESET (e.g., CORESET A). The TCI state of the second CORESET follows the unified (master or main or indicated) TCI State, or is not configured to not follow the unified (master or main or indicated) TCI State.

In one example, a UE is configured a Common Search Space (CSS) set other than Type3-PDCCH CSS set. A UE is further configured a CORESET. The CSS set other than Type3-PDCCH CSS set is associated with the CORESET (e.g., CORESET B). The UE can be further configured a USS set and/or Type3-PDCCH CSS set, and the UE is further configured a second CORESET. The USS set and/or Type3-PDCCH CSS set is associated with the second CORESET (e.g., CORESET A). The TCI state of the second CORESET follows the unified (master or main or indicated) TCI State, or is not configured to not follow the unified (master or main or indicated) TCI State.

In one alternative example, the TCI state of the CORESET (e.g., CORESET B) is configured to not follow the unified (master or main or indicated) TCI state.

In one alternative example, a CORESET (e.g., CORESET B) is configured by RRC configuration to follow the unified (master or main or indicated) TCI state. If not configured to follow the unified (master or main or indicated) TCI state, the CORESET is configured and/or activated a TCI state by RRC and/or MAC CE signaling and/or quasi-co-location and/or spatial filter identified during a random access procedure (e.g., not initiated by a PDCCH order that triggers a contention-free random access).

In one alternative example, a CORESET (e.g., CORESET B) is not configured by RRC configuration to not follow the unified (master or main or indicated) TCI state. If configured to not follow the unified (master or main or indicated) TCI state, the CORESET is configured and/or activated a TCI state by RRC and/or MAC CE signaling and/or quasi-co-location and/or spatial filter identified during a random access procedure (e.g., not initiated by a PDCCH order that triggers a contention-free random access).

In another alternative example, a CORESET (e.g., CORESET B) is configured/updated by a MAC CE to follow the unified (master or main or indicated) TCI state. If not configured or activated or updated to follow the unified (master or main or indicated) TCI state, the CORESET is configured and/or activated a TCI state by MAC CE signaling.

In another alternative example, a CORESET (e.g., CORESET B) is not configured/updated by a MAC CE to not follow the unified (master or main or indicated) TCI state. If configured or activated or updated to not follow the unified (master or main or indicated) TCI state, the CORESET is configured and/or activated a TCI state by MAC CE signaling.

In one alternative example, the TCI state of the second CORESET (e.g., CORESET A) associated with USS set (or USS set and/or Type3-PDCCH CSS) is the unified (master or main or indicated) TCI state by system specification. e.g., any CORESET associated with at least USS set (or USS set and/or Type3-PDCCH CSS) follows the unified (master or main or indicated) TCI state.

In another alternative example, the TCI state of the second CORESET (e.g., CORESET A) is the unified (master or main or indicated) TCI state by configuration.

In one example alternative, the second CORESET is configured by RRC configuration to follow the unified (master or main or indicated) TCI state. If not configured to follow the unified (master or main or indicated) TCI state, the CORESET is configured and/or activated a TCI state or quasi-co-location/spatial relation by RRC and/or MAC CE signaling and/or quasi-co-location and/or spatial filter identified during a random access procedure (e.g., not initiated by a PDCCH order that triggers a contention-free random access).

In one example alternative, the second CORESET is not configured by RRC configuration to not follow the unified (master or main or indicated) TCI state. If configured to not follow the unified (master or main or indicated) TCI state, the CORESET is configured and/or activated a TCI state or quasi-co-location/spatial relation by RRC and/or MAC CE signaling and/or quasi-co-location and/or spatial filter identified during a random access procedure (e.g., not initiated by a PDCCH order that triggers a contention-free random access).

In another example alternative, a second CORESET is configured/updated by a MAC CE to follow the unified (master or main or indicated) TCI state. If not configured or activated or updated to follow the unified (master or main or indicated) TCI state, the CORESET is configured and/or activated a TCI state by MAC CE signaling.

In another example alternative, a second CORESET is not configured/updated by a MAC CE to not follow the unified (master or main or indicated) TCI state. If configured or activated or updated to not follow the unified (master or main or indicated) TCI state, the CORESET is configured and/or activated a TCI state by MAC CE signaling.

Wherein, a unified (master or main or indicated) TCI state is signaled to the UE. The unified (master or main or indicated) TCI state can be one of:

In case of joint TCI state indication, wherein a same beam is used for DL and UL channels, a joint TCI state that can be used at least for UE-dedicated DL channels and UE-dedicated UL channels. The DM-RS antenna port associated with DL channels is quasi co-located with reference signals provided by the joint unified (master or main or indicated) TCI state. The DM-RS antenna port associated with UL channels uses a spatial filter provided by the joint unified (master or main or indicated) TCI state;

In case of separate TCI state indication, wherein different beams are used for DL and UL channels, a DL TCI state can be used at least for UE-dedicated DL channels. The DM-RS antenna port associated with DL channels is quasi co-located with reference signals provided by the DL unified (master or main or indicated) TCI state;

In case of separate TCI state indication, wherein different beams are used for DL and UL channels, a UL TCI state can be used at least for UE-dedicated UL channels. The DM-RS antenna port associated with UL channels uses a spatial filter provided by the UL unified (master or main or indicated) TCI state.

The unified (master or main or indicated) TCI state is TCI state of UE-dedicated reception on PDSCH/PDCCH or dynamic-grant/configured-grant based PUSCH and all of dedicated PUCCH resources.

A MAC CE can activate one or more unified (master or main or indicated) TCI State codepoints, wherein the unified (master or main or indicated) TCI State codepoint can include:

In case of joint TCI state indication, wherein a same beam is used for DL and UL channels, a joint TCI state;

In case of separate TCI state indication, wherein different beams are used for DL and UL channels, a DL TCI state;

In case of separate TCI state indication, wherein different beams are used for DL and UL channels, an UL TCI state;

In case of separate TCI state indication, wherein different beams are used for DL and UL channels, a pair of DL TCI state and UL TCI State.

When the MAC CE (activating unified (master or main or indicated) TCI state codepoints) activates one TCI state codepoint, the codepoint is applied to DL and UL channels. When the MAC CE activates more than one codepoint, a unified (master or main or indicated) TCI state codepoint is indicated to the UE by DL related DCI with or without a DL assignment.

In one example, following the aforementioned description, a first CORESET is CORESET B, and a second CORESET is CORESET A. CORESET B doesn't follow the signaled unified (main or master or indicated) TCI state or TCI state codepoint. CORESET A follows the signaled unified (main or master or indicated) TCI state or TCI state codepoint.

In one example:

The CORESET associated with USS set and/or Type3-PDCCH CSS set and/or CSS set other than Type3-PDCCH CSS set (e.g., Type0-PDCCH CSS set and/or Type0A-PDCCH CSS set and/or Type1-PDCCH CSS set and/or Type2-PDCCH CSS set) follows the unified (or main or master or indicated) TCI state, and the unified (or master or main or indicated) TCI state or TCI state codepoint is associated with an SSB of the source serving cell, and the UE is signaled a unified (or master or main or indicated) TCI state or TCI state codepoint associated with an SSB of a cell having a PCI different from the PCI of the source serving cell;

At the time of beam application of the TCI state, the UE applies the TCI state associated with the cell having a PCI different from the PCI of the source serving cell, then there is no switching of the serving cell at this time. The TCI state is not applied to common channels, e.g., channels associated with CSS set Type3-PDCCH CSS set (e.g., Type0-PDCCH CSS set and/or Type0A-PDCCH CSS set and/or Type1-PDCCH CSS set and/or Type2-PDCCH CSS set). The TCI state for the common channels can be determined based on one of: Follow the latest signaled unified (main or master or indicated) TCI state that is associated with the source serving cell, or a signaled TCI state or TCI state codepoint associated with the source serving cell.

The UE is signaled to switch serving cell (e.g., cell switch command), in one example the target serving cell is the cell associated with the latest signaled unified (or master or main or indicated) TCI state or TCI state codepoint. In one example, the switching of serving cell is signaled by DCI. In one example, the switching of serving cell is signaled by MAC CE. In one example, the switching of serving cell is signaled by RRC. In one example, at the time of serving cell change, the UE uses, for the common channels (e.g., associated with CSS set, (e.g., Type0-PDCCH CSS set and/or Type0A-PDCCH CSS set and/or Type1-PDCCH CSS set and/or Type2-PDCCH CSS set), the unified (or master or main or indicated) TCI state or TCI state codepoint. In one example, the UE is further signaled a TCI state or TCI state codepoint associated with the target serving cell (e.g., in the cell switch command), and at the time of serving cell change, the UE uses, for the common channels (e.g., associated with CSS set, (e.g., Type0-PDCCH CSS set and/or Type0A-PDCCH CSS set and/or Type1-PDCCH CSS set and/or Type2-PDCCH CSS set), the signaled TCI state or TCI state codepoint;

At the time of serving cell change, the UE switches from the source serving cell to the target serving cell. The UE continues to receive/transmit channels associated with the USS and/or Type3-PDCCH CSS set using the unified (or master or main or indicated) TCI state associated with an SSB associated with the PCI of the target serving cell. The UE receives/transmits the common channels (e.g., channels associated with a CSS set (e.g., Type0-PDCCH CSS set and/or Type0A-PDCCH CSS set and/or Type1-PDCCH CSS set and/or Type2-PDCCH CSS set) using one of: the unified (or master or main or indicated) TCI state associated with an SSB associated with the PCI of the target serving cell, or a signaled TCI state associated with an SSB associated with the PCI of the target serving cell.

In one example:

The CORESET associated with USS set and/or CSS set (e.g., Type0-PDCCH CSS set and/or Type0A-PDCCH CSS set and/or Type1-PDCCH CSS set and/or Type2-PDCCH CSS set and/or Type3-PDCCH CSS set) follows the unified (or master or main or indicated) TCI state, the unified (or master or main or indicated) TCI state or TCI state codepoint is associated with an SSB of the source serving cell, the UE is signaled a unified (or master or main or indicated) TCI state or TCI state codepoint associated with an SSB of a cell having a PCI different from the PCI of the source serving cell;

At the time of beam application of the TCI state, the UE applies the TCI state associated with the cell having a PCI different from the PCI of the source serving cell, there is no switching of the serving cell at this time. The TCI state is not applied to common channels, e.g., channel associated with CSS set (e.g., Type0-PDCCH CSS set and/or Type0A-PDCCH CSS set and/or Type1-PDCCH CSS set and/or Type2-PDCCH CSS set and/or Type3-PDCCH CSS set). The TCI state for the common channels can be determine based on one of: Follow the latest signaled unified (main or master or indicated) TCI state that is associated with the source serving cell, or a signaled TCI state or TCI state codepoint associated with the source serving cell;

The UE is signaled to switch serving cell (e.g., cell switch command), in one example the target serving cell is the cell associated with the latest signaled unified (or master or main or indicated) TCI state or TCI state codepoint. In one example, the switching of serving cell is signaled by DCI. In one example, the switching of serving cell is signaled by MAC CE. In one example, the switching of serving cell is signaled by RRC. In one example, at the time of serving cell change, the UE uses, for the common channels (e.g., associated with CSS set, (e.g., Type0-PDCCH CSS set and/or Type0A-PDCCH CSS set and/or Type1-PDCCH CSS set and/or Type2-PDCCH CSS set and/or Type3-PDCCH CSS set), the unified (or master or main or indicated) TCI state or TCI state codepoint. In one example, the UE is further signaled a TCI state or TCI state codepoint associated with the target serving cell (e.g., in the cell switch command), at the time of serving cell change, the UE uses, for the common channels (e.g., associated with CSS set, (e.g., Type0-PDCCH CSS set and/or Type0A-PDCCH CSS set and/or Type1-PDCCH CSS set and/or Type2-PDCCH CSS set and/or Type3-PDCCH CSS set), the signaled TCI state or TCI state codepoint;

At the time of serving cell change, the UE switches from the source serving cell to the target serving cell. The UE continues to receive/transmit channels associated with the USS using the unified (or master or main or indicated) TCI state associated with an SSB associated with the PCI of the target serving cell. The UE receives/transmits the common channels (e.g., channels associated with a CSS set (e.g., Type0-PDCCH CSS set and/or Type0A-PDCCH CSS set and/or Type1-PDCCH CSS set and/or Type2-PDCCH CSS set and/or Type3-PDCCH CSS set) using one of: the unified (or master or main or indicated) TCI state associated with an SSB associated with the PCI of the target serving cell, or a signaled TCI state associated with an SSB associated with the PCI of the target serving cell.

In one example:

A first CORESET associated with a first USS set and/or Type3-PDCCH CSS set and/or CSS set other than Type3-PDCCH CSS set (e.g., Type0-PDCCH CSS set and/or Type0A-PDCCH CSS set and/or Type1-PDCCH CSS set and/or Type2-PDCCH CSS set) doesn't follow the unified (or main or master or indicated) TCI state, a second CORESET associated with a second USS set and/or Type3-PDCCH CSS set follows the unified (or main or master or indicated) TCI state, the unified (or master or main or indicated) TCI state or TCI state codepoint is associated with an SSB of the source serving cell, and the UE is signaled a unified (or master or main or indicated) TCI state or TCI state codepoint associated with an SSB of a cell having a PCI different from the PCI of the source serving cell;

At the time of beam application of the TCI state, the UE applies the TCI state associated with the cell having a PCI different from the PCI of the source serving cell, there is no switching of the serving cell at this time. The TCI state is applied to the second CORESET and associated channels.

The first CORESET and associated channels continue to follow a TCI state associated with the serving cell;

The UE is signaled to switch serving cell (e.g., cell switch command), in one example the target serving cell is the cell associated with the latest signaled unified (or master or main or indicated) TCI state or TCI state codepoint. In one example, the switching of serving cell is signaled by DCI. In one example, the switching of serving cell is signaled by MAC CE. In one example, the switching of serving cell is signaled by RRC. In one example, at the time of serving cell change, the UE uses, for the first CORESET and associated channels the unified (or master or main or indicated) TCI state or TCI state codepoint. In one example, a UE is further signaled a TCI state or TCI state codepoint associated with the target serving cell (e.g., in the cell switch command), at the time of serving cell change, the UE uses for the first CORESET and associated channels the signaled TCI state or TCI state codepoint;

At the time of serving cell change, the UE switches from the source serving cell to the target serving cell. The UE continues to use for the channels associated with the second CORESET using the unified (or master or main or indicated) TCI state associated with an SSB associated with the PCI of the target serving cell. The UE uses for the channels associated with first CORESET a TCI state that can be based on one of: the unified (or master or main or indicated) TCI state associated with an SSB associated with the PCI of the target serving cell, or a signaled TCI state associated with an SSB associated with the PCI of the target serving cell.

In one example:

A first CORESET associated with a first USS set and/or CSS set (e.g., Type0-PDCCH CSS set and/or Type0A-PDCCH CSS set and/or Type1-PDCCH CSS set and/or Type2-PDCCH CSS set and/or Type3-PDCCH CSS set) doesn't follow the unified (or master or main or indicated) TCI state, a second CORESET associated with a second USS set follows the unified (or main or master or indicated) TCI state, the unified (or master or main or indicated) TCI state or TCI state codepoint is associated with an SSB of the source serving cell, and the UE is signaled a unified (or master or main or indicated) TCI state or TCI state codepoint associated with an SSB of a cell having a PCI different from the PCI of the source serving cell;

At the time of beam application of the TCI state, the UE applies the TCI state associated with the cell having a PCI different from the PCI of the source serving cell, there is no switching of the serving cell at this time. The TCI state is applied to the second CORESET and associated channels. The first CORESET and associated channels continue to follow a TCI state associated with the serving cell.

The UE is signaled to switch serving cell (e.g., cell switch command), in one example the target serving cell is the cell associated with the latest signaled unified (or master or main or indicated) TCI state or TCI state codepoint. In one example, the switching of serving cell is signaled by DCI. In one example, the switching of serving cell is signaled by MAC CE. In one example, the switching of serving cell is signaled by RRC. In one example, at the time of serving cell change, the UE uses, for the first CORESET and associated channels the unified (or master or main or indicated) TCI state or TCI state codepoint. In one example, a UE is further signaled a TCI state or TCI state codepoint associated with the target serving cell (e.g., in the cell switch command), at the time of serving cell change, the UE uses for the first CORESET and associated channels the signaled TCI state or TCI state codepoint;

At the time of serving cell change, the UE switches from the source serving cell to the target serving cell. The UE continues to receive channels associated with the second CORESET using the unified (or master or main or indicated) TCI state associated with an SSB associated with the PCI of the target serving cell. The UE uses for the channels associated with first CORESET a TCI state that can be based on one of: the unified (or master or main or indicated) TCI state associated with an SSB associated with the PCI of the target serving cell, or a signaled TCI state associated with an SSB associated with the PCI of the target serving cell.

In one example:

The CORESET associated with CSS set other than Type3-PDCCH CSS set, (e.g., Type0-PDCCH CSS set and/or Type0A-PDCCH CSS set and/or Type1-PDCCH CSS set and/or Type2-PDCCH CSS set) doesn't follow the unified (or master or main or indicated) TCI state, the CORESET associated with USS set and/or Type3-PDCCH CSS follows the unified (or master or main or indicated) TCI state, the unified (or master or main or indicated) TCI state or TCI state codepoint is associated with an SSB of the source serving cell, and the TCI state of channels associated CSS set, (e.g., Type0-PDCCH CSS set and/or Type0A-PDCCH CSS set and/or Type1-PDCCH CSS set and/or Type2-PDCCH CSS set) is associated with an SSB of the source serving cell, and the UE is signaled a unified (or master or main or indicated) TCI state or TCI state codepoint associated with an SSB of a cell having a PCI different from the PCI of the source serving cell;

At the time of beam application of the TCI state, the UE applies the TCI state associated with the cell having a PCI different from the PCI of the source serving cell, there is no switching of the serving cell at this time, (the unified (main or master or indicated) TCI state or TCI state codepoint is used for the USS set and/or Type3-PDCCH CSS and associated channels—the CORESET associated with CSS set other than Type3-PDCCH CSS set and associated channels continue to follow a TCI state associated with the serving cell);

A UE is signaled to switch serving cell (e.g., cell switch command), in one example the target serving cell is the cell associated with the latest signaled unified (or master or main or indicated) TCI state or TCI state codepoint. In one example, the switching of serving cell is signaled by DCI. In one example, the switching of serving cell is signaled by MAC CE. In one example, the switching of serving cell is signaled by RRC. In one example, at the time of serving cell change, the UE uses, for the common channels (e.g., associated with CSS set, (e.g., Type0-PDCCH CSS set and/or Type0A-PDCCH CSS set and/or Type1-PDCCH CSS set and/or Type2-PDCCH CSS set), the unified (or master or main or indicated) TCI state or TCI state codepoint. In one example, a UE is further signaled a TCI state or TCI state codepoint associated with the target serving cell (e.g., in the cell switch command), at the time of serving cell change, the UE uses, for the common channels (e.g., associated with CSS set, (e.g., Type0-PDCCH CSS set and/or Type0A-PDCCH CSS set and/or Type1-PDCCH CSS set and/or Type2-PDCCH CSS set), the signaled TCI state or TCI state codepoint;

At the time of serving cell change, the UE switches from the source serving cell to the target serving cell. The UE continues to receive/transmit channels associated with the USS set and/or Type3-PDCCH CSS set using the unified (or master or main or indicated) TCI state associated with an SSB associated with the PCI of the target serving cell. The UE receives/transmits the common channels (e.g., channels associated with a CSS set (e.g., Type0-PDCCH CSS set and/or Type0A-PDCCH CSS set and/or Type1-PDCCH CSS set and/or Type2-PDCCH CSS set) using one of: the unified (or master or main or indicated) TCI state associated with an SSB associated with the PCI of the target serving cell, or a signaled TCI state associated with an SSB associated with the PCI of the target serving cell.

In one example:

The CORESET associated with CSS set, (e.g., Type0-PDCCH CSS set and/or Type0A-PDCCH CSS set and/or Type1-PDCCH CSS set and/or Type2-PDCCH CSS set and/or Type3-PDCCH CSS set) doesn't follow the unified (or master or main or indicated) TCI state, the CORESET associated with USS set follows the unified (or master or main or indicated) TCI state, the unified (or master or main or indicated) TCI state or TCI state codepoint is associated with an SSB of the source serving cell, the TCI state of channels associated CSS set, (e.g., Type0-PDCCH CSS set and/or Type0A-PDCCH CSS set and/or Type1-PDCCH CSS set and/or Type2-PDCCH CSS set and/or Type3-PDCCH CSS set) is associated with an SSB of the source serving cell, and the UE is signaled a unified (or master or main or indicated) TCI state or TCI state codepoint associated with an SSB of a cell having a PCI different from the PCI of the source serving cell.

At the time of beam application of the TCI state, the UE applies the TCI state associated with the cell having a PCI different from the PCI of the source serving cell, there is no switching of the serving cell at this time (the unified (main or master or indicated) TCI state or TCI state codepoint is used for the USS set and associated channels—the CORESET associated with CSS set and associated channels continue to follow a TCI state associated with the serving cell);

The UE is signaled to switch serving cell (e.g., cell switch command), in one example the target serving cell is the cell associated with the latest signaled unified (or master or main or indicated) TCI state or TCI state codepoint. In one example, the switching of serving cell is signaled by DCI. In one example, the switching of serving cell is signaled by MAC CE. In one example, the switching of serving cell is signaled by RRC. In one example, at the time of serving cell change, the UE uses, for the common channels (e.g., associated with CSS set, (e.g., Type0-PDCCH CSS set and/or Type0A-PDCCH CSS set and/or Type1-PDCCH CSS set and/or Type2-PDCCH CSS set and/or Type3-PDCCH CSS set), the unified (or master or main or indicated) TCI state or TCI state codepoint. In one example, a UE is further signaled a TCI state or TCI state codepoint associated with the target serving cell (e.g., in the cell switch command), at the time of serving cell change, the UE uses, for the common channels (e.g., associated with CSS set, (e.g., Type0-PDCCH CSS set and/or Type0A-PDCCH CSS set and/or Type1-PDCCH CSS set and/or Type2-PDCCH CSS set and/or Type3-PDCCH CSS set), the signaled TCI state or TCI state codepoint.

At the time of serving cell change, the UE switches from the source serving cell to the target serving cell. The UE continues to receive/transmit channels associated with the USS set using the unified (or master or main or indicated) TCI state associated with an SSB associated with the PCI of the target serving cell. The UE receives/transmits the common channels (e.g., channels associated with a CSS set (e.g., Type0-PDCCH CSS set and/or Type0A-PDCCH CSS set and/or Type1-PDCCH CSS set and/or Type2-PDCCH CSS set and/or Type3-PDCCH CSS set) using one of: the unified (or master or main or indicated) TCI state associated with an SSB associated with the PCI of the target serving cell, or a signaled TCI state associated with an SSB associated with the PCI of the target serving cell.

Figure 9:
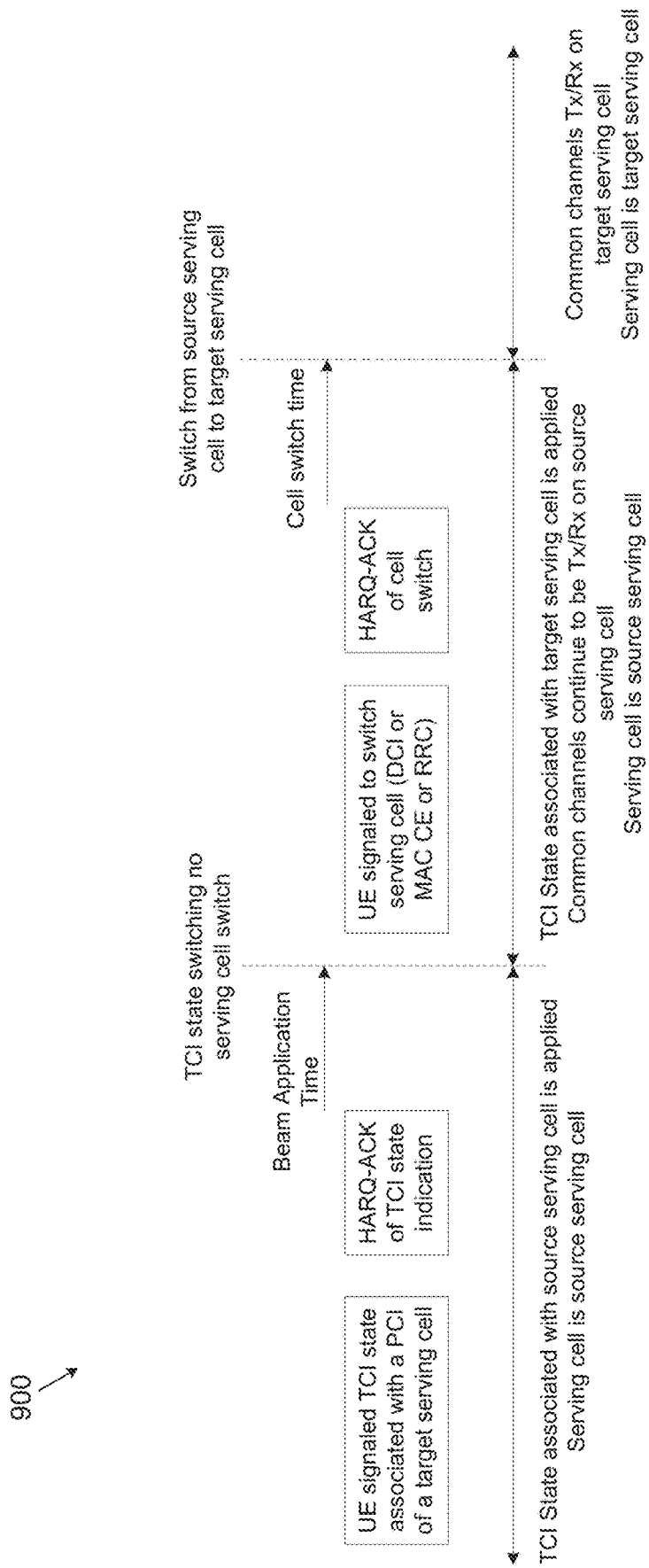
FIG. 9 illustrates an example of a serving cell change after a beam indication of a TCI state or TCI state codepoint associated with a PCI of target serving cell according to embodiments of the present disclosure.

FIG. 9 illustrates an example diagram 900 of a serving cell change after a beam indication of a TCI state or TCI state codepoint associated with a PCI of target serving cell. The embodiment of the diagram 900 shown in FIG. 9 is for illustration only. Other embodiments could be used without departing from the scope of this disclosure. A CORESET associated with a CSS set can follow or not follow the unified (or main or master or indicated) TCI state or TCI state codepoint following one of the aforementioned examples. The TCI state used by the UE is initially a TCI state associated with a source serving cell. The serving cell of the UE is the source serving cell. A UE signaled a TCI state (this is the unified (or main or master or indicated) TCI state or TCI state codepoint) associated with a cell having a PCI different from the PCI of the source serving cell (e.g., the PCI of a target serving cell). The TCI state (or TCI state codepoint) can be signaled by a DCI Format (e.g., DCI Format 1_1 or DCI Format 1_2 with a DL assignment or without a DL assignment) if more than one TCI state codepoint is activated by MAC CE. The TCI state (or TCI state codepoint) can be signaled by a MAC CE if one TCI state codepoint is activated by MAC CE. After a beam application time from the HARQ-ACK acknowledgment of the channel conveying the TCI state (or TCI state codepoint), the signaled TCI state is applied. There is no change in serving cell at the time of beam application. Common channels and/or channels with CORESETs associated with common channels continue to be received/transmitted using a TCI state associated with the source serving cell. The UE is signaled to switch to the target serving cell (the signaling can be by RRC signaling and/or MAC CE signaling and/or DCI signaling). After a cell switch time, the UE switches from the source serving cell to the destination serving cell, common channels and/or channels with CORESETs associated with common channels are received/transmitted using a TCI state associated with the target serving cell.

In FIG. 9, a UE is first indicated a TCI state associated with a target cell having a PCI different from the PCI of the serving cell, this is subsequently followed by a signal (that can be based on additional criterial) to perform the cell switch. The TCI state of the target cell having a PCI different from the PCI of the serving cell is applied first after a beam application time from the HARQ-ACK of the channel carrying the TCI state indication. This is then followed by a cell switch command at a later time. In one example the HARQ-ACK that causes the beam update carries a positive acknowledgment. In another example, the HARQ-ACK that causes the beam update carries a positive acknowledgment or a negative acknowledgment. In one example the HARQ-ACK that causes the cell switch carries a positive acknowledgment. In another example, the HARQ-ACK that causes the cell switch carries a positive acknowledgment or a negative acknowledgment. In a variant example, the beam application time starts from the end of the channel that carries the beam indication. In a variant example, the cell switch time starts from the end of the channel that carries the cell switch.

Figure 10:
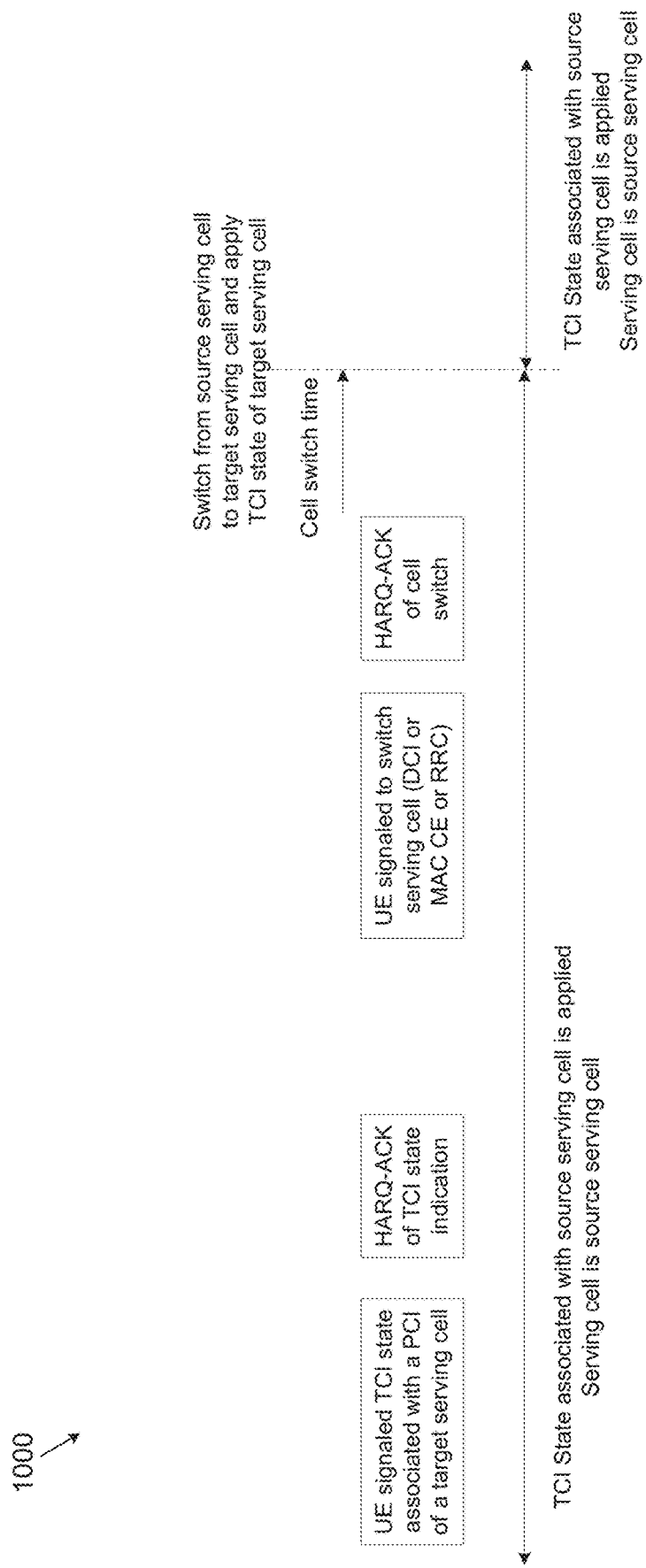
FIG. 10 illustrates an example variation of FIG. 9.

FIG. 10 illustrates an example of a diagram 1000 to rather wait for a cell switch command used according to embodiments of the present disclosure. The embodiment of the diagram 1000 shown in FIG. 10 is for illustration only. Other embodiments could be used without departing from the scope of this disclosure. A variant of FIG. 9 is not to apply the TCI state of the target cell right away, but rather wait for the cell switch command as illustrated in FIG. 10. The TCI state is applied after the UE receives the HARQ-ACK of the cell switch command and after a time from that HARQ-ACK equal to the cell switch time (or the beam application time). In one example, the beam application time can equal the cell switch time (as shown in FIG. 8). In another example, the beam application time can equal the cell switch time plus an additional delay. In another example, the beam application time from HARQ-ACK of cell switch can be less than the cell switch time. In one example the HARQ-ACK that causes the cell switch (or beam update) carries a positive acknowledgment. In another example, the HARQ-ACK that causes the cell switch (or beam update) carries a positive acknowledgment or a negative acknowledgment. In a variant example, the cell switch time (or beam application time) starts from the end of the channel that carries the cell switch.

In one alternative example, the cell switch time can be determined based on the one or more of the following examples:

In one alternative example, the start (reference) of the cell switch time can be one of the following:

In one alternative example, the cell switch time is after the start of the channel conveying the cell switch command.

In one alternative example, the cell switch time is after the end of the channel conveying the cell switch command.

In one alternative example, the cell switch time is after the start of the channel conveying HARQ-ACK to the channel conveying the cell switch command.

In one alternative example, the cell switch time is after the end of the channel conveying HARQ-ACK to the channel conveying the cell switch command.

In one alternative example, the dependence of cell switch time on beam application time can be one of the following:

In one alternative example, the cell switch time is determined or configured separately from the beam application time.

In one alternative example, the cell switch time and the beam application time are the same.

In one alternative example, a first beam application time is configured or determined to be used when the cell associated with the source TCI state and the cell associated with the target TCI state is the same. A second beam application time is configured or determined to be used when the cell associated with the source TCI state and the cell associated with the target TCI state are different. In one example, the cell switch time and the second beam application time are the same. In one example, the cell switch time and the first beam application time are the same.

In one alternative example, the time of cell switch can be one of the following:

In one alternative example, a cell switch occurs at the first slot boundary at or after the end of the cell switch time period.

In one alternative example, a cell switch occurs at the first sub-frame boundary at or after the end of the cell switch time period.

In one alternative example, a cell switch occurs at the first frame boundary at or after the end of the cell switch time period.

In one alternative example, a cell switch occurs at the first symbol boundary at or after the end of the cell switch time period.

In one alternative example, a cell switch occurs after the end of the cell switch time period.

In one alternative example, the cell switch time is configured by higher layers (e.g., RRC configuration and/or MAC CE configuration/update). In case of CA, when multiple carriers (e.g., a list of carriers) follow the same TCI state or TCI state ID or TCI state codepoint, the beam application time is determined based on the carrier (out of the multiple or list of carriers) that is one of the following:

In one alternative example, the carrier with smallest sub-carrier spacing.

In one alternative example, the carrier with largest sub-carrier spacing.

In one alternative example, the carrier/BWP among the configured BWPs in all the carriers in the list with the smallest sub-carrier spacing.

In one alternative example, the carrier/BWP among the configured BWPs in all the carriers in the list with the largest sub-carrier spacing.

In one alternative example, the carrier/BWP among the active BWPs in all the carriers in the list with the smallest sub-carrier spacing.

In one alternative example, the carrier/BWP among the active BWPs in all the carriers in the list with the largest sub-carrier spacing.

In one alternative example, if more than one carrier (from the list) or more than one carrier (from the list)/BWP has the smallest (or largest) sub-carrier spacing, the UE expects that the configured cell switch time, if any, is the same across all of these.

In one alternative example, only one cell switch time is configured for the carriers (from the list) or the carriers (from the list)/BWP with the smallest (or largest) sub-carrier spacing.

In one alternative example, the cell switch time depends on a UE-capability.

In one alternative example, the time of cell switch is signaled to the UE in the cell switch command (or in a separate message). Wherein, the time of cell switch can be determined by the start of a frame (SFN) and/or subframe and/or slot at which the cell switch occurs.

In one alternative example, a first C-RNTI is used to receive and/or transmit channels or signals to/from the UE from/to the first cell or first group (list) of cells. The network indicates a cell switch to a second cell or second group (list) of cells having a PCI different from the PCI of the first cell. The network can indicate and/or configure a second C-RNTI to receive and/or transmit channels or signals to/from the UE from/to the second cell or second group (list) of cells.

In one alternative embodiment, the first cell or first group (list) of cells can be a source serving cell or a group (list) of source serving cells, the second cell or second group (list) of cells can be a target serving cell or a group (list) of target serving cells, wherein the UE switches from the source serving cells (or group (list) of cells) to the target serving cell (or group (list) of cells) at the time of cell switch to the target serving cell (or group (list) of cells) (second cell (or group (list) of cells)).

In one alternative embodiment a group of cells are cells in a list (e.g., carrier aggregation list) that follow a same unified (or main or master or indicated) TCI state or TCI state ID or TCI state codepoint. In one example, a group (list) of cells share a same PCI.

In one alternative example, the same C-RNTI is used in the first cell (or group (list) of cells), and in the second cell (or group (list) of cells). There is no additional configuration or signaling of a C-RNTI for the second cell (or group (list) of cells).

In another alternative example, the C-RNTI can be different between the first cell (or group (list) of cells), and the second cell (or group (list) of cells).

In one alternative example, a second C-RNTI is configured by RRC signaling ahead of a cell switch to the second cell or group of cells. When a cell switch is indicated to the UE that is associated with the second cell (or group (list) of cells), the second C-RNTI becomes active at the time of cell switch to the second cell (or group (list) of cells).

In one alternative example, a C-RNTI is configured for a next target serving cell (or group (list) of cells). When a cell switch is indicated for a target serving cell (or a group (list) of cells) the C-RNTI becomes active at the corresponding cell switch time.

In another alternative example, a C-RNTI is configured for each target serving cell (or each group (list) of cells). When a cell switch is indicated for a target serving cell (or a group (list) of cells) the C-RNTI corresponding to the cell (or group (list) of cells) becomes active at the corresponding cell switch time.

In another alternative example, a second C-RNTI is indicated by RRC signaling indicating a cell switch.

In another alternative example, a second C-RNTI is indicated by MAC CE signaling.

In one alternative example, the second C-RNTI is indicated by and included in the MAC CE message that activates the TCI state codepoints of the second cell (or the group (list) of cells). When a cell switch is indicated for a second cell (or group (list) of cells) the C-RNTI becomes active at the corresponding cell switch time.

In a variant of alternative example, a set of C-RNTI values can be configured by RRC signaling, the MAC CE message indicates one of these configured values.

In one alternative example, the second C-RNTI is indicated by and included in the MAC CE message that activates the TCI state codepoints of the second cell (or the group (list) of cells). When a beam (e.g., a TCI state or TCI state ID or TCI state codepoint) is indicated for a second cell (or group (list) of cells) the C-RNTI becomes active at the corresponding beam application time (e.g., before cell switch).

In a variant of alternative example, a set of C-RNTI values can be configured by RRC signaling, the MAC CE message indicates one of these configured values.

In one alternative example, the second C-RNTI is indicated by and included in the MAC CE message for cell switch. When a cell switch is indicated for a second cell (or group (list) of cells) the C-RNTI is included in the corresponding MAC CE and becomes active at the corresponding cell switch time.

In a variant of alternative example, a set of C-RNTI values can be configured by RRC signaling, the MAC CE message indicates one of these configured values.

In another alternative example, the second C-RNTI is indicated by a MAC CE message separate from the MAC CE message that activates the TCI state codepoints of the second cell (or the group (list) of cells) and the MAC CE for cell switch, if any. When a cell switch is indicated for a second cell (or group (list) of cells) the C-RNTI becomes active at the corresponding cell switch time.

In a variant of alternative example, a set of C-RNTI values can be configured by RRC signaling, the MAC CE message indicates one of these configured values.

In another alternative example, the second C-RNTI is indicated by a MAC CE message separate from the MAC CE message that activates the TCI state codepoints of the second cell (or the group (list) of cells). When a beam (e.g., a TCI state or TCI state ID or TCI state codepoint) is indicated for a second cell (or group (list) of cells) the C-RNTI becomes active at the corresponding beam application time (e.g., before cell switch).

In a variant of alternative example, a set of C-RNTI values can be configured by RRC signaling, the MAC CE message indicates one of these configured values.

In another alternative example, a second C-RNTI is indicated by DCI signaling.

In one alternative example, the second C-RNTI is indicated by and included in the DCI that indicates the TCI state(s) TCI state codepoint(s) of the second cell (or second group (list) of cells). The C-RNTI becomes active at the corresponding cell switch time.

In a variant of alternative example, a set of C-RNTI values can be configured by RRC signaling and/or MAC CE signaling, the DCI signal indicates one of these configured values.

In one alternative example, the second C-RNTI is indicated by and included in the DCI that indicates the TCI state(s) TCI state codepoint(s) of the second cell (or second group (list) of cells). The C-RNTI becomes active at the corresponding beam application time (e.g., before cell switch).

In a variant of alternative example, a set of C-RNTI values can be configured by RRC signaling and/or MAC CE signaling, the DCI signal indicates one of these configured values.

In another alternative example, the second C-RNTI is indicated by a DCI separate from the DCI that indicates the TCI state(s) or TCI state codepoint(s) of the second cell (or the group (list) of cells). When a beam (e.g., a TCI state or TCI state ID or TCI state codepoint) is indicated for a second cell (or group (list) of cells) the C-RNTI becomes active at the corresponding beam application time (e.g., before cell switch).

In a variant of alternative example, a set of C-RNTI values can be configured by RRC signaling, the MAC CE message indicates one of these configured values.

In one alternative example, the second C-RNTI is indicated by and included in the DCI that indicates a cell switch to the second cell (or second group (list) of cells). The C-RNTI becomes active at the corresponding cell switch time.

In a variant of alternative example, a set of C-RNTI values can be configured by RRC signaling and/or MAC CE signaling, the DCI signal indicates one of these configured values.

In another alternative example, the second C-RNTI is indicated by a DCI separate from the DCI that indicates the TCI state(s) or TCI state codepoint(s) of the second cell (or the group (list) of cells) and the DCI for cell switch, if any. When a cell switch is indicated for a second cell (or group (list) of cells) the C-RNTI becomes active at the corresponding cell switch time.

In a variant of alternative example, a set of C-RNTI values can be configured by RRC signaling, the MAC CE message indicates one of these configured values.

In another alternative example, there is no C-RNTI in the DCI that indicates the TCI state(s) or TCI codepoint(s) of the second cell (or group of cells) nor the DCI for cell switch, if any. The C-RNTI is determined implicitly based on prior RRC and/or MAC CE configuration, and becomes active at the corresponding cell switch time.

In another alternative example, the second C-RNTI scrambles the CRC of the channel conveying the beam indication (e.g., a TCI state or TCI state ID or TCI state codepoint). In this example, the channel conveying the beam indication can be a DCI Format and the C-RNTI scrambles the CRC of the DCI format. This could require the UE to do hypothesis testing for multiple C-RNTI values to determine the C-RNTI of beam indication.

In one alternative example, the second C-RNTI is applied starting from the time of receiving the channel conveying the beam indication (e.g., a TCI state or TCI state ID or TCI state codepoint) with a CRC scrambled by the second C-RNTI.

In another alternative example, the second C-RNTI is applied starting from beam application time of the beam indication (e.g., a TCI state or TCI state ID or TCI state codepoint) conveyed by the channel with a CRC scrambled by the second C-RNTI.

In another alternative example, the second C-RNTI is applied starting from cell switch time corresponding to the beam indication (e.g., a TCI state or TCI state ID or TCI state codepoint) conveyed by the channel with a CRC scrambled by the second C-RNTI.

In another alternative example, the second C-RNTI scrambles the CRC of the channel conveying the cell switch. In this example, the channel conveying the cell switch can be a DCI Format or MAC CE and the C-RNTI scrambles the CRC of the DCI format or DCI Format associated with the MAC CE. This could require the UE to do hypothesis testing for multiple C-RNTI values to determine the C-RNTI of cell switch.

In one alternative example, the second C-RNTI is applied starting from the time of receiving the channel conveying the cell switch with a CRC scrambled by the second C-RNTI.

In another alternative example, the second C-RNTI is applied starting from cell switch time corresponding to the cell switch conveyed by the channel with a CRC scrambled by the second C-RNTI.

A UE is indicated a TCI state by MAC CE when the CE activates one TCI state codepoint. The UE applies the TCI state codepoint after a beam application time from the corresponding HARQ-ACK feedback. An UE is indicated a TCI state by a DL related DCI format (e.g., DCI Format 1_1, or DCI format 1_2), wherein the DCI format includes a "transmission configuration indication" field that includes a TCI state codepoint out of the TCI state codepoints activated by a MAC CE. A DL related DCI format can be used to indicate a TCI state when the UE is activated with more than one TCI state codepoints. The DL related DCI Format can be with a DL assignment or without a DL assignment. A TCI state (TCI state codepoint) indicated in a DL related DCI format is applied after a beam application time from the corresponding HARQ-ACK feedback.

As described in the 3GPP standard specification 38.133, when a TCI is activated (switched) in slot n by a MAC CE activation command to switch a target TCI state, the UE may be able to receive in a future slot that depends on whether the TCI state is known or unknown, and if known, whether it is in the active list of the PDSCH. The TCI state is known if the following conditions are met [TS 38.133 clause 8.10.2]: During the period from the last transmission of the RS resource used for the L1-RSRP measurement reporting for the target TCI state to the completion of active TCI state switch, where the RS resource for L1-RSRP measurement is the RS in the target TCI state or QCLed to the target TCI state; (1) TCI state switch command is received within 1280 ms upon the last transmission of the RS resource for beam reporting or measurement, (2) the UE has sent at least one L1-RSRP report for the target TCI state before the TCI switch command, (3) the TCI state remains detectable during the TCI switching period, and (4) the SSB associated with the TCI state remains detectable during the TCI switching period, with SNR of the TCI state≥−3 dB. Otherwise, the TCI state is unknown.

If the TCI state is unknown [TS 38.133 clause 8.10.3], upon receiving a MAC CE activation command in slot n to switch to a target TCI state, the UE may be able to receive PDCCH with target TCI state in a first slot that is after slot $$n + T_{HARQ} + 3N_{slot}^{subframe,\mu} + T_{L1-RSRP} + TO_{uk}\frac{(T_{first-SSB} + T_{SSB-proc})}{NR \text{ slot length}} \cdot TO_{uk}$$

is "0" for SSB based L1-RSRP measurement when TCI switching involves QCL-TypeD. $TO_{uk}$ is "1" for CSI-RS based L1-RSRP measurement when TCI switching involves QCL-TypeD, or when TCI state switching involves QCL Types other than QCL-TypeD.

If the TCI state is known and target TCI state is in the active set, upon receiving a MAC CE activation command to switch to a target TCI state in slot n, the UE may be able to receive PDCCH with target TCI state in a first slot that is after slot $n=T_{HARQ}=3N_{slot}^{subframe,\mu}$.

If the TCI state is known and target TCI state is not in the active set, upon receiving a MAC CE activation command to switch to a target TCI state in slot n, the UE may be able to receive PDSCH with target TCI state in a first slot that is after slot $$n + T_{HARQ} + 3N_{slot}^{subframe,\mu} + \frac{(T_{first-SSB} + T_{SSB-proc})}{NR \text{ slot length}}.$$

In the aforementioned equations: $T_{HARQ}$ is the time between the DL data transmission with the MAC CE command and the corresponding acknowledgment; $N_{slot}^{subframe,\mu}$ is the number of slots in a subframe (of duration 1 ms) for numerology (sub-carrier spacing configuration) μ; $T_{L1-RSRP}$ is the time for L1 RSRP measurement for Rx beam refinement as defined in TS 38.133, wherein $T_{L1-RSRP}=0$, for FR1 or when the TCI state switching doesn't involve QCL-TypeD in FR2, or $T_{L1-RSRP}$ is defined as $T_{L1-RSRP\_Measurement\_Period\_SSB}$ for SSB, defined in clause 9.5.4.1 of TS 38.133 with M=1 and $T_{Report}=0$, or $T_{L1-RSRP}$ is defined as $T_{L1-RSRP\_Measurement\_Period\_CSI-RS}$ for CSI-RS, defined in clause 9.5.4.2 of TS 38.133, with the CSI-RS resource configured with higher layer parameter repetition set to on, M=1 for periodic CSI-RS, the number of CSI-RS resources in a resource set at least equal to MaxNumberRxBeam, and $T_{Report}=0$; $T_{first-SSB}$ is one of (1) the time to the first SSB after the MAC CE with the activation command is decoded when the target TCI state is known or when the target state is unknown and switching doesn't involve QCL TypeD, (2) the time to the first SSB after L1-RSRP measurement when the target TCI state is unknown and switching involves QCL-TypeD. This may depend on the time of the decode and periodicity of the SSB, which can be in the range {5, 10, 20, 40, 80, 160}ms; and $T_{SSB-proc}$ is the SSB processing time which equals 2 ms.

If the target TCI state is known, upon receiving PDSCH carrying MAC-CE active TCI state list update at slot n, UE shall be able to receive PDCCH to schedule PDSCH with the new target TCI state at the first slot that is after $$n + T_{HARQ} + 3N_{slot}^{subframe,\mu} + TO_k \frac{(T_{first-SSB} + T_{SSB-proc})}{NR \text{ slot length}}.$$

Wherein, $TO_k=1$ if target TCI state is not in the active TCI state list, 0 otherwise.

A UE can be signaled TCI states (or TCI state IDs or TCI state codepoints), with multiple MAC CE and/or DCI Formats. The disclosure herein below considers timing aspects related to application of corresponding TCI states. The disclosure herein below also considers the relationship between the MAC CE activation and DCI Format indication.

In Rel-15 and Rel-16 a common framework is shared for CSI and beam management. While the complexity of such framework is justified for CSI in FR1, it makes beam management procedures rather cumbersome, and less efficient in FR2. Efficiency here refers to overhead associated with beam management operations and latency for reporting and indicating new beams.

Furthermore, in Rel-15 and Rel-16, the beam management framework is different for different channels. This increases the overhead of beam management, and could lead to less robust beam-based operation. For example, for PDCCH the TCI state (used for beam indication), is updated through MAC CE signaling. While the TCI state of PDSCH can be updated through a DL DCI carrying the DL assignment with codepoints configured by MAC CE, or the PDSCH TCI state can follow that of the corresponding PDCCH, or use a default beam indication. In the uplink direction, the spatialRelationInfo framework is used for beam indication for PUCCH and SRS, which is updated through RRC and/or MAC CE signaling. For PUSCH the SRI (SRS Resource Indicator), in an UL DCI with UL grants, can be used for beam indication. Having different beam indications and beam indication update mechanisms increases the complexity, overhead and latency of beam management, and could lead to less robust beam-based operation.

As noted above, Rel-17 introduced the unified TCI framework, wherein a unified or master or main TCI state is signaled to the UE. RRC signaling configures Rel-17 TCI states, which can be DL/joint TCI states, DLorJoint-TCIState, or UL TCI states, UL-TCIState, as afore mentioned. MAC signaling can activate one or more TCI codepoints. When one TCI state codepoint is activated by MAC CE, the UE applies the TCI state(s) associated with the activated codepoint after a beam application time. When more than one TCI codepoints are activated by MAC CE, further DCI signaling is used to indicate a TCI state codepoint to the UE. The unified TCI state can be signaled by a DCI Format (e.g., DL related DCI Format (e.g., DCI Format 1_1 or DCI Format 1_2) with a DL assignment or a DL related DCI Format (e.g., DCI Format 1_1 or DCI Format 1_2) without a DL assignment.

A UE can be signaled TCI states (or TCI state IDs or TCI state codepoints), with multiple MAC CE and/or DCI Formats. Embodiments of the present disclosure consider timing aspects related to application of corresponding TCI states. In particular, embodiments of the present disclosure consider timing aspects related to application of corresponding TCI states, when a UE is signaled TCI states (or TCI state IDs or TCI state codepoints), with multiple DCI Formats, as well as timing relation between MAC CE TCI state codepoint activation and DCI Format TCI state codepoint indication.

The UE can use a DL related DCI (e.g., DCI Format 1_1 or DCI Format 1_2) without DL assignment, for beam indication. For example, the use of DL related DCI without DL assignment, can be configured by higher layers, or can be specified in the system specification.

Alternatively, the UE can use a DL related DCI (e.g., DCI Format 1_1 or DCI Format 1_2) with DL assignment, for beam indication. For example, the use of DL related DCI with DL assignment, can be configured by higher layers, or can be specified in the system specification.

In the following examples, the "transmission configuration indication" provided by a DCI format includes a TCI state codepoint activated by MAC CE. Wherein, the TCI state codepoint can be one of: Joint TCI state used for UL transmissions and DL receptions by the UE, DL TCI state used for DL receptions by the UE, UL TCI state used for UL transmissions by the UE, or DL TCI state used for DL receptions by the UE and UL TCI states used for UL transmissions by the UE.

In this disclosure a slot can be determined by one of the following:

The sub-carrier spacing of the active DL BWP and/or carrier to which the TCI state is be applied;

The sub-carrier spacing of the active UL BWP and/or carrier to which the TCI state is be applied;

The smallest sub-carrier spacing of the active DL BWP and/or carrier and active UL BWP and/or carrier to which the TCI state is be applied;

The largest sub-carrier spacing of the active DL BWP and/or carrier and active UL BWP and/or carrier to which the TCI state is be applied;

In case a TCI state is to be applied to more than one carrier, the smallest sub-carrier spacing among all active BWPs and/or carriers to which the TCI state is be applied;

In case a TCI state is to be applied to more than one carrier, the largest sub-carrier spacing among all active BWPs and/or carriers to which the TCI state is be applied;

In case a TCI state is to be applied to more than one carrier, the smallest sub-carrier spacing among all configured BWPs among all carriers to which the TCI state is be applied;

In case a TCI state is to be applied to more than one carrier, the largest sub-carrier spacing among all configured BWPs among all carriers to which the TCI state is be applied.

In one alternative example, a UE has a set of $CP_1$ active TCI state codepoints. A UE is activated a second set of TCI state codepoints $CP_2$, the cardinality $|CP_2|$ (number of elements) of $CP_2$ is greater than one. The time for the activation of TCI state codepoints by MAC CE (e.g., $T_1$) can be as aforementioned.

Figure 11:
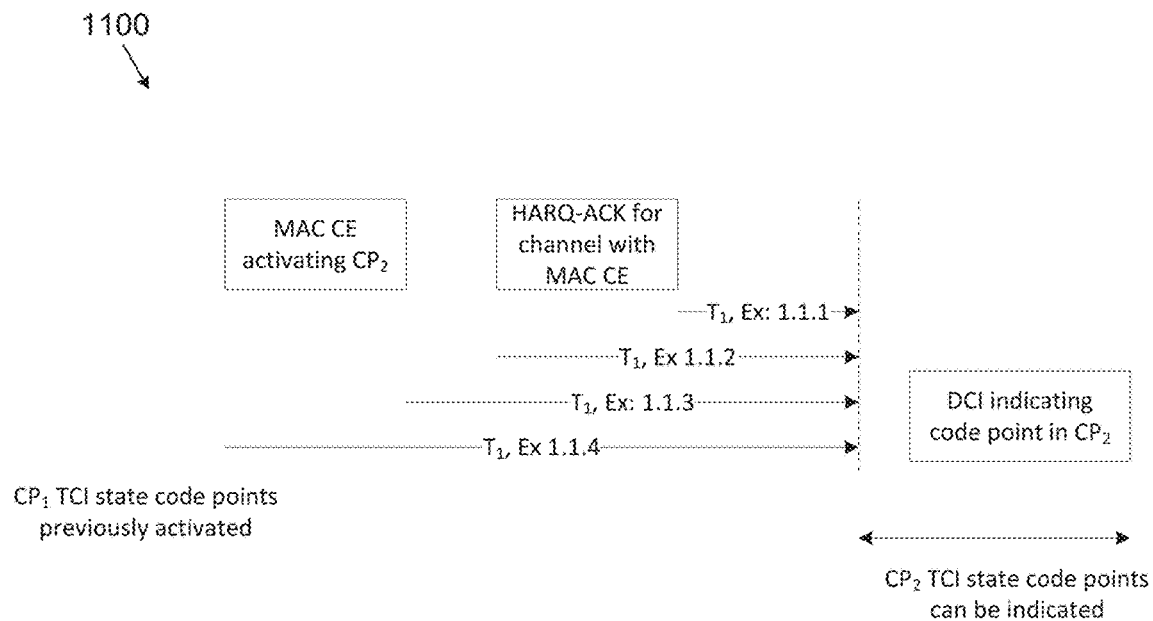
FIG. 11 illustrates an example of timing for activation of a second set of TCI state codepoints by a MAC CE according to embodiments of the present disclosure.

In one alternative example, a UE can be indicated a TCI state codepoint from the second set of TCI state codepoints $CP_2$ in a DCI Format that starts at least $T_1$ after the end (e.g., last symbol) of the channel conveying the HARQ-ACK of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 11, which illustrates an example diagram 1100 of timing for activation of a second set of TCI state codepoints by a MAC CE according to embodiments of the present disclosure. The embodiment of the diagram 1100 shown in FIG. 11 is for illustration only. Other embodiments could be used without departing from the scope of this disclosure.

In one alternative example, a UE can be indicated a TCI state codepoint from the second set of TCI state codepoints $CP_2$ in a DCI Format that starts at least $T_1$ after the start (e.g., first symbol) of the channel conveying the HARQ-ACK of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 11.

In one alternative example, a UE can be indicated a TCI state codepoint from the second set of TCI state codepoints $CP_2$ in a DCI Format that starts at least $T_1$ after the end (e.g., last symbol) of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 11.

In one alternative example, a UE can be indicated a TCI state codepoint from the second set of TCI state codepoints $CP_2$ in a DCI Format that starts at least $T_1$ after the start (e.g., first symbol) of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 11.

Figure 12:
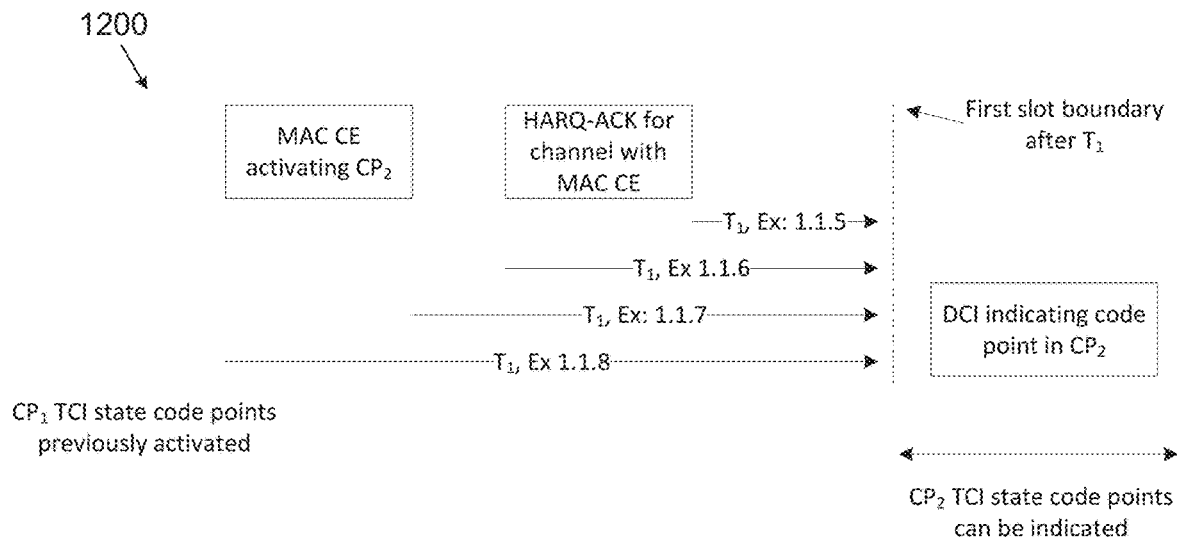
FIG. 12 illustrates another example of timing for activation of a second set of TCI state codepoints by a MAC CE according to embodiments of the present disclosure.

In one alternative example, a UE can be indicated a TCI state codepoint from the second set of TCI state codepoints $CP_2$ in a DCI Format in a slot that starts at least $T_1$ after the end (e.g., last symbol) of the channel conveying the HARQ-ACK of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 12, which illustrates another example diagram 1200 of timing for activation of a second set of TCI state codepoints by a MAC CE according to embodiments of the present disclosure. The embodiment of the diagram 1200 shown in FIG. 12 is for illustration only. Other embodiments could be used without departing from the scope of this disclosure.

In one alternative example, a UE can be indicated a TCI state codepoint from the second set of TCI state codepoints $CP_2$ in a DCI Format in a slot that starts at least $T_1$ after the start (e.g., first symbol) of the channel conveying the HARQ-ACK of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 12.

In one alternative example, a UE can be indicated a TCI state codepoint from the second set of TCI state codepoints $CP_2$ in a DCI Format in a slot that starts at least $T_1$ after the end (e.g., last symbol) of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 12.

In one alternative example, a UE can be indicated a TCI state codepoint from the second set of TCI state codepoints $CP_2$ in a DCI Format in a slot that starts at least $T_1$ after the start (e.g., first symbol) of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 12.

Figure 13:
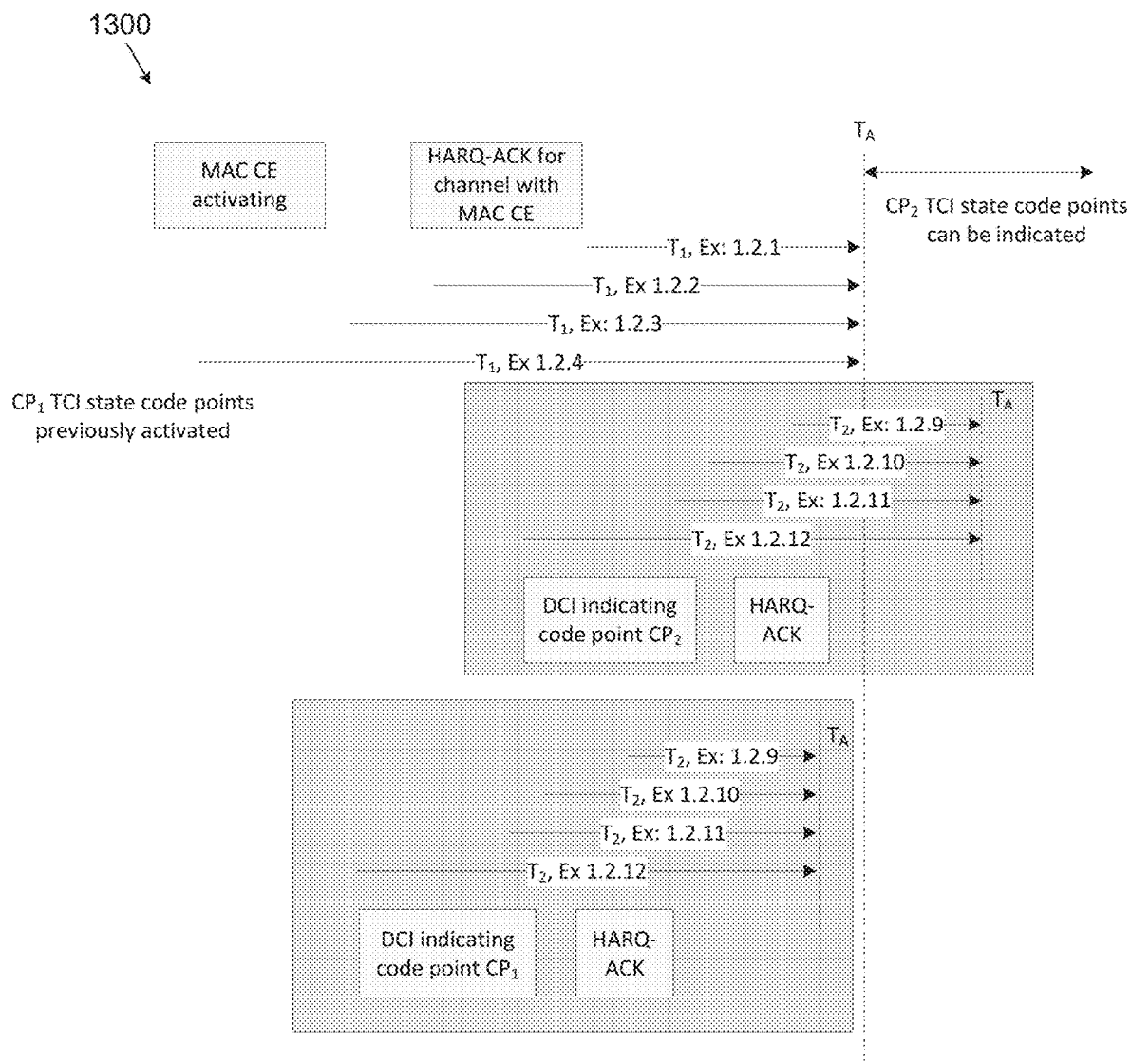
FIG. 13 illustrates an example of timing for application of a second set of TCI state codepoints indicated by a DCI according to embodiments of the present disclosure.

In one alternative example, a UE is indicated a DCI format in a DCI format after the MAC CE activating the second set of TCI state codepoints $CP_2$. In the following, the time for the activation of TCI state codepoints by MAC CE (e.g., $T_1$) can be as aforementioned. The UE applies the TCI state indicated by the DCI formatted at a time $T_4$, wherein:

In one alternative example, $T_4$ is $T_2$ after the end (e.g., last symbol) of the channel conveying the HARQ-ACK of the DCI format conveying the TCI state and/or its corresponding PDSCH. In one example, $T_2$ can be specified in the system specifications and/or configured and/or updated by RRC signaling and/or MAC CE signaling and/or L1 control signaling. This is illustrated in FIG. 13, which illustrates an example diagram 1300 of timing for application of a second set of TCI state codepoints indicated by a DCI according to embodiments of the present disclosure. The embodiment of the diagram 1300 shown in FIG. 13 is for illustration only. Other embodiments could be used without departing from the scope of this disclosure.

In one alternative example, $T_4$ is $T_2$ after the start (e.g., first symbol) of the channel conveying the HARQ-ACK of the DCI format conveying the TCI state and/or its corresponding PDSCH. In one example, $T_2$ can be specified in the system specifications and/or configured and/or updated by RRC signaling and/or MAC CE signaling and/or L1 control signaling. This is illustrated in FIG. 13.

In one alternative example, $T_4$ is $T_2$ after the end (e.g., last symbol) of the channel of the DCI format conveying the TCI state. In one example, $T_2$ can be specified in the system specifications and/or configured and/or updated by RRC signaling and/or MAC CE signaling and/or L1 control signaling. This is illustrated in FIG. 13.

In one alternative example, $T_4$ is $T_2$ after the start (e.g., first symbol) of the channel of the DCI format conveying the TCI state. In one example, $T_2$ can be specified in the system specifications and/or configured and/or updated by RRC signaling and/or MAC CE signaling and/or L1 control signaling. This is illustrated in FIG. 13.

Figure 14:
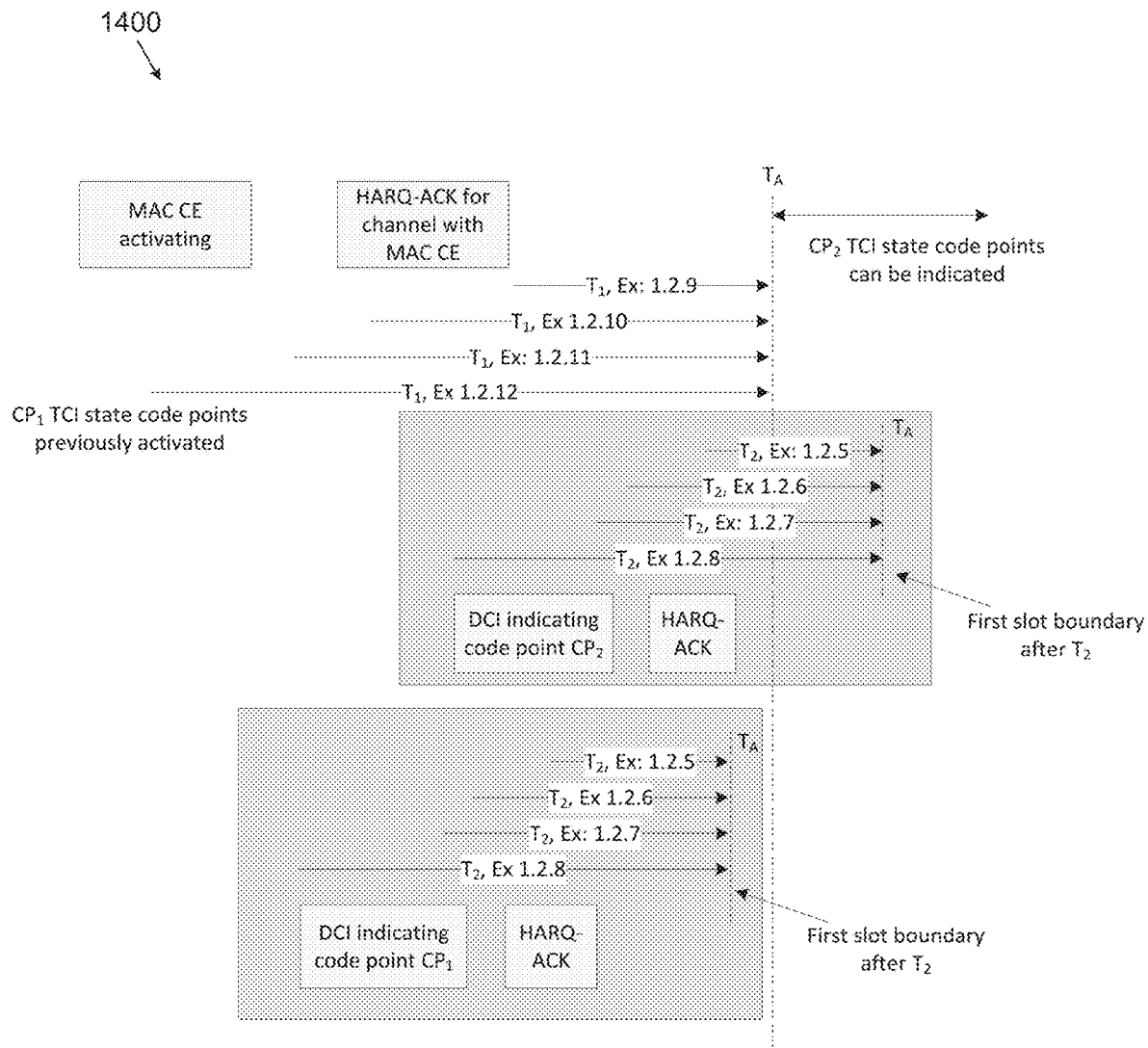
FIG. 14 illustrates another example of timing for application of a second set of TCI state codepoints indicated by a DCI according to embodiments of the present disclosure.

In one alternative example, $T_4$ is the first slot boundary starting at least $T_2$ after the end (e.g., last symbol) of the channel conveying the HARQ-ACK of the DCI format conveying the TCI state and/or its corresponding PDSCH. In one example, $T_2$ can be specified in the system specifications and/or configured and/or updated by RRC signaling and/or MAC CE signaling and/or L1 control signaling. This is illustrated in FIG. 14, which illustrates another example diagram 1400 of timing for application of a second set of TCI state codepoints indicated by a DCI according to embodiments of the present disclosure. The embodiment of the diagram 1400 shown in FIG. 14 is for illustration only. Other embodiments could be used without departing from the scope of this disclosure.

In one alternative example, $T_4$ is the first slot boundary starting at least $T_2$ after the start (e.g., first symbol) of the channel conveying the HARQ-ACK of the DCI format conveying the TCI state and/or its corresponding PDSCH. In one example, $T_2$ can be specified in the system specifications and/or configured and/or updated by RRC signaling and/or MAC CE signaling and/or L1 control signaling. This is illustrated in FIG. 14.

In one alternative example, $T_4$ is the first slot boundary starting at least $T_2$ after the end (e.g., last symbol) of the channel of the DCI format conveying the TCI state. In one example, $T_2$ can be specified in the system specifications and/or configured and/or updated by RRC signaling and/or MAC CE signaling and/or L1 control signaling. This is illustrated in FIG. 14.

In one alternative example, $T_4$ is the first slot boundary starting at least $T_2$ after the start (e.g., first symbol) of the channel of the DCI format conveying the TCI state. In one example, $T_2$ can be specified in the system specifications and/or configured and/or updated by RRC signaling and/or MAC CE signaling and/or L1 control signaling. This is illustrated in FIG. 14.

In one alternative example, if $T_A$ is at least $T_1$ after the end (e.g., last symbol) of the channel conveying the HARQ-ACK of the PDSCH channel carrying the MAC CE activating the TCI state codepoints $CP_2$, the UE applies a TCI state from the TCI state codepoints $CP_2$, else the UE applies a TCI state from the TCI state codepoints $CP_1$. In one example, $T_1$ can be specified in the system specifications and/or configured and/or updated by RRC signaling and/or MAC CE signaling and/or L1 control signaling. This is illustrated in FIG. 13 and FIG. 14.

In one alternative example, if $T_A$ is at least $T_1$ after the start (e.g., first symbol) of the channel conveying the HARQ-ACK of the PDSCH channel carrying the MAC CE activating the TCI state codepoints $CP_2$, the UE applies a TCI state from the TCI state codepoints $CP_2$, else the UE applies a TCI state from the TCI state codepoints $CP_1$. In one example, $T_1$ can be specified in the system specifications and/or configured and/or updated by RRC signaling and/or MAC CE signaling and/or L1 control signaling. This is illustrated in FIG. 13 and FIG. 14.

In one alternative example, if $T_A$ is at least $T_1$ after the end (e.g., last symbol) of the PDSCH channel carrying the MAC CE activating the TCI state codepoints $CP_2$, the UE applies a TCI state from the TCI state codepoints $CP_2$, else the UE applies a TCI state from the TCI state codepoints $CP_1$. In one example, $T_1$ can be specified in the system specifications and/or configured and/or updated by RRC signaling and/or MAC CE signaling and/or L1 control signaling. This is illustrated in FIG. 13 and FIG. 14.

In one alternative example, if $T_A$ is at least $T_1$ after the start (e.g., first symbol) of the PDSCH channel carrying the MAC CE activating the TCI state codepoints $CP_2$, the UE applies a TCI state from the TCI state codepoints $CP_2$, else the UE applies a TCI state from the TCI state codepoints $CP_1$. In one example, $T_1$ can be specified in the system specifications and/or configured and/or updated by RRC signaling and/or MAC CE signaling and/or L1 control signaling. This is illustrated in FIG. 13 and FIG. 14.

Figure 15:
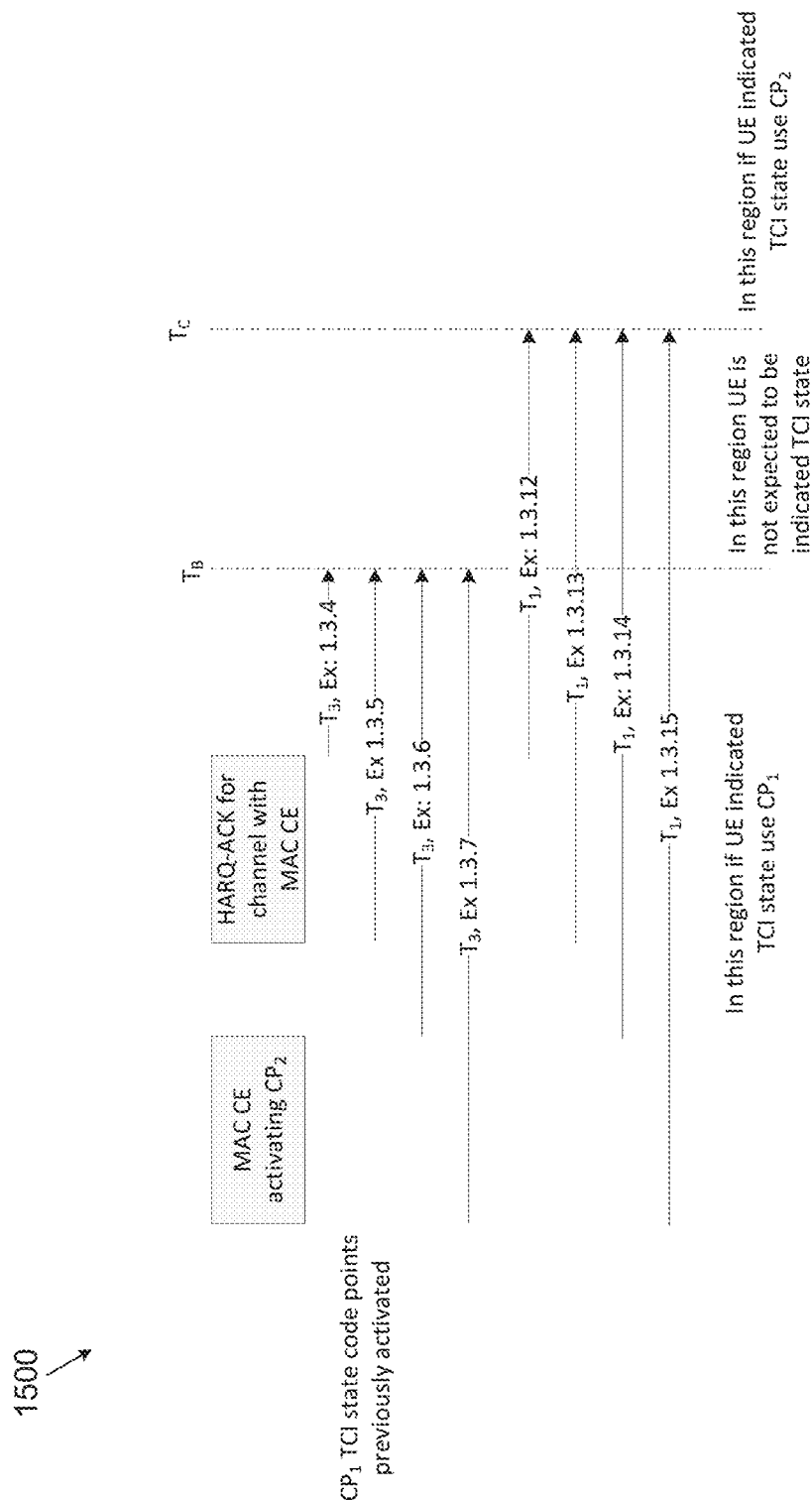
FIG. 15 illustrates an example of timing for application of TCI codepoints from first and second sets of TCI state codepoints according to embodiments of the present disclosure.
Figure 16:
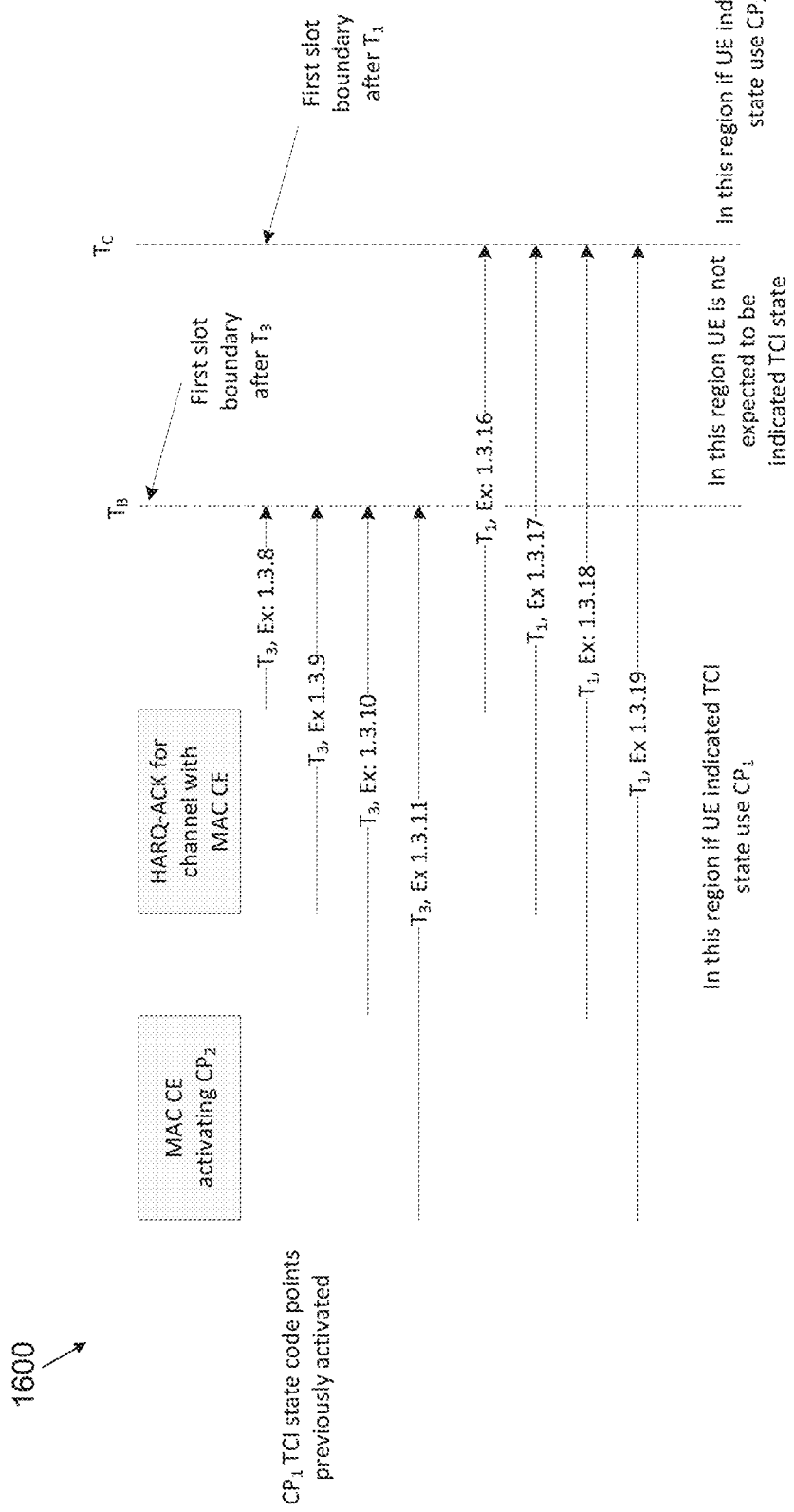
FIG. 16 illustrates another example of timing for application of TCI codepoints from first and second sets of TCI state codepoints according to embodiments of the present disclosure.

FIG. 15 illustrates an example diagram 1500 of timing for application of TCI codepoints from first and second sets of TCI state codepoints according to embodiments of the present disclosure. FIG. 16 illustrates another example diagram 1600 of timing for application of TCI codepoints from first and second sets of TCI state codepoints according to embodiments of the present disclosure. The embodiments of the diagrams 1500 and 1600 shown in FIGS. 15 and 16 are for illustration only. Other embodiments could be used without departing from the scope of this disclosure. In one alternative example, as illustrated in FIG. 15 and FIG. 16, a UE determines a first time $T_B$ and second time $T_C$ after the MAC CE activating the second set of TCI state codepoints $CP_2$. Wherein:

In one alternative example, before time $T_B$ (or before and up to time $T_B$), a UE can be indicated a TCI state by a DCI Format from the codepoints of the TCI state codepoints $CP_1$.

In one alternative example, if a DCI format conveying the TCI state starts before time $T_B$ (or before and up to time $T_B$), a UE can be indicated a TCI state by a DCI Format from the codepoints of the TCI state codepoints $CP_1$.

In one alternative example, if a DCI format conveying the TCI state ends before time $T_B$ (or before and up to time $T_B$), a UE can be indicated a TCI state by a DCI Format from the codepoints of the TCI state codepoints $CP_1$.

In one alternative example, if an UL channel conveying a HARQ-ACK corresponding to a DCI format conveying the TCI state starts before time $T_B$ (or before and up to time $T_B$), a UE can be indicated a TCI state by a DCI Format from the codepoints of the TCI state codepoints $CP_1$.

In one alternative example, if an UL channel conveying a HARQ-ACK corresponding to a DCI format conveying the TCI state ends before time $T_B$ (or before and up to time $T_B$), a UE can be indicated a TCI state by a DCI Format from the codepoints of the TCI state codepoints $CP_1$.

In one alternative example, if the beam application time corresponding to a DCI format conveying the TCI state is before time $T_B$ (or before and up to time $T_B$), a UE can be indicated a TCI state by a DCI Format from the codepoints of the TCI state codepoints $CP_1$.

In one alternative example, before time $T_C$ (or before and up to time $T_C$) and after time $T_B$ (or starting from time $T_B$) the UE ignores TCI state codepoints indicated in a DCI format or in a variant the UE doesn't expect to be indicated a TCI state.

In one alternative example, if a DCI format conveying the TCI state starts before time $T_C$ (or before and up to time $T_C$) and starts after time $T_B$ (or starting from time $T_B$) the UE ignores TCI state codepoints indicated in the DCI format or in a variant the UE doesn't expect to be indicated a TCI state.

In one alternative example, if a DCI format conveying the TCI state ends before time $T_C$ (or before and up to time $T_C$) and ends after time $T_B$ (or starting from time $T_B$) the UE ignores TCI state codepoints indicated in the DCI format or in a variant the UE doesn't expect to be indicated a TCI state.

In one alternative example, if an UL channel conveying a HARQ-ACK corresponding to a DCI format conveying the TCI state starts before time $T_C$ (or before and up to time $T_C$ and starts after time $T_B$ (or starting from time $T_B$) the UE ignores TCI state codepoints indicated in the DCI format or in a variant the UE doesn't expect to be indicated a TCI state.

In one alternative example, if an UL channel conveying a HARQ-ACK corresponding to a DCI format conveying the TCI state ends before time $T_C$ (or before and up to time $T_C$ and ends after time $T_B$ (or starting from time $T_B$) the UE ignores TCI state codepoints indicated in the DCI format or in a variant the UE doesn't expect to be indicated a TCI state.

In one alternative example, if the beam application time corresponding to a DCI format conveying the TCI state is before time $T_C$ (or before and up to time $T_C$) and is after time $T_B$ (or starting from time $T_B$) the UE ignores TCI state codepoints indicated in the DCI format or in a variant the UE doesn't expect to be indicated a TCI state.

In one alternative example, time $T_C$ and time $T_B$ are equal, i.e., this region doesn't exist.

In one alternative example, after time $T_C$ (or starting from time $T_C$ a UE can be indicated a TCI state by a DCI Format from the codepoints of the TCI state codepoints $CP_2$.

In one alternative example, if a DCI format conveying the TCI state starts after time $T_C$ (or starting from time $T_C$ a UE can be indicated a TCI state by a DCI Format from the codepoints of the TCI state codepoints $CP_2$.

In one alternative example, if a DCI format conveying the TCI state ends after time $T_C$ (or starting from time $T_C$ a UE can be indicated a TCI state by a DCI Format from the codepoints of the TCI state codepoints $CP_2$.

In one alternative example, if an UL channel conveying a HARQ-ACK corresponding to a DCI format conveying the TCI state starts after time $T_C$ (or starting from time $T_C$ a UE can be indicated a TCI state by a DCI Format from the codepoints of the TCI state codepoints $CP_2$.

In one alternative example, if an UL channel conveying a HARQ-ACK corresponding to a DCI format conveying the TCI state ends after time $T_C$ (or starting from time $T_C$ a UE can be indicated a TCI state by a DCI Format from the codepoints of the TCI state codepoints $CP_2$.

In one alternative example, if the beam application time corresponding to a DCI format conveying the TCI state is after time $T_C$ (or starting from time $T_C$ a UE can be indicated a TCI state by a DCI Format from the codepoints of the TCI state codepoints $CP_2$.

In one alternative example, $T_B$ is $T_3$ after the end (e.g., last symbol) of the channel conveying the HARQ-ACK of the PDSCH channel carrying the MAC CE activating the TCI state codepoints $CP_2$. In one example, $T_3$ can be 0. In one example, $T_3$ can be specified in the system specifications and/or configured and/or updated by RRC signaling and/or MAC CE signaling and/or L1 control signaling. This is illustrated in FIG. 15.

In one alternative example, $T_B$ is $T_3$ after the start (e.g., first symbol) of the channel conveying the HARQ-ACK of the PDSCH channel carrying the MAC CE activating the TCI state codepoints $CP_2$. In one example, $T_3$ can be 0. In one example, $T_3$ can be specified in the system specifications and/or configured and/or updated by RRC signaling and/or MAC CE signaling and/or L1 control signaling. This is illustrated in FIG. 15.

In one alternative example, $T_B$ is $T_3$ after the end (e.g., last symbol) of the PDSCH channel carrying the MAC CE activating the TCI state codepoints $CP_2$. In one example, $T_3$ can be 0. In one example, $T_3$ can be specified in the system specifications and/or configured and/or updated by RRC signaling and/or MAC CE signaling and/or L1 control signaling. This is illustrated in FIG. 15.

In one alternative example, $T_B$ is $T_3$ after the start (e.g., first symbol) of the PDSCH channel carrying the MAC CE activating the TCI state codepoints $CP_2$. In one example, $T_3$ can be 0. In one example, $T_3$ can be specified in the system specifications and/or configured and/or updated by RRC signaling and/or MAC CE signaling and/or L1 control signaling. This is illustrated in FIG. 15.

In one alternative example, $T_B$ is the start of a slot $T_3$ after the end (e.g., last symbol) of the channel conveying the HARQ-ACK of the PDSCH channel carrying the MAC CE activating the TCI state codepoints $CP_2$. In one example, $T_3$ can be 0. In one example, $T_3$ can be specified in the system specifications and/or configured and/or updated by RRC signaling and/or MAC CE signaling and/or L1 control signaling. This is illustrated in FIG. 16.

In one alternative example, $T_B$ is the start of a slot $T_3$ after the start (e.g., first symbol) of the channel conveying the HARQ-ACK of the PDSCH channel carrying the MAC CE activating the TCI state codepoints $CP_2$. In one example, $T_3$ can be 0. In one example, $T_3$ can be specified in the system specifications and/or configured and/or updated by RRC signaling and/or MAC CE signaling and/or L1 control signaling. This is illustrated in FIG. 16.

In one alternative example, $T_B$ is the start of a slot $T_3$ after the end (e.g., last symbol) of the PDSCH channel carrying the MAC CE activating the TCI state codepoints $CP_2$. In one example, $T_3$ can be 0. In one example, $T_3$ can be specified in the system specifications and/or configured and/or updated by RRC signaling and/or MAC CE signaling and/or L1 control signaling. This is illustrated in FIG. 16.

In one alternative example, $T_B$ is the start of a slot $T_3$ after the start (e.g., first symbol) of the PDSCH channel carrying the MAC CE activating the TCI state codepoints $CP_2$. In one example, $T_3$ can be 0. In one example, $T_3$ can be specified in the system specifications and/or configured and/or updated by RRC signaling and/or MAC CE signaling and/or L1 control signaling. This is illustrated in FIG. 16.

In one alternative example, $T_C$ is $T_1$ after the end (e.g., last symbol) of the channel conveying the HARQ-ACK of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 15.

In one alternative example, $T_C$ is $T_1$ after the start (e.g., first symbol) of the channel conveying the HARQ-ACK of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 15.

In one alternative example, $T_C$ is $T_1$ after the end (e.g., last symbol) of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 15.

In one alternative example, $T_C$ is $T_1$ after the start (e.g., first symbol) of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 15.

In one alternative example, $T_C$ is the start of a slot $T_1$ after the end (e.g., last symbol) of the channel conveying the HARQ-ACK of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 16.

In one alternative example, $T_C$ is the start of a slot $T_1$ after the start (e.g., first symbol) of the channel conveying the HARQ-ACK of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 16.

In one alternative example, $T_C$ is the start of a slot $T_1$ after the end (e.g., last symbol) of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 16.

In one alternative example, $T_C$ is the start of a slot $T_1$ after the start (e.g., first symbol) of the PDSCH channel carrying the MAC CE activating the TCI state codepoints $CP_2$. In one example, $T_1$ can be specified in the system specifications and/or configured and/or updated by RRC signaling and/or MAC CE signaling and/or L1 control signaling. This is illustrated in FIG. 16.

In one alternative example, a UE is signaled a first DCI format with a "transmission configuration indication" field conveying a first TCI state codepoint $TC_1$, associated with the first DCI format is a first UL channel (e.g., PUCCH or PUSCH) conveying the corresponding HARQ-ACK feedback. A UE is signaled a second DCI format with a "transmission configuration indication" field conveying a second TCI state codepoint $TC_2$, associated with the second DCI format is a second UL channel (e.g., PUCCH or PUSCH) conveying the corresponding HARQ-ACK feedback. The first DCI format starts at time $T_{1ds}$ and ends at time $T_{1de}$. The corresponding uplink channel starts at time $T_{1us}$ and ends at time $T_{1us}$. The second DCI format starts at time $T_{2ds}$ and ends at time $T_{2de}$. The corresponding uplink channel starts at time $T_{2us}$ and ends at time $T_{2ue}$.

Figure 17:
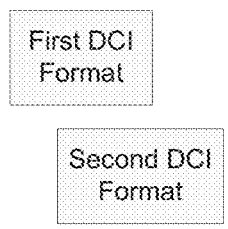
FIG. 17 illustrates an example of timing of first and second DCI formats indicating TCI state codepoints according to embodiments of the present disclosure.

In one alternative example, if $T_{2ds}>T_{1ds}$, and $T_{2ds}<T_{1de}$, the UE expects that the TCI state codepoint (or TCI state) indicated in the first DCI format is the same as the TCI state codepoint (or TCI state) indicated in the second DCI format. This is illustrated in FIG. 17, which illustrates an example diagram 1700 of timing of first and second DCI formats indicating TCI state codepoints according to embodiments of the present disclosure. The embodiment of the diagram 1700 shown in FIG. 17 is for illustration only. Other embodiments could be used without departing from the scope of this disclosure.

Figure 18:
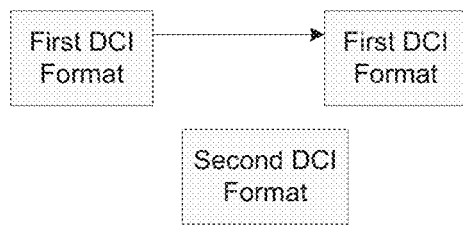
FIG. 18 illustrates another example of timing of first and second DCI formats indicating TCI state codepoints according to embodiments of the present disclosure.

In one alternative example, if $T_{2ds}>T_{1ds}$, and $T_{2ds}<T_{1ue}$, the UE expects that the TCI state codepoint (or TCI state) indicated in the first DCI format is the same as the TCI state codepoint (or TCI state) indicated in the second DCI format. This is illustrated in FIG. 18, which illustrates an illustrates another example diagram 1800 of timing of first and second DCI formats indicating TCI state codepoints according to embodiments of the present disclosure. The embodiment of the diagram 1800 shown in FIG. 18 is for illustration only. Other embodiments could be used without departing from the scope of this disclosure.

In one alternative example, if $T_{1ds}>T_{1ds}$, and $T_{1ds}<T_{1us}$, the UE expects that the TCI state codepoint (or TCI state) indicated in the first DCI format is the same as the TCI state codepoint (or TCI state) indicated in the second DCI format.

In one alternative example, if $T_{2ds}>T_{1ds}$, and $T_{2ds}$ is less than (or less than or equal to) the time corresponding to beam application time of the first TCI state codepoint indicated by the first DCI Format, the UE expects that the TCI state codepoint (or TCI state) indicated in the first DCI format is the same as the TCI state codepoint (or TCI state) indicated in the second DCI format.

Figure 19:
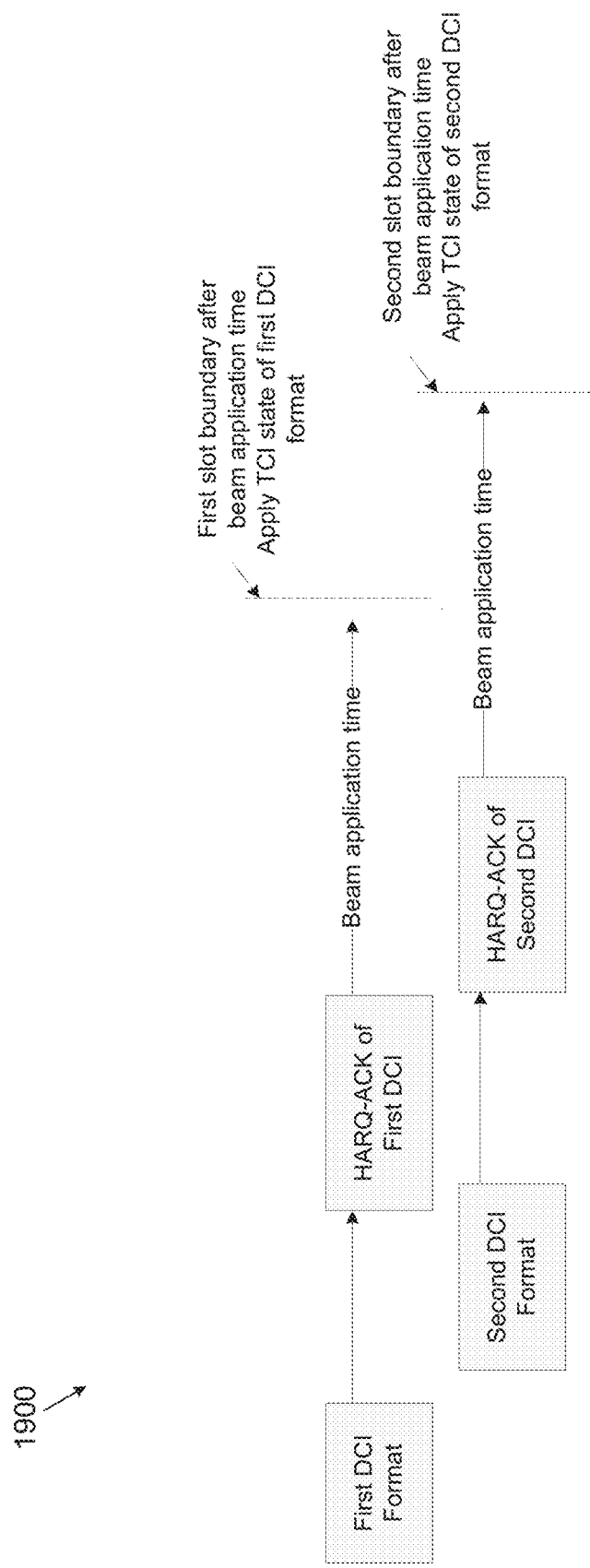
FIG. 19 illustrates an example of timing of applying TCI state codepoints indicated by first and second DCI formats according to embodiments of the present disclosure.

In one alternative example, if $T_{2ue}>T_{1ue}$, UE first applies the TCI state indicated by the first DCI format starting in the first slot starting a beam application time after the end of the first UL channel (e.g., PUCCH or PUSCH) conveying the corresponding HARQ-ACK feedback. The UE next applies the TCI state indicated by the second DCI format starting in the first slot starting a beam application time after the end of the second UL channel (e.g., PUCCH or PUSCH) conveying the corresponding HARQ-ACK feedback. This is illustrated in FIG. 19.

In one alternative example, if $T_{2ue}>T_{1ue}$, UE first applies the TCI state indicated by the first DCI format starting in the starting a beam application time after the end of the first UL channel (e.g., PUCCH or PUSCH) conveying the corresponding HARQ-ACK feedback. The UE next applies the TCI state indicated by the second DCI format starting a beam application time after the end of the second UL channel (e.g., PUCCH or PUSCH) conveying the corresponding HARQ-ACK feedback. This is illustrated in FIG. 19, which illustrates an example diagram 1900 of timing of applying TCI state codepoints indicated by first and second DCI formats according to embodiments of the present disclosure. The embodiment of the diagram 1900 shown in FIG. 19 is for illustration only. Other embodiments could be used without departing from the scope of this disclosure.

Figure 20:
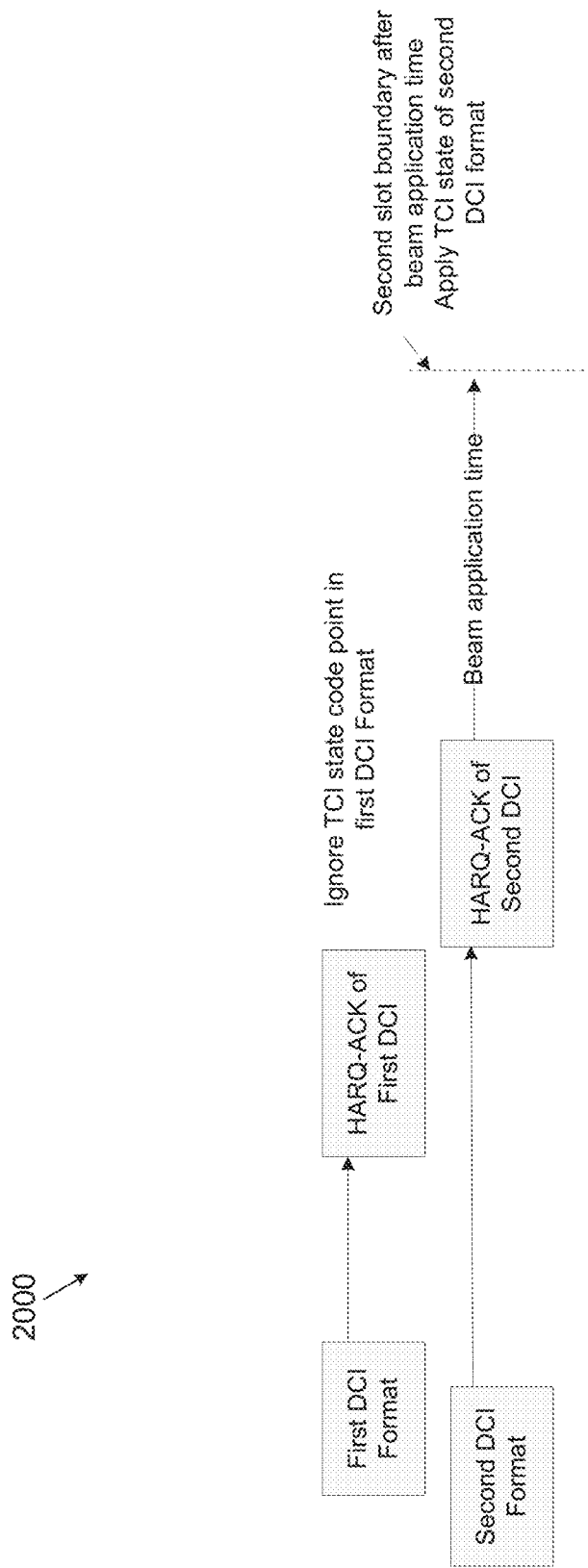
FIG. 20 illustrates an example of timing of applying a TCI state codepoint indicated by a second DCI format while ignoring a TCI state codepoint indicated by a first DCI format according to embodiments of the present disclosure.

In one alternative example, if $T_{2ue}>T_{1ue}$, and $T_{2ds}<T_{1ds}$, UE applies the TCI state indicated by the second DCI format starting in the first slot starting a beam application time after the end of the second UL channel (e.g., PUCCH or PUSCH) conveying the corresponding HARQ-ACK feedback. The UE doesn't apply the TCI state indicated by the first DCI format. This is illustrated in FIG. 20, which illustrates an example diagram 2000 of timing of applying a TCI state codepoint indicated by a second DCI format while ignoring a TCI state codepoint indicated by a first DCI format according to embodiments of the present disclosure. The embodiment of the diagram 2000 shown in FIG. 20 is for illustration only. Other embodiments could be used without departing from the scope of this disclosure.

In one example, if $T_{2ue}>T_{1ue}$, and $T_{2ds}<T_{1ds}$, UE applies the TCI state indicated by the second DCI format starting a beam application time after the end of the second UL channel (e.g., PUCCH or PUSCH) conveying the corresponding HARQ-ACK feedback. The UE doesn't apply the TCI state indicated by the first DCI format.

Figure 21:
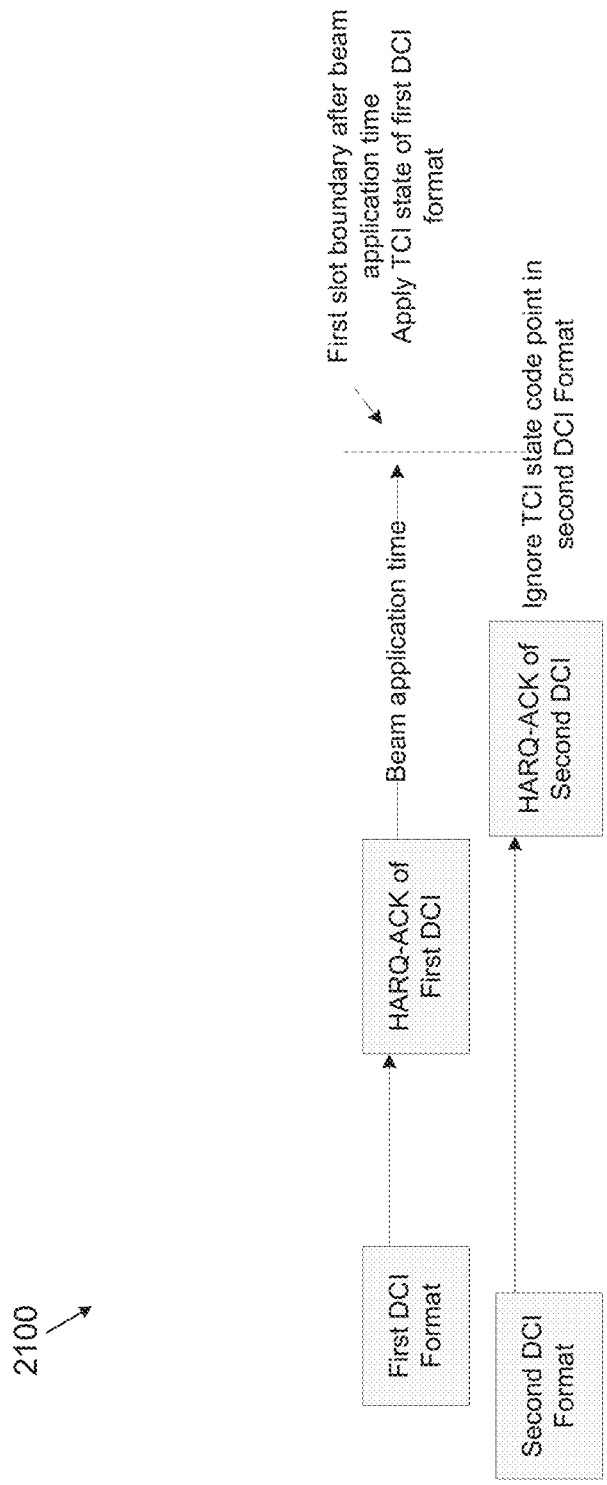
FIG. 21 illustrates an example of timing of applying a TCI state codepoint indicated by a first DCI format while ignoring a TCI state codepoint indicated by a second DCI format according to embodiments of the present disclosure.

In one alternative example if $T_{2ue}>T_{1ue}$, and $T_{2ds}<T_{1ds}$, UE applies the TCI state indicated by the first DCI format starting in the first slot starting a beam application time after the end of the first UL channel (e.g., PUCCH or PUSCH) conveying the corresponding HARQ-ACK feedback. The UE doesn't apply the TCI state indicated by the second DCI format. This is illustrated in FIG. 21, which illustrates an example diagram 2100 of timing of applying a TCI state codepoint indicated by a first DCI format while ignoring a TCI state codepoint indicated by a second DCI format according to embodiments of the present disclosure. The embodiment of the diagram 2100 shown in FIG. 21 is for illustration only. Other embodiments could be used without departing from the scope of this disclosure.

In one alternative example, if $T_{2ue}>T_{1ue}$, and $T_{2ds}<T_{1ds}$, UE applies the TCI state indicated by the first DCI format starting a beam application time after the end of the first UL channel (e.g., PUCCH or PUSCH) conveying the corresponding HARQ-ACK feedback. The UE doesn't apply the TCI state indicated by the second DCI format.

In one alternative example, if $T_{2ue}>T_{1ue}$, and $T_{2de}<T_{1de}$, UE applies the TCI state indicated by the first DCI format starting in the first slot starting a beam application time after the end of the first UL channel (e.g., PUCCH or PUSCH) conveying the corresponding HARQ-ACK feedback. The UE doesn't apply the TCI state indicated by the second DCI format.

In one alternative example, if $T_{2ue}>T_{1ue}$, and $T_{2de}<T_{1de}$, UE applies the TCI state indicated by the first DCI format starting a beam application time after the end of the first UL channel (e.g., PUCCH or PUSCH) conveying the corresponding HARQ-ACK feedback. The UE doesn't apply the TCI state indicated by the second DCI format.

In one alternative example, if $T_{2ue}>T_{1ue}$, and $T_{2de}<T_{1de}$, UE applies the TCI state indicated by the second DCI format starting in the first slot starting a beam application time after the end of the second UL channel (e.g., PUCCH or PUSCH) conveying the corresponding HARQ-ACK feedback. The UE doesn't apply the TCI state indicated by the first DCI format.

In one alternative example, if $T_{2ue}>T_{1ue}$, and $T_{2de}<T_{1de}$, UE applies the TCI state indicated by the second DCI format starting a beam application time after the end of the second UL channel (e.g., PUCCH or PUSCH) conveying the corresponding HARQ-ACK feedback. The UE doesn't apply the TCI state indicated by the first DCI format.

In one alternative example, if the first and the second DCI formats conveying the TCI state codepoint are in the same slot, the UE expects that the DCI Formats convey the same TCI state codepoint. In a variant of this example, if the first and the second DCI formats conveying the TCI state codepoint start at the same time (e.g., same symbol), the UE expects that that the DCI Formats convey the same TCI state codepoint.

In one alternative example, the UE applies the TCI state(s) corresponding to the TCI state codepoint starting in a first slot a beam application time after the earliest end of an UL channel conveying a HARQ-ACK indicating that the corresponding DCI format has been received by the UE.

In one alternative example, the UE applies the TCI state(s) corresponding to the TCI state codepoint starting a beam application time after the earliest end of an UL channel conveying a HARQ-ACK indicating that the corresponding DCI format has been received by the UE.

In one alternative example, if the first and the second DCI formats conveying the TCI state codepoint are in the same slot, the UE expects that the DL TCI state conveyed by the DCI formats is the same. In a variant of this example, if the first and the second DCI formats conveying the TCI state codepoint start at the same time (e.g., same symbol), the UE expects that that the DL TCI state conveyed by the DCI formats is the same.

In one alternative example, the UE applies the DL TCI state starting in a first slot a beam application time after the earliest end of an UL channel conveying a HARQ-ACK indicating that the corresponding DCI format has been received by the UE.

In one alternative example, the UE applies the DL TCI state a beam application time after the earliest end of an UL channel conveying a HARQ-ACK indicating that the corresponding DCI format has been received by the UE.

In one alternative example, if the first and the second DCI formats conveying the TCI state codepoint are in the same slot, the UE expects that the UL TCI state conveyed by the DCI formats is the same. In a variant of this example, if the first and the second DCI formats conveying the TCI state codepoint start at the same time (e.g., same symbol), the UE expects that that the UL TCI state conveyed by the DCI formats is the same.

In one alternative example, the UE applies the UL TCI state starting in a first slot a beam application time after the earliest end of an UL channel conveying a HARQ-ACK indicating that the corresponding DCI format has been received by the UE.

In one alternative example, the UE applies the UL TCI state a beam application time after the earliest end of an UL channel conveying a HARQ-ACK indicating that the corresponding DCI format has been received by the UE.

In one alternative example, if the first and the second DCI formats conveying the TCI state codepoint are in the same slot, the UE expects that the Joint TCI state conveyed by the DCI formats is the same. In a variant of this example, if the first and the second DCI formats conveying the TCI state codepoint start at the same time (e.g., same symbol), the UE expects that that the Joint TCI state conveyed by the DCI formats is the same.

In one alternative example, the UE applies the joint TCI state starting in a first slot a beam application time after the earliest end of an UL channel conveying a HARQ-ACK indicating that the corresponding DCI format has been received by the UE.

In one alternative example, the UE applies the joint TCI state a beam application time after the earliest end of an UL channel conveying a HARQ-ACK indicating that the corresponding DCI format has been received by the UE.

Figure 22:
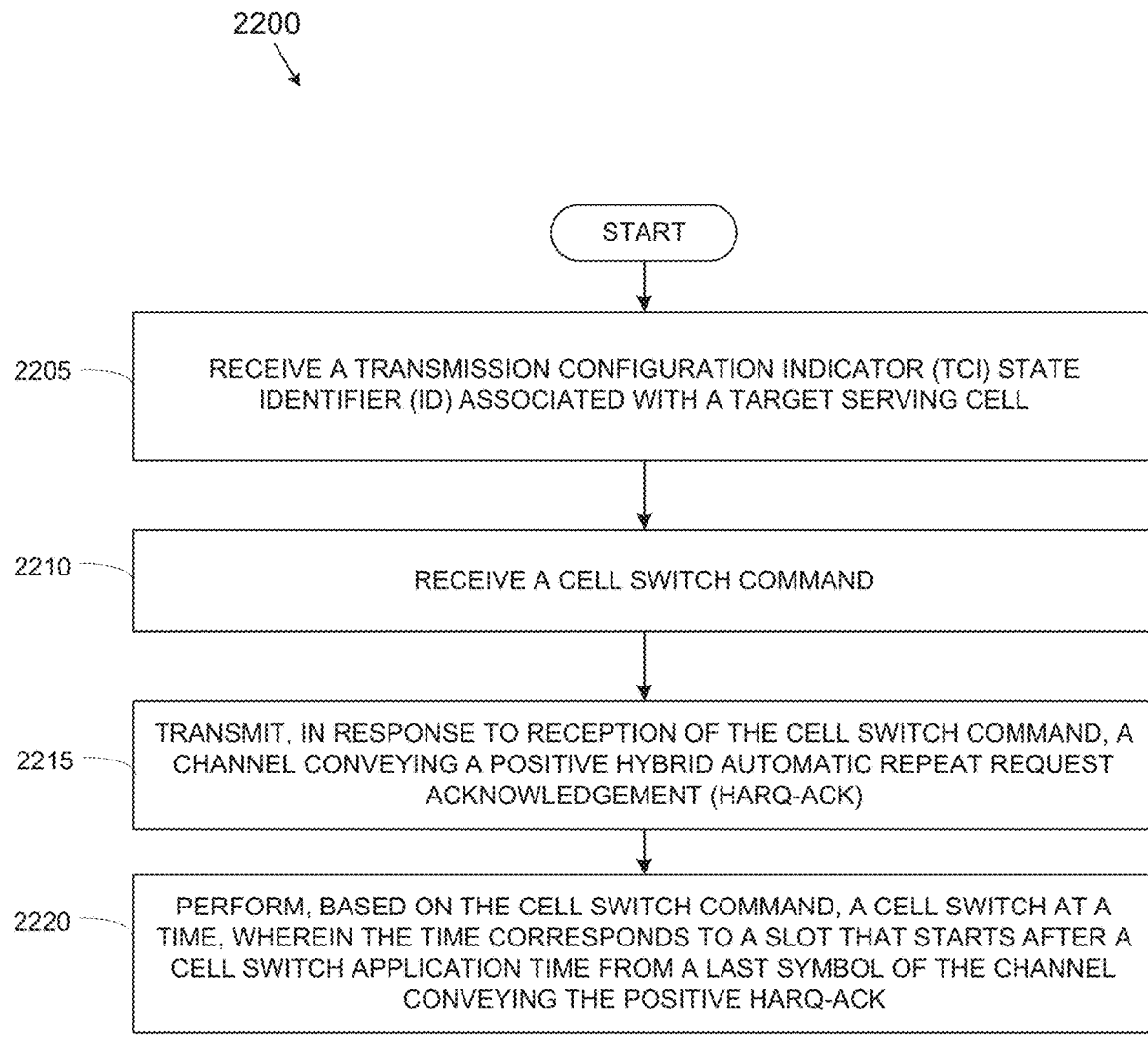
FIG. 22 illustrates an example process for facilitating serving cell changes based on signaling related to beam management procedures according to embodiments of the present disclosure.

FIG. 22 illustrates an example process 2200 for facilitating serving cell changes based on signaling related to beam management procedures according to embodiments of the present disclosure. The process 2200 of FIG. 22 is discussed as being performed by a UE, but it is understood that a corresponding BS (such as gNB 102) performs a corresponding process. Additionally, for convenience the process 2200 of FIG. 22 is discussed as performed by a UE (such as UE 116), however, it is understood that that any suitable wireless communication device could perform these processes.

Beginning at step 2205, the UE receives a transmission configuration indicator TCI state ID associated with a target serving cell. In an alternative, the UE receives the TCI state ID in the cell switch command.

Next, the UE receives a cell switch command (step 2210). In an alternative, the UE receives the TCI state ID in the cell switch command.

The UE then transmits, in response to reception of the cell switch command, a channel conveying a positive HARQ-ACK (step 2215).

Finally, the UE performs, based on the cell switch command, a cell switch at a time that corresponds to a slot that starts after a cell switch application time from a last symbol of the channel conveying the positive HARQ-ACK (step 2220).

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
  receive a transmission configuration indicator (TCI) state identifier (ID) associated with a target serving cell,
  receive a cell switch command, and
  transmit, in response to reception of the cell switch command, a channel conveying a positive hybrid automatic repeat request acknowledgement (HARQ-ACK); and
a processor operably coupled to the transceiver, the processor configured to:
  perform, based on the cell switch command, a cell switch at a time, wherein the time corresponds to a slot that starts after a cell switch application time from a last symbol of the channel conveying the positive HARQ-ACK.

2. The UE of claim 1, wherein the TCI state ID associated with the target serving cell is applied at the time of the cell switch.

3. The UE of claim 1, wherein the TCI state ID is applied to channels and signals that follow or are configured to follow a unified TCI state ID.

4. The UE of claim 1, wherein:
the transceiver is further configured to receive a list of component carriers (CC) and bandwidth parts (BWPs) that use a same TCI state ID,
the cell switch is performed for CCs in the list of CCs at a first time, and
the first time is determined based on a CC and BWP with the smallest sub-carrier spacing from the list of CCs and BWPs.

5. The UE of claim 1, wherein:
the TCI state ID is included in the cell switch command, and
the cell switch command is included in a medium access control—control element (MAC-CE).

6. The UE of claim 1, wherein:
the TCI state ID is received before the cell switch command,
the TCI state ID is applied to channels and signals associated with a UE specific search space (USS) set or a Type-3 physical downlink common channel (PDCCH) common search space (CSS) set after a beam application time from a last symbol of a channel conveying a positive HARQ-ACK of the channel conveying the TCI state ID, and
the TCI state ID is applied to channels and signals associated with a CSS set other than the Type-3 PDCCH CSS set at the time of the cell switch.

7. The UE of claim 1, wherein:
the transceiver is further configured to receive a joint TCI state ID of a target serving cell or a DL TCI state ID of the target serving cell and a UL TCI state ID of the target serving cell, and
the processor is further configured to perform, based on reception of the joint TCI state ID or the DL TCI state ID and the UL TCI state ID, the cell switch.

8. A base station (BS) comprising:
a transceiver configured to:
transmit a transmission configuration indicator (TCI) state identifier (ID) associated with a target serving cell,
transmit a cell switch command, and
receive, in response to reception of the cell switch command, a channel conveying a positive hybrid automatic repeat request acknowledgement (HARQ-ACK); and
a processor operably coupled to the transceiver, the processor configured to:
perform, based on the cell switch command and receipt of the positive HARQ-ACK, a cell switch at a time, wherein the time corresponds to a slot that starts after a cell switch application time from a last symbol of the channel conveying the positive HARQ-ACK.

9. The BS of claim 8, wherein the TCI state ID associated with the target serving cell is applied at the time of the cell switch.

10. The BS of claim 8, wherein the TCI state ID is applied to channels and signals that follow or are configured to follow a unified TCI state ID.

11. The BS of claim 8, wherein:
the transceiver is further configured to transmit a list of component carriers (CC) and bandwidth parts (BWPs) that use a same TCI state ID,
the cell switch is performed for CCs in the list of CCs at a first time, and
the first time is determined based on a CC and BWP with the smallest sub-carrier spacing from the list of CCs and BWPs.

12. The BS of claim 8, wherein:
the TCI state ID is included in the cell switch command, and
the cell switch command is included in a medium access control—control element (MAC-CE).

13. The BS of claim 8, wherein:
the TCI state ID is transmitted before the cell switch command,
the TCI state ID is applied to channels and signals associated with a UE specific search space (USS) set or a Type-3 physical downlink common channel (PDCCH) common search space (CSS) set after a beam application time from a last symbol of a channel conveying a positive HARQ-ACK of the channel conveying the TCI state ID, and
the TCI state ID is applied to channels and signals associated with a CSS set other than the Type-3 PDCCH CSS set at the time of the cell switch.

14. The BS of claim 8, wherein:
the transceiver is further configured to transmit a joint TCI state ID of a target serving cell or a DL TCI state ID of the target serving cell and a UL TCI state ID of the target serving cell, and
the processor is further configured to perform, based on transmission of the joint TCI state ID or the DL TCI state ID and the UL TCI state ID, the cell switch.

15. A method of operating a user equipment (UE), the method comprising:
receiving a transmission configuration indicator (TCI) state identifier (ID) associated with a target serving cell;
receiving a cell switch command;
transmitting, in response to reception of the cell switch command, a channel conveying a positive hybrid automatic repeat request acknowledgement (HARQ-ACK); and
performing, based on the cell switch command, a cell switch at a time, wherein the time corresponds to a slot that starts after a cell switch application time from a last symbol of the channel conveying the positive HARQ-ACK.

16. The method of claim 15, wherein the TCI state ID associated with the target serving cell is applied at the time of the cell switch.

17. The method of claim 15, wherein the TCI state ID is applied to channels and signals that follow or are configured to follow a unified TCI state ID.

18. The method of claim 15, further comprising:
receiving a list of component carriers (CC) and bandwidth parts (BWPs) that use a same TCI state ID;
performing the cell switch for CCs in the list of CCs at a first time; and
determining the first time based on a CC and BWP with the smallest sub-carrier spacing from the list of CCs and BWPs.

19. The method of claim 15, wherein:
the TCI state ID is included in the cell switch command, and the cell switch command is included in a medium access control—control element (MAC-CE).

20. The method of claim 15, further comprising:

receiving the TCI state ID before the cell switch command;

applying the TCI state ID to channels and signals associated with a UE specific search space (USS) set or a Type-3 physical downlink common channel (PDCCH) common search space (CSS) set after a beam application time from a last symbol of a channel conveying a positive HARQ-ACK of the channel conveying the TCI state ID; and applying the TCI state ID to channels and signals associated with a CSS set other than the Type-3 PDCCH CSS set at the time of the cell switch.

* * * * *